(12) United States Patent
Yokoyama et al.

(10) Patent No.: US 7,085,006 B2
(45) Date of Patent: Aug. 1, 2006

(54) APPARATUS FOR GENERATING TWO COLOR PRINTING DATA, A METHOD FOR GENERATING TWO COLOR PRINTING DATA AND RECORDING MEDIA

(75) Inventors: Kazuyuki Yokoyama, Matsumoto (JP); Yukiharu Horiuchi, Chino (JP); Katsuhito Kitahara, Kagishima (JP)

(73) Assignee: Seiko Epson Corporation, Tokyo (JP)

( * ) Notice: Subject to any disclaimer, the term of this patent is extended or adjusted under 35 U.S.C. 154(b) by 864 days.

(21) Appl. No.: 10/033,486

(22) Filed: Dec. 27, 2001

(65) Prior Publication Data

US 2003/0002060 A1 Jan. 2, 2003

Related U.S. Application Data

(60) Provisional application No. 60/317,918, filed on Sep. 7, 2001.

(30) Foreign Application Priority Data

| Dec. 28, 2000 | (JP) | ............................. 2000-403297 |
| Jan. 5, 2001 | (JP) | ............................. 2001-000671 |
| Jan. 5, 2001 | (JP) | ............................. 2001-000672 |
| Jan. 9, 2001 | (JP) | ............................. 2001-001849 |

(51) Int. Cl.
- *G06F 15/00* (2006.01)
- *B41J 1/00* (2006.01)
- *B41J 2/21* (2006.01)
- *H04N 1/46* (2006.01)

(52) U.S. Cl. ........................ 358/1.9; 358/1.1; 358/1.18; 358/526; 347/43

(58) Field of Classification Search ................. 358/1.9, 358/501, 515, 518, 529, 537, 538, 1.18, 526, 358/1.1, 523; 382/167; 347/43, 9
See application file for complete search history.

(56) References Cited

U.S. PATENT DOCUMENTS

| 4,837,613 A | 6/1989 | Paxton et al. |
| 4,873,570 A | 10/1989 | Suzuki et al. |
| 5,045,967 A | 9/1991 | Igarashi |
| 5,146,346 A | 9/1992 | Knoll |
| 5,467,196 A | 11/1995 | Fukushima et al. |
| 5,581,375 A | 12/1996 | Ma |

(Continued)

FOREIGN PATENT DOCUMENTS

EP 0 596 706 5/1994

(Continued)

OTHER PUBLICATIONS

Ithaca-Press Release, "Transact Technology's Color Inkjet Printer Provides New Marketing Opportunities", Apr. 17, 2000, 1 page.

(Continued)

*Primary Examiner*—Kimberly Williams
*Assistant Examiner*—Charlotte M. Baker
(74) *Attorney, Agent, or Firm*—Michael T. Gabrik

(57) ABSTRACT

A two-color print generating apparatus generates two-color print data based on color-converted image data in which the color of each pixel of full-color bit depth in an image is converted to a print color comprising a background color, a main color, or a secondary color. A color-reduced image data generator converts full-color image data to image data reduced to a specific number of colors. A color conversion unit generates color-converted image data in which the specified colors of the reduced-color image data are converted to colors that can be printed by the printer. A print data conversion unit converts the color converted color-converted image data to two-color print data. A color conversion selection unit sets the color conversion method and sets specific color conversion parameters based on the selected color conversion method. The processing of the invention can also be embodied as a method and/or specified as program instructions.

16 Claims, 34 Drawing Sheets

U.S. PATENT DOCUMENTS

| | | | |
|---|---|---|---|
| 5,680,230 A | 10/1997 | Kaburagi et al. | |
| 5,740,333 A * | 4/1998 | Yoh et al. | 358/1.9 |
| 6,188,493 B1 | 2/2001 | Esaki et al. | |
| 6,206,504 B1 * | 3/2001 | Payne | 347/43 |
| 6,359,695 B1 | 3/2002 | Takahashi et al. | 358/1.1 |
| 6,486,966 B1 | 11/2002 | Takahashi et al. | 358/1.1 |
| 6,490,053 B1 | 12/2002 | Takahashi et al. | 358/1.18 |
| 6,502,923 B1 | 1/2003 | Payne | |

FOREIGN PATENT DOCUMENTS

| | | |
|---|---|---|
| JP | 61-208578 | 9/1986 |
| JP | 61-250722 | 11/1986 |
| JP | 62-88071 | 4/1987 |
| JP | 63-060672 | 3/1988 |
| JP | 63-172662 | 7/1988 |
| JP | 1-206052 | 8/1989 |
| JP | 2-84364 | 3/1990 |
| JP | 2-293921 | 12/1990 |
| JP | 4-190466 | 7/1992 |
| JP | 4-264915 | 9/1992 |
| JP | 6-24046 | 2/1994 |
| JP | 6-217048 | 8/1994 |
| JP | 6-227078 | 8/1994 |
| JP | 6-88427 | 11/1994 |
| JP | 7-66974 | 3/1995 |
| JP | 7-66975 | 3/1995 |
| JP | 7-175613 | 7/1995 |
| JP | 8-84268 | 3/1996 |
| JP | 08-090767 | 4/1996 |
| JP | 8-169142 | 7/1996 |
| JP | 8-230269 | 9/1996 |
| JP | 8-282016 | 10/1996 |
| JP | 9-66643 | 3/1997 |
| JP | 9-135325 | 5/1997 |
| JP | 9-200554 | 7/1997 |
| JP | 10-051770 | 2/1998 |
| JP | 10-086461 | 4/1998 |
| JP | 10-148574 | 6/1998 |
| JP | 11-69173 | 3/1999 |
| JP | 11-070780 | 3/1999 |

OTHER PUBLICATIONS

Ithaca-Press Release, "Transact Unveils Color Inkjet Printer; Turns The World of POS Upside Down", Apr. 17, 2000, 1 page.

Ithaca-Press Release, "Transact's New POSjet Chosen For Peripheral Systems Techtour At Retail Systems 2000", Apr. 17. 2000, 1 page.

Ithaca-Press Release, "Transact's New Color InkJet POS Printer Meets Hospitality Industr Needs And Is Also A Brand Builder", Apr. 20, 2000, 1 page.

Ithaca-"How To Use The PJ1000 Image Converter", before Apr. 17, 2000, 12 pages.

1998 Adobe Systems, Inc., Adobe Photoshop 5.0 User Guide for Macintosh and Windows, pp. 63-133.

"Post Office Site", http://www.joshuatreevillage.com/228/po.htm.

"Tech 316 and 550 Weekly Assignments", http://www.technology.ewu.edu./Tech316/ComGA1.htm.

* cited by examiner (a)

CONVERT 8 COLOR DATA TO 15 COLORS (b)

CONVERT 8 COLOR DATA TO 3 COLORS (a)

(b)

| COLOR | R (= RED) | G (= GREEN) | B (= BLUE) | MAIN COLOR | SECONDARY COLOR |
|---|---|---|---|---|---|
| K (= BLACK) | 0 | 0 | 0 | K (= BLACK) | B (= BLUE) |
| B (= BLUE) | 0 | 0 | 1 | R (= RED) | R (= RED) |
| G (= GREEN) | 0 | 1 | 0 | K (= BLACK) | B (= BLUE) |
| C (= CYAN) | 0 | 1 | 1 | R (= RED) | R (= RED) |
| R (= RED) | 1 | 0 | 0 | R (= RED) | R (= RED) |
| M (= MAGENTA) | 1 | 0 | 1 | R (= RED) | R (= RED) |
| Y (= YELLOW) | 1 | 1 | 0 | R (= RED) | R (= RED) |
| W (= WHITE) | 1 | 1 | 1 | W (= WHITE) | W (= WHITE) |

FIG. 35

APPARATUS FOR GENERATING TWO COLOR PRINTING DATA, A METHOD FOR GENERATING TWO COLOR PRINTING DATA AND RECORDING MEDIA

DETAILED DESCRIPTION OF THE INVENTION

1. Technical Field of the Invention

The present invention relates to a two-color print data generator, two-color print data generating method, and data storage medium. More specifically, the invention relates to a two-color print data generator for generating two-color print data based on color-converted image data converting the color of each pixel in a full-color image to be printed to printable colors that can be printed using a background color, main color, and secondary color, a two-color print data generating method, and a data storage medium.

2. Related Art

Methods and devices are available for converting full-color data to full-color print data when a print command for printing a print object comprising full-color data is issued to a printer in a POS terminal system having a full-color printer, and full-color printing is possible by inputting this full-color data to the full-color printer. The color of each pixel in the full-color data is digitized typically using either a RGB data format or CMY data format. Using the RGB data format it is possible to represent 256*256*256=16,777,216 colors using the possible combinations of red, green, and blue luminance values each digitized as an integer in the range from 0 to 255. With the CMY data format, it is possible to represent 256*256*256=16,777,216 colors using the possible combinations of cyan, magenta, and yellow luminance values each digitized as an integer in the range from 0 to 255.

3. Problem to be Resolved by the Invention

Printers for printing two colors are mostly used as the printers in POS terminal systems rather than full-color printers for reasons including a lower printing cost. However, while it is necessary to input two-color print data converted from full-color data to the two-color printer, methods and means for converting full-color data to two-color print data have not been available. Note that the two colors printable by a two-color printer are referred to as the "main color" and the "secondary color," and the color of the printing paper is called the "background color."

The present invention is therefore directed to a solution for the above problem and an object of the invention is to provide a two-color print data generator for generating two-color print data based on color-converted image data converting the color of each pixel in the full-color data to be printed to print colors that can be printed using the background color, main color, and secondary color, and to a two-color print data generating method and data storage medium.

4. Means for Solving the Problem

A first aspect of the two-color print data generating method according to the present invention is a method for generating two-color print data having a main color and a secondary color by means of the following steps (a) and (b), that is:

(a) a color reduction step for generating reduced-color image data in which each pixel color of full-color data is reduced to any one of the following specified colors denoted by color intensity of three primary colors, (color 1, color 2, color 3)=(i, i, j)
(color 1, color 2, color 3)=(i, j, i)
(color 1, color 2, color 3)=(i, j, j)
(color 1, color 2, color 3)=(j, i, i)
(color 1, color 2, color 3)=(j, i, j)
(color 1, color 2, color 3)=(j, j, i)
(color 1, color 2, color 3)=(j, j, j); and (b) a color conversion step for generating two-color print data by converting each specified color in the reduced-color image data to a main color, secondary color, or background color according to the following conditions:

(condition 1) convert the specified color denoted as (color 1, color 2, color 3)=(i, i, i) to the main color;

(condition 2) convert the specified color denoted as (color 1, color 2, color 3)=(j, j, j) to the background color;

(condition 3) convert the specified colors denoted as (color 1, color 2, color 3) ≠(j, j, j) and (color 1, color 2, color 3)≠(i, i, i) to the secondary color. The first color, second color, and third color are preferably, in no particular order, red, green, and blue, or in no particular order cyan, magenta, and yellow.

Preferably, each pixel of the full-color data is denoted (color 1, color 2, color 3)=($k_1$−1, $k_2$−1, $k_3$−1) (where $k_1$, $k_2$, $k_3$ are integers of 3 or greater), threshold values defined for the first color, second color, and third color and the values $k_1$−1, $k_2$−1, $k_3$—1 are compared in step (a), and each pixel color of the full-color data is reduced to one of the specified colors denoted by i or j based on the result of the comparison.

A further aspect of a two-color print data generating method according to the present invention is a two-color print data generating method having a main color and secondary color and comprising the following steps (a) to (c). That is:

(a) a color reduction step for generating reduced-color image data in which each pixel color in full-color data is reduced to one of a specified number of colors;

(b) a color conversion step for generating two-color print data by converting each specified color in the reduced-color image data to a main color, secondary color, or background color;

(c) a color conversion selection step for setting the main color and secondary color, and selecting as the color conversion method used in the color conversion step (b) one of the following steps:

(b1) a first color conversion process for uniformly converting based on predefined conditions each specified color in the reduced-color image data to the main color, secondary color, or background color; and (b2) a second conversion process for desirably converting each specified color in the reduced-color image data to the main color, secondary color, or background color based on a changeable conversion table linking each specified color to the main color, secondary color, or background color.

A data storage medium according to the present invention is a data storage medium recording a program of the above two-color print data generating method. A two-color print data generating apparatus according to the present invention is an apparatus achieving the items specified by the above two-color print data generating method.

DESCRIPTION OF PREFERRED EMBODIMENTS

A preferred embodiment of the present invention is described below with reference to the accompanying figures. It will be noted that the following embodiments are described by way of example only and shall not limit the scope of the present invention. Therefore, it will be obvious to one with ordinary skill in the related art that alternative embodiments can be achieved by replacing some or all of the elements described below with an equivalent, and that all such variations are included in the scope of this invention.

(Example of a Two-color Print Data Generator)

FIG. 32 shows the position of a two-color print data generator.

The host 102 sends a print command for printing full-color data that is the print object stored in memory in the host 102 through a two-color print data generator 101 to the two-color printer 103. The two-color print data generator 101 converts the full-color data to two-color print data, and outputs the two-color print data with the print command to the two-color printer 103. Based on the received print command and two-color print data, the two-color printer 103 then prints to printing paper. The full-color data to be printed can be input to the two-color print data generator 101 from an image input device, or a function for generating or inputting full-color data can be disposed in the two-color print data generator 101.

The two-color print data generator 101 can also be built in to the host 102 and/or two-color printer 103 as a software or a hardware function. Specific examples for achieving this functionality in software and/or hardware include a driver for converting full-color data output from an application program run on the host 102 to print data and sending the print data to the two-color printer 103, and a dedicated interface card built in to the host for converting full-color data to print data.

A two-color print data generator according to the present invention has a color-reduced image data generator 201 for reducing the color of each pixel in the full-color data that is the print object requested by the host for printing to a specific number of designated colors to generate reduced-color image data, and a print data generator 205 for converting the designated colors in the reduced-color image data to the main color, secondary color, or background color to generate the two-color print data. It also has a color conversion selection unit for setting the main color and secondary color, selecting the color conversion method, and inputting specific settings based on the color conversion method.

FIG. 33 is a function block diagram of the two-color print data generator.

The two-color print data generator 101 has a reduced-color image data generating unit 201, print data generating unit 205, and color conversion selection unit 204. The print data generating unit 205 has a color conversion unit 202 and print data conversion unit 203.

The color-reduced image data generator 201 reads the full-color data print object stored in the full-color data storage 211, converts the read full-color data to reduced-color image data reduced to a specific number of colors, and stores the converted reduced-color image data to reduced-color image data memory 212. For example, 16-bit or 24-bit full-color data is converted by an error diffusion process or other method to RGB format reduced-color image data reduced to 8 colors.

The color conversion unit 202 reads the stored reduced-color image data from the reduced-color image data memory 212, reads the parameters and program for running the color conversion method selected by the color conversion selection unit 204 (described below) from settings storage 215, runs the conversion program to generate color-converted image data in which each specified color in the reduced-color image data is converted to any color printable (referred to below as "printable colors") by the printer, and stores the resulting color-converted image data to color-converted image data storage 213.

The print data conversion unit 203 converts the color-converted image data to the two-color print data specific to the connected printer 103, and stores the two-color print data in print data memory 214. For example, if the printer 103 is a thermal line printer, data is converted to raster data; if a serial inkjet printer, data is converted to bit image data of a unit corresponding to the number of nozzles in the printer. In other words, the color-converted image data is converted to data matching the specific structure of each printer, such as the print head and buffer for receiving print data.

The color conversion selection unit 204 selects a color conversion method for converting each of the reduced colors to a color printable by the printer, setting the necessary color conversion parameters according to the selected method, and storing the parameters to the settings storage 215.

Color conversion methods include a fixed conversion method for converting each of the reduced colors to a fixed print color, and an adjustable conversion method for converting each specified color to a desired print color according to the print method by configuring the conversion tables relating printable colors and each specified color in the reduced-color image data so that they can be freely modified by the user. The color-converted image data is generated by converting each specified color to a printable color based on fixed conditions the user cannot change when a fixed conversion method is selected, and when an adjustable conversion method is selected color-converted image data is generated by converting each specified color to a printable color based on a conversion table that can be defined and changed by the user according to the print method.

FIG. 34 shows reduced-color images and color-converted images.

If the number of reduced colors is eight, full-color data expressed by the color intensity of each RGB color is converted by a simple color reduction process to a reduced-color image of eight colors as shown in the figure. The color intensity of each pixel in full-color image data containing $k_R \times k_G \times k_B$ colors can be denoted as $(R, G, B)=(k_R-1, k_G-1, k_B-1)$. To reduce the color of each pixel to eight colors, each color intensity value $k_R-1, k_G-1, k_B-1$ is compared with a threshold value defined for each RGB color, and the pixel is converted to a 0 if the value of each color intensity value $k_R-1, k_G-1, k_B-1$ is less than the threshold value and converted to a 1 if equal to or greater than the threshold value, thus generating reduced-color image data containing eight colors. The full-color data is thus converted to reduced-color image data expressed with the eight colors red, green, blue, cyan, magenta, yellow, black, and white.

The reduced-color image data thus color-reduction processed to eight colors is then converted by a fixed conversion method to color-converted image data represented by three colors, the two colors printable by the printer and the background color of the printing paper. The two colors printable by the printer are referred to herein as the main color and the secondary color. More specifically, the color of each pixel in the reduced-color image data represented by the digitized (R, G, B) color intensity values is converted to the main color, secondary color, or background color based on the following three conditions.

Condition 1:

If $(R, G, B)=(0, 0, 0)$, convert to the main color.

Condition 2:

If $(R, G, B)=(1, 1, 1)$, convert to the background color.

Condition 3:

If (R, G, B)≠(1, 1, 1) and
(R, G, B)≠(0, 0, 0), convert to the secondary color.

For example, if the main color is black, the secondary color is red, and the background color is white, the reduced-color image data is converted to color-converted image data as shown in FIG. 34.

FIG. 35 is used to describe an example of a conversion table used in the fixed conversion method.

Based on specific defined conditions, a fixed conversion method uniformly converts white, for example, in the reduced-color image data to the background color, and converts colors other than white in the reduced-color image data to the main color or secondary color. Therefore, if the digitized color of each pixel is color converted based on the above three conditions, the eight colors in the reduced-color image data will be converted as follows to the three colors of the main color, secondary color, and background color. Note that F(color) below is the converted color.

| | | | |
|---|---|---|---|
| main color = | F(black), | black = | (R,G,B) = (0,0,0) |
| secondary color = | F(blue), | blue = | (R,G,B) = (0,0,1) |
| secondary color = | F(green), | green = | (R,G,B) = (0,1,0) |
| secondary color = | F(cyan), | cyan = | (R,G,B) = (0,1,1) |
| secondary color = | F(red), | red = | (R,G,B) = (1,0,0) |
| secondary color = | F(magenta), | magenta = | (R,G,B) = (1,0,1) |
| secondary color = | F(yellow), | yellow = | (R,G,B) = (1,1,0) |
| background color = | F(white), | white = | (R,G,B) = (1,1,1) |

Therefore, if the main color is black, secondary color is red, and background color is white, for example, red, green, blue, cyan, magenta, and yellow in the reduced-color image data will also be converted to red. However, if the main color is blue, secondary color is red, and background color is white, red, green, blue, cyan, magenta, and yellow in the reduced-color image data will all be converted to red, and even blue pixels in the reduced-color image data will be converted to red. Colors not present in the reduced-color image data can also be specified as the main and secondary colors.

(Example of a Two-color Print Data Generating Method)

A two-color print data generating method according to the present invention has (a) a reduced-color image data generating step for generating reduced-color image data reducing the color of each pixel in the full-color data print object to one of a specified number of colors, and (b) a print data generating step for generating two-color print data by color converting the specified colors in the reduced-color image data to a main color, secondary color, or background color.

FIG. 36 is an example of a flow chart of this two-color print data generating process.

First, full-color data is read from the full-color data storage 211 (S501). The color of each pixel in full-color data is expressed using a numerical value for the color intensity of primary colors using an RGB data format, CMY data format (CMYK data format), or other color expression method.

Next, the read full-color data is converted to reduced-color image data reduced to a specified number of colors (S502), and the converted reduced-color image data is stored to reduced-color image data memory 212 (S503). For example, full-color data denoted using the RGB format with R (=red), G (=green), and B (=blue) color intensity values ranging from 0 to 255 is compared with a threshold value predefined for each color, and a value of 0 is assigned if the color intensity value is less than the threshold value and a 1 is assigned if greater than or equal to the threshold value, generating reduced-color image data containing eight colors. A simple color reduction processing method, dithering, error diffusion, or other method can be used for color reduction processing.

Next, preset color conversion settings are read from settings storage 215 (S504) and which color conversion method is selected is determined from the read color conversion settings (S505).

If the color conversion method is a fixed conversion method (S505 returns fixed conversion), color-reduced white is set to the background color (=white) and colors other than the color-reduced white are uniformly converted to the main color or secondary color to generate the color-converted image data (S506), and the generated color-converted image data is stored to the color-converted image data storage 213 (S507). For example, the eight colors represented as digitized color intensity values based on the above-described conditions are converted to the main color (=black), secondary color (=red), and the background color (=white). Therefore, if the color of each pixel in the color-converted image data is written with (R,G,B) notation, black=(R,G,B)=(0,0,0), red=(R,G,B)=(1,0,0), and white= (R,G,B)=(1,1,1).

Next, the color of each pixel in the color-converted image data is converted to two-color print data printable by the printer using the main color and secondary color (S508), and the converted two-color print data is stored to the print data memory 214 (S509). More specifically, the color of each pixel in the color-converted image data is digitized by applying the following equation based on the combination (main color, secondary color) of digitized main color and secondary color values.

main color=(main color, secondary color)=(1,0)
secondary color=(main color, secondary color)=(0,1)
background color=(main color, secondary color)=(0,0)

Note that in step S508 the color-converted image data is converted to print data according to the specific configuration of the printer, including the print head and buffer for receiving the print data.

If the color conversion method is an adjustable color conversion method (S505 returns adjustable conversion), each specified color in the reduced-color image data is converted to the main color, secondary color, or background color according to a user-definable and editable conversion table (S514). It is also possible at this time to display an input screen for selecting the assignment of each specified color to the main color, secondary color, or background color so that the user can set and change the conversion table according to the print method, for example. For example, if H (color) is the color converted by the conversion table, the color can be defined as follows.

| | | | |
|---|---|---|---|
| main color = | H(blue), | blue = | (R,G,B) = (0,0,1) |
| secondary color = | H(green), | green = | (R,G,B) = (0,1,0) |
| main color = | H(cyan), | cyan = | (R,G,B) = (0,1,1) |
| secondary color = | H(red), | red = | (R,G,B) = (1,0,0) |
| main color = | H(magenta), | magenta = | (R,G,B) = (1,0,1) |
| secondary color = | H(yellow), | yellow = | (R,G,B) = (1,1,0) |
| main color = | H(black), | black = | (R,G,B) = (0,0,0) |

Next, the color-converted image data generated in S514 is stored to the color-converted image data storage 213 (S515). As in step S508, the color-converted image data is then converted to two-color print data printable by the printer (S516), and the converted two-color print data is stored to the print data memory 214 (S517).

The two-color print data generating method of the present invention also has a color conversion data setting step for setting the main colors and secondary colors, selecting the fixed conversion method or adjustable conversion method as the color conversion method, and setting the specific settings when the adjustable conversion method is selected.

FIG. 37 is an example of a flow chart for the color conversion data setting process. This color conversion data setting process selects the color conversion method for converting each specified color-reduction processed color to a printable color, and setting required color conversion data based on the selected color conversion method.

First, the main colors and secondary colors are set from the colors printable by the printer (S601). For example, the main color is set to black and the secondary color is set to red, both being printable by the printer. The settings can be input by the user using a keyboard, mouse, or other input device.

The color conversion method is set next (S602). More specifically, the user selects either the fixed conversion method or adjustable conversion method by way of an input device. The selected color conversion method is then evaluated (S603), and if the fixed conversion method is the color conversion method (S603 returns fixed conversion), control moves to the next step S606.

If the color conversion method is the adjustable conversion method (S603 returns adjustable conversion), the above-noted conversion table is set or changed according to the print method, for example, (S605), and control moves to the next step S606.

Finally, the settings set in steps S601, S603, and S605 are stored to the settings storage 215 (S606), and the color conversion data setting process ends.

A data storage medium according to the present invention can record a program having the steps of the above-described two-color print data generating method. In addition, the data storage medium of the present invention may be a Compact Disc, floppy disk, hard disk, magneto-optical disc, Digital Versatile Disc, magnetic tape, or memory card.

(Application with OPOS Drivers, for Example)

The two-color print data generating method of the present invention can also be applied to a device control system such as provided by OLE for Retail POS (referred to below as OPOS), a printer driver that operates under the Windows (registered trademark) operating system.

This is described with reference to FIG. 23 and FIG. 24. FIG. 23 shows the basic configuration of OPOS. In the present example device 74 is a two-color printer.

OPOS provides an interface for printers and other peripheral devices that is not model-dependent to POS application programs based on a standard specification and operating under Windows. When the POS application program 70 outputs from the printer 74, the data is passed to the printer control object (CO) 71, from there to a service object (SO) 72 corresponding to the model of the printer used for printing, and then through the operating system (Windows) 73 to the printer 74. If the printer 74 is a printer for printing two colors, it is necessary to reduce the colors in an image with many colors for printing.

Because the service objects 72 primarily handle processes specific to each device 70 in the device control system provided by OPOS, a color reduction function for generating the reduced-color image data from full-color data, a color conversion function for converting the reduced-color image data to two-color print data, and a function for selecting the color conversion method and enabling the user to control the settings of the selected color conversion method as desired according to the present invention is incorporated in the service object service object 72, and data is sent through the OS 73 to the printer 70 after conversion to printable image data.

In other words, when full-color print data is passed from the POS application program 70 to the device control system provided by OPOS, the full-color print data is converted in the service object 72 to print data for the POS printer based on the specified color reduction method and color conversion process, and then sent through the OS 73 to the printer 74. By performing such conversion processes in the service object 72, the individual application programs do not need to run a process for converting full-color data to print data, and application development can thus be made easier.

The settings screen 400 is shown in FIG. 24. An image adjustment service routine such as this color reduction from full-color data is provided in the service object 72, and displaying a screen such as shown in FIG. 24 is enabled. If color settings 401 is selected, for example, a control box 402 is displayed so that the color conversion method can be set and the brightness values (threshold values for color reduction of the full-color data) can be set. A color selection box 403 also enables selecting the printable first color and second color (main color and secondary color).

By predefining these various settings, full-color data can be automatically converted to two-color print data and printed. The settings can also be freely changed as desired according to the image.

(Applications with a Logo Data Generating Apparatus)

The two-color print data generating method of the present invention can also be applied to a logo data generating apparatus suitably used with a POS printer as described below. More specifically, a color reduction function for generating reduced-color image data from full-color data, a color conversion function for converting the reduced-color image data to two-color print data, and a function for selecting the color conversion method and enabling the user to control the settings of the selected color conversion method as desired according to the present invention are incorporated in the logo editing tool 2 and logo data generating apparatus 4 described below, which can generate two-color logo data to be saved in a two-color POS printer.

An example of a procedure for registering a logo in a printer is described first with reference to FIG. 2. FIG. 2 shows the outline of a procedure for sending to registering a logo in a printer.

To send and register logo data the logo to be registered must first be saved. This includes whether the logo to be registered is created new, whether an existing image file is used as is, and whether the file storing a logo in current use is read and edited. The color reduction method and color assignments, and the size, for example, are specified in the source data 3 editing process. The source data that is the basis for logo generation can be created new or an existing image file could be used. The logo editing tool 2 is used, for example, to create new source data 3 to match the logo printing objective. Logo data is often created for a particular printing purpose, including printing coupons, printing a company or store logo, or printing product advertising. The logo editing tool is used in such cases. Creating a specific logo using the logo editing tool is a process of creating text information, capturing a picture, photograph, or other image information, appropriately combining the text and image information to create the desired logo, and matching it to the model-specific conditions of the printer. The logo editing tool is described in detail further below.

To use existing image data as is, an image file 82 is created using a digital camera, scanner, or other general purpose image creation tool 81 and used directly as the source logo data. It is not necessary to use the logo editing tool 2 when thus using an existing image file 82 as is. Data thus created as the basis for logo creation is called the source data 3 in this specification.

The color and size of the source data are adjusted according to the printable colors, the print resolution, and the width of print paper used by in the target printer in which the logo data is registered. The logo data after adjusting the colors in the source data (by a color reduction process, for example), size, and resolution, for example, (this data may be referred to as the logo, logo data, logo information, or print image data) is what is registered in the printer 60. Note that the printable colors are determined by such as the color of ink installed to the target printer, the thermal dye colors, or the colors of the print materials of the print medium. For example, if the printer prints to white paper using colorless (black) and colored (ink) ink, the printable colors are the black, red, and white colors that can be expressed using the print materials. If the target printer is a thermal printer for printing to thermal paper coated with plural colors of thermal dye, the printable colors are the color of the thermal paper itself and the colors that can be produced with the thermal materials. Colors that can be achieved with the ink ribbon or toner installed in the target printer are also printable colors. As further described below, printable colors can also be the intermediate colors obtained by combining the colors of the print materials.

If a printer 60 is connected, such logo data is sent as is to the printer 60 and registered in logo memory 61 (nonvolatile storage) inside the printer 60. If a printer 60 is not connected to the logo editing tool, a logo data registration file for registering the logo data (logo registration file 5) is created. This logo data registration file is a command-attached image file containing the logo data and a command data set required to register the logo data. This enables the logo to be registered as a result of the host device 50 reading the logo data registration file without installing a registration program in the host device 50. The logo data registration file (logo registration file 5) is also further described below.

When a logo is registered in the logo memory 61 of the printer, the logo can be printed using a print logo command.

If a printer not having a logo memory 61 is used, the logo data is saved to nonvolatile storage provided in the host device 50 so that the logo data can be read appropriately by an application program running on the host device 50 and sent to the printer 60 for printing.

(Logo Editing Tool)

The logo editing tool is described next.

In order to register logo data in the printer the logo to be registered must first be defined. The logo editing tool is used when creating a new logo for a particular logo printing purpose. When creating a new logo, an existing picture, photograph, or other image 80 is captured using the logo editing tool 2 and combined with text data and/or other images to generate source data 3, which is the basis for an effective logo most suitable to the advertising, announcement, or other objective and comprises image data containing plural objects. Data for gray scale processing is also generated. Logo data is created for a particular printing purpose such as printing coupons, printing a corporate or store logo, or product advertisement. The source data 3 is the data used as the basis for printing, and the basic structure of the logo is defined by the logo editing tool 2. It should be noted that the logo editing tool 2 can be incorporated in the logo data generating apparatus 4.

Creating source data 3 with the logo editing tool 2 involves creating the text information, capturing the picture, photograph, or other image information, and appropriately combining the text and image information to create the data that will be the basis for creating the desired logo. Furthermore, the logo editing tool 2 can be configured so that text data can be written to create the source data 3 without bringing in an image, or so that images can be drawn. It is also possible to read and re-edit logo data already stored to a logo registration file 5, logo data stored to a bitmap file 83, or source data 3 to create the logo.

The logo editing tool is described in further detail using FIG. 3. FIG. 3 is a function block diagram of the logo editing tool 2.

The logo editing tool 2 is used to create the basic configuration of an effective logo most appropriate to the advertising, announcement, or other printing purpose. The logo editing tool 2 can be used to create source data that is the basis for a logo combining image data and text data, and the created source data can be sent as the source data to the logo data generating apparatus 4 (FIG. 2) or saved as a source data file 3.

The logo editing tool 2 comprises an image data capturing means 31, image data storage 32, image data processor 33, text data editor 34, image drawing unit 35, data merging unit 36, source data output unit 37, edit input unit 38, and image data display unit 39.

The image data capturing means 31 reads the image data or text data to obtain the basic data stored to image data storage 32. Note that data for plural images can be captured. The image data can be graphic data stored as an image file to magnetic disk, DC-ROM or other recording medium from which it is read and stored to image data storage 32, or an image can be captured from a digital camera or scanner, for example, and stored.

Data such as photographic images, animation-like graphic data, geometric shapes, styled text, and various graphic shapes can be read as the graphic data. Image data storage 32 can store plural images separately. The image data capturing means 31 is also preferably compatible with different software programs for manipulating graphics and image data so that it can read different types of image files. Data for each of the read images can be stored to image data storage 32 as independent objects or as image data.

The image data stored to the image data storage 32 is processed as necessary by the image data processor 33 to, for example, adjust image size. Using the text data editor 34, it is also possible to create and edit text data based on input from the edit input unit 38 and not just image data. It is also possible to specify a particular color for the text data. By thus also enabling text data to be edited, it is also possible to include text data for the advertisement or announcement in the logo. Yet further, graphics can be drawn directly in the logo editing tool 2 based on input from the edit input unit 38, which comprises a keyboard and mouse, for example, by also providing image drawing unit 35.

The captured image data, image-processed image data, drawings created in the logo editing tool 2, and/or text data is then merged by the data merging unit 36 to create the desired logo. The data merging unit 36 combines multiple image data objects, graphics, and text data objects to create the desired source data. Elements in combining the images and text include, for example, selecting the image or text, and specifying the size and location of each image and text object relative to the overall logo. The source data merged by the data merging unit 36 is merged as a combination of independent image and text data objects, and is output by the source data output unit 37.

It is therefore possible to read image data stored to the image data storage 32 as independent image data objects that can be freely combined or layered together. It is also possible to overlay objects created with the text data editor 34 and/or image drawing unit 35 with objects stored to image data storage 32. The layered objects can be processed independently by object in the image data processor 33 and data merging unit 36. When objects overlap, it is also possible to control and change which object is displayed in front. It is also possible to change the size of individual objects.

The image data display unit 39 can display read images, images stored to image data storage 32, and output data from the image data processor 33, data merging unit 36, text data editor 34, and image drawing unit 35.

The source data output unit 37 can send the source data directly to the logo data generating apparatus, or output it as a source logo data file. The data merging unit 36 merges the images and other objects combined in the source data so that they can be image processed or manipulated as independent images, for example. Furthermore, when the source data is output as a file, it is output as a metafile for other type of file enabling each of the merged elements to be handled separately. It will be further noted that the image data processor 33 and data merging unit 36 are shown as separate function blocks in FIG. 3, but an image processing function can be provided in the data merging unit 36 so that image size can be changed as appropriate when merging the logo elements.

In this case color reduction or other color process is not applied to the image data captured by the logo editing tool 2, but if, for example, the source picture, photograph, or other image 80 is full color, the logo editing tool 2 could be configured to store the source data 3 after first reducing the image to a constant number of colors.

(Logo Data Generating Apparatus)

The source data 3 generated by the logo editing tool 2 is changed by the logo data generating apparatus 4 to a format that can be registered in a particular specific printer to obtain the final logo data.

Note that the source data obtained by the logo data generating apparatus 4 is not limited to the source data 3 created by the logo editing tool but also includes existing image file data 82 created with an image processing program, and both types of data 3 and 82 are referred to herein as "source data".

As noted above POS printers are mainly color printers for printing two or three colors. Therefore, if the source data image is full-color or graphic data containing multiple colors (brightness, saturation, and hue), the colors of the source image must be reduced to the printable colors to enable printing on the POS printer. Even when the printer can print only a few colors, printing is not limited to two simple colors as subtle colors can also be printed. For example, if the colors usable on the printer are the two colors red and black and printing is to white paper, shades of black and red can be achieved in gradations by combining plural unit dots to form each pixel unit. It is also possible to express extremely subtle, detailed colors (expressions using intermediate colors) by combining red, black, and white (color of the paper). If the number of colors usable by the printer is three or more, even more complex, subtle printing is possible. To do this it is necessary to specify the color or intermediate color used to represent each color in the source data (this operation is also referred to as specifying color conversions or specifying the color assignments). The logo data generating apparatus 4 is used to select the color reduction method used to reduce source data colors and to specify the printable colors, and thus define the color expression of the final logo.

It is also necessary to adjust the size of the print logo according to the printing paper used because the width of the printing paper (receipt) is different on different printers. It is also necessary to adjust the size of the logo according to the print resolution because the size of the printed logo can differ according to the print resolution of the printer.

The logo data generating apparatus 4 is a device for adjusting the final image of the desired logo, determining the vertical and horizontal print resolution and the width of the paper used by the target printer storing the logo data, and specifying conversion colors as desired from among the printable colors to complete a logo enabling logo printing by the target printer. The logo data generating apparatus 4 can also set the connection port, transmission rate, parity check, flow control method, and other settings enabling communication with the target printer.

The logo data generating apparatus 4 reads and applies a conversion process (image adjustment process) matching a source data file 3 created with the logo editing tool or an existing image file 82 to the specific conditions (specifications) of the target printer to which the logo is to be registered, thus creating a logo for registration in nonvolatile storage in the target printer (note that saving this logo to the printer is also referred to in this specification as "registering" the logo). The created logo data can also be output as a logo registration file in a specific format.

(Embodiment of a Logo Data Generating Apparatus)

An example of logo data generating apparatus 4 is described with reference to FIG. 1. FIG. 1 is a function block diagram of a logo data generating apparatus according to this example.

This logo data generating apparatus 4 has a source data capture unit 10, source data image display 11, parameter data input means 12, data adjustment processor 13, logo data image display 15, logo data output means 16, and a main controller 14 for controlling the other parts.

The source data capture unit 10 gets the source data 3 or normal image file 82 from the logo editing tool 2 (FIG. 2) as controlled by the main controller 14. The source data is then stored in the source data capture unit 10. The source data capture unit 10 can read different types of files using a file reader (not shown in the figure) or image capturing means (not shown in the figure), or can capture the source data. What types of files can be read can be set appropriately. More specifically, the source data capture unit 10 can be a magnetic storage reader (such as a floppy disk drive or hard disk drive), CD-ROM drive, CD-RW drive, DVD drive, scanner, or other type of reading device.

Once the source data is captured, the main controller 14 controls the parameter data input means 12 to accept input of the image processing parameters for adjusting the image. This enables the printer name, the colors that can be printed on the printer, resolution, gradations, and other parameters to be input. The main controller 14 also controls the source data image display 11 at the same time to display the source data image on screen.

This enables the user to input the required parameter settings while viewing the source data image and studying which color reduction method to use and which colors in the source image to convert to which printable colors.

After the parameters are set, the settings are sent to the data adjustment processor 13 whereby the colors, resolution, size, and other aspects of the source data 3 are processed according to the input settings. If the image stays the same size but is printed on a lower resolution printer, the printed image will be larger. Therefore, if it is desirable to keep the size of the print image the same size as the source data image, or if the print image will be wider than the paper width because the printer resolution is low, a process to, for example, reduce the size of the print image is needed. More specifically, the size of the logo registered in the printer must be determined by adjusting the size of the source data according to both the width of the printing paper and the printer resolution. The adjusted source data 3 is then presented on the logo data image display 15 as the image after these changes are made. It is therefore possible to confirm what the print image resulting from the set parameters will be like. The image adjustment parameters can also be changed while looking at the processed image. If no parameter changes are required and the settings are confirmed, the processed logo data is sent by the main controller 14 to the logo data output means 16.

The logo data output means 16 stores the logo data or outputs the logo data as a logo registration file in a special registration format as controlled by the main controller 14, or sends and registers the logo data in the printer. The logo data output means 16 can also output the logo data adjusted to the target printer specifications as described above as a single monochrome or color bitmap image file. Files thus produced can be stored in the logo editing tool or to an external data storage medium (such as a magnetic storage medium; not shown in the figure).

Note that specifying the color assignments and image processing parameters is described more specifically below using flow charts and sample display screens.

(Data Adjustment Processor of the Logo Data Generating Apparatus)

FIG. 25 is a detailed function block diagram of the data adjustment processor 13 in a logo data generating apparatus.

As shown in FIG. 25, the data adjustment processor 13 includes a temporary source data buffer 6, image processing means 7, object read/write controller 8, and logo data storage 9. Reference letter A in FIG. 25 represents an image of source data 3, and b1, b2, b3 represent the objects in the source data. Reference letter A' represents the image (logo) after image processing by the data adjustment processor 13, and b1', b2', b3' represent the objects in the processed image A'.

The data adjustment processor is described below with particular reference to processing the objects in the source data.

Based on the file selection input from parameter data input means 12, main controller 14 controls reading source data A by source data capture unit 10 from the indicated file. Captured source data A is then stored in the source data capture unit 10.

Once source data A is captured, the main controller 14 also stores source data A to temporary source data buffer 6, and controls data adjustment processor 13 and parameter data input means 12 so that input of the parameter settings for image adjustment can be accepted. Parameter settings for selecting the target printer, selecting the printable colors of the selected printer, setting the print resolution, and setting the color reduction method can thus be input. The main controller 14 also controls the source data image display 11 to display an image of source data A on screen. Source data A is passed through the image processing means 7 and stored to logo data storage 9. If the image processing parameters are set at this time, the source data A is first processed accordingly and then stored to logo data storage 9. If no parameters are set, source data A is processed using the printable colors, print resolution, color reduction method, and other parameters initially set in the parameter data input means 12, and then stored to the logo data storage 9. The logo data stored to the logo data storage 9 is also displayed on the display screen 20 by the logo data image display 15.

It is thus possible to input specific parameters, such as what color reduction method to use for color reduction, and what colors in the source data A to convert to what printable colors, while viewing an image of the source data A.

When an object is selected using the parameter data input means 12, main controller 14 controls object read/write controller 8 to read and send the selected object from temporary source data buffer 6 to image processing means 7. The image processing means 7 then processes the image according to the input parameters, and stores it to logo data storage 9. The data stored to logo data storage 9 is also displayed by logo data image display 15.

This process is further described using FIG. 26 with reference to a case in which object b3 is selected. FIGS. 26(a) and (b) show sample displays presented on display screen 20. FIG. 26(a) shows the configuration of source data A. In this example source data A consists of a square b1, triangle b2, and circle b3 arranged as shown in FIG. 26(a). When the user points to and clicks on circle b3 with a mouse, for example, to edit circle b3, object read/write controller 8 shown in FIG. 1 reads and sends object b3 from temporary logo data buffer 6 to image processing means 7. This enables circle object b3 to be image processed. The display also changes at this time as shown in FIG. 26(b) so that circle object b3 is in front. To then edit the triangle, the user simply clicks on the triangle object.

In this example the object to be edited is brought to the front for processing, but it is also possible to display only the selected object. It could also be configured to enable specifying batch processing for all objects so that all objects are batch processed.

The process after the parameters are set by the parameter data input means 12 is described below. Note that this next process applies both to processing only selected objects and to image processing all of the source data 3 (FIG. 2). It could also be configured to simultaneously select plural objects and process all selected objects at the same time.

(Embodiment of the Gray Scale Processing Unit)

The image processing part of the logo data generating apparatus 4 is described next with reference to FIG. 27. FIG. 27 is a function block diagram of a preferred embodiment of a gray scale processing unit used in the logo data generating apparatus 4. Note that the gray scale processor 41 shown in FIG. 27 shows only the basic parts of the gray scale process.

Based on a control signal from a controller not shown in the figure, image data storage 46 reads and stores the source data image or objects of the source data image. After the source data is stored, a control signal causes the gradation processor 47 to convert the image data to gray scale data. This gray scale conversion process converts color graphic data to monochrome graphic data with no color information, similar to a black and white photograph. Color graphics usually contain hue, saturation, and brightness data, but gray scale data only contains brightness information. In other words, color images are expressed with brightness difference (gradation) information only. The brightness of one pixel in 24-bit full-color image data, for example, can be expressed converted to a 256-level gray scale value using one byte (object read/write controller 8 bits) per pixel. The resulting gray scale data is then stored in gray scale image memory 48.

If the color assignments are have been input when the source data is converted to gray scale data, the color assignment processor 49 assigns the specified colors. That is, the gray scale data is related to the assigned colors. If there is no color assignment, a default color, such as black, or the color assignments used in the most recent process, are used.

The gray scale processor 41 shown in FIG. 27 can exist as a part of the image processing means 7 shown in FIG. 25. Alternatively, the functionality of image data storage 46 shown in FIG. 27 can be provided in the temporary source data buffer 6 in FIG. 25, and the image data storage 46 in FIG. 27 omitted.

(Basic Concept of the Reduced Image Display

FIG. 28 shows an example of a reduced image display in second and third embodiments of the logo data generating apparatus further described below.

The process for presenting a reduced display after color reduction processing applies to image processes indicated at steps (1) and (2) in FIG. 28.

Image process 56 such as color reduction is applied to the source data 3 of the multicolored image A to be processed according to the input settings from input means 59. The processed image A' can be printed on the printer, stored as a logo in the printer, or output to a file.

This source data 3 image process 56 preferably displays image a of the source data 3 when inputting the settings determining how to process the image, and to confirm the settings preferably also displays the image a' after image processing using the color assignment settings. Yet further preferably, both images a and a' are reduced and displayed together on display screen 20 so that the two images can be compared at the same time on the same screen.

If the image reduction process 57 is applied after the color reduction process 56 according to an actual data process operation (that is, source data A is displayed reduced as image a by steps 3 and 4, and image a' of processed data A' from steps 1, 7, and 8 is displayed on the same screen), a dither pattern, for example, results depending on the amount of reduction, and the processed image cannot be correctly displayed.

A procedure for displaying image a of source data 3 before the color reduction process is accomplished by steps 3 and 4, but the following method is preferably used as the procedure for displaying image a' after image processing. That is, reduction process 57 is first applied to source data 3 through steps 3, 5, and 6, the same image process accomplished by steps 1 and 2 is then applied to the reduced data, and the result is preferably displayed as reduced image a' of the data A' after processing source data 3. Because the image reduction process 57 is run before the color reduction process 56, the same color is prevented from being sampled into a pattern by the data sampling step of the image reduction process 57.

The reduced image thus obtained is not really a reduced preview of the processed image. However, the image presented by this process presents a sharper, clearer image of the processed data than does an actual reduced image obtained by reducing the actual image after color reduction.

The purpose of a preview is to easily confirm an image when viewing the actual image is difficult or time-consuming. It is therefore important to accurately and clearly represent the actual image, and the process whereby the preview image is created is not important. It is therefore preferable as described above to first reduce the image for a preview display and then apply color reduction in order to achieve a sharper preview image.

(Second Embodiment of a Logo Data Generating Apparatus)

A second embodiment of a logo data generating apparatus is described next with reference to FIG. 4. FIG. 4 is a function block diagram of a logo data generating apparatus 4-2 according to this second embodiment.

This embodiment differs from the first embodiment in having an image reducing means 17 and displaying a reduced image a of the source data after the image reduction process and the logo data image a' after image processing. This enables even more efficient image processing because an image a of the source data and an image a' of the logo after changes are made can be simultaneously displayed on display screen 20.

(Third Embodiment of a Logo Data Generating Apparatus)

FIG. 5 is a function block diagram of logo data generating apparatus 4-3. This embodiment differs from the second embodiment 4-2 in that when displaying a reduced image a of the logo data or a logo data object the source data A is first sent to the image reducing means 17 and reduced to produce reduced image a, and the color data is then reduced by the data adjustment processor 13 to produce and display reduced image a'. By configuring the system to first reduce the image and then apply color reduction, the dithering noise and striping that appear when the image is reduced after color reduction can be prevented, and a preview even closer to the actual printed image can be displayed.

(Creating a Logo Registration File with the Logo Data Output Means)

As described above, the logo data output means 16 shown in FIG. 1, FIG. 4, FIG. 5, and FIG. 25 can store directly to a printer or create a bitmap logo data file, and can also create a logo registration file 5 (FIG. 2) containing embedded commands for logo registration. This logo registration file 5 is an image file with embedded commands, combining both the logo data and the command data set needed to store the logo data. When the POS terminal host reads this logo registration file 5, the logo data can be stored directly from the logo registration file 5 without installing a special program on the host. The host completes logo registration by sending the logo registration command in the read logo registration file 5 to the printer.

FIG. 6 is a function block diagram of the logo registration file output means 18 in a preferred embodiment of the logo data output means 16 for generating this logo registration file 5. Note that FIG. 6 shows only the major components, and those parts not particularly important to logo file creation are omitted.

The logo registration file output means 18 has a command data set generator 19, logo registration file generator 20, and communication interface 21. The logo registration file output means 18 receives and stores the logo data from the data adjustment processor 13. The command data set generator 19 creates the set of commands needed to store the logo output from data adjustment processor 13 in the printer. The command data set generator 19 has a registration command set generator 22 and data transmission command set generator 23. The registration command set contains executable commands sent to the printer for storing the received logo data in the target printer.

The data transmission command set generator 23 has a parameter input command set generator 24 for creating an executable command set for accepting input of communication parameters such as the communication port, a port detection command set generator 25 for producing an executable command set for detecting the communication port to which the target printer is connected, and a transmission command set generator 26 for producing a set of commands for sending the registration command set and logo data to the target printer.

The logo registration file generator 20 (called the file generator 20 below) combines the logo data (print image data), registration command set, and data transmission command set to produce logo registration file 5 (FIG. 2). This logo registration file is preferably a single file, but can be a linked set of files. Whether the transmission command set is generated, whether the parameter input command set is generated, and whether the port detection command set is generated can be specified using a controller not shown in the figure.

The logo registration file output by the logo registration file generator 20 can be sent to the host of a POS terminal to which the target printer is connected if the host is connected to the communication interface 21 via a communication line. The logo registration file can also be stored from the logo registration file generator 20 to internal memory or non-volatile (NV) memory (not shown in the figure), or can be output through an input/output interface (not shown in the figure) to floppy disk, hard disk, memory card, or other external storage device (not shown in the figure). By then causing the POS terminal host to read the logo registration file stored to floppy disk or other medium or the logo registration file sent thereto via the communication link, the host reads the command sets stored in the logo registration file and can store the logo data to the printer without installing a separate special logo registration program in the host.

The logo editing tool 2 and logo data generating apparatus 4 are described as separately configured above, but the logo editing tool 2 can be incorporated in the logo data generating apparatus 4, creating a logo data generating apparatus having a logo editing function.

It will be obvious to one with ordinary skill in the related art that the logo editing tool and logo data generating apparatus described above can be achieved using a microprocessor (CPU), ROM and RAM connected via a bus to the CPU), and an operating system (OS) and other appropriate control programs stored to the ROM and RAM. The CPU, ROM, and RAM, and the control programs stored in the ROM and RAM cooperate to function as the various function blocks. The various parts of the logo editing tool 2 and logo data generating apparatus 4 are thus achieved by integrally linking the various input devices, control programs, CPU, and storage devices.

(Logo Editing Process)

The logo editing process is described next with reference to FIG. 7 to FIG. 13. FIG. 7 is a flow chart of a preferred embodiment of the logo editing method for generating logo data, and FIGS. 8 to 13 show examples of screens presented for inputting data as part of this logo editing process.

This embodiment is described first with reference to FIG. 7.

The first step when the logo editing tool 2 starts is to select whether to create a new logo source data file, or edit a source data file previously created with the logo editing tool 2. If a new logo is created a screen such as shown in FIG. 10 for setting the logo size is displayed. Once the logo size is set, an editing screen is displayed according to the set size.

Whether to read the image data from which the source data is generated is then determined (S101). The image data is typically read from a file, but could be a source data file 3 previously generated by the logo editing tool 2, or some other existing image file. If a file is to be read (S101 returns yes), the read file is selected and read, and then stored in logo editing tool 2 (S102). If reading a file is not necessary (S101 returns no), the procedure advances to step S103. This image reading step can be skipped when editing an existing source data file 3 or if a logo is created using only text, for example.

Whether drawing or text input is necessary is then determined (S103). If it is (S103 returns yes), the input routine is run (S104). If not (S103 returns no), the procedure advances to step S105. In step S105 the size of the read image data or text data is changed, or multiple images or text objects are combined according to user input. If input is not completed (S106 returns no), steps S101 to S106 repeat on the editing screen until input for all drawing, text, and merging operations is completed. When input is completed (S106 returns yes), the result is stored internally as source data or output as a source data file (S107).

The logo editing process is further described below using examples of the display screens presented during the logo editing process as shown in FIG. 8 to FIG. 13. Note that the process described below using these sample display screens is substantially the same in content and result as the process described with reference to the flow chart in FIG. 7, but not does not correspond 1:1 to the FIG. 7 flow chart.

When the logo editing tool 2 or logo data generating apparatus 4 starts up, a main screen 100 common to both logo generation and editing and shown in FIG. 8 is presented. When the new logo button 110 in main screen 100 in FIG. 8 is clicked, the main editing screen 120 of the logo editing tool is presented as shown in FIG. 9. This main editing screen 120 includes file 121, edit 122, display 123, and tools 124 buttons in the top toolbar, and a logo editing area 127 in the middle.

Clicking the file button 121 of the main editing screen 120 presents, for example, a pulldown menu (not shown in the figure) with selections such as new, open, close, save, save as, logo size, and quit. The "new" item is used to create new logo data, and selecting it presents a dialog box 130 such as shown in FIG. 10 for specifying the size of the logo (source data). The dialog box 130 is used to define the size of the logo for which new logo data is to be created.

The "open" item (not shown in the figure) is used to open an existing file. Selecting "open" presents a file selection dialog box (not shown in the figure) from which a source data file previously created with the logo editing tool, for example, can be selected for use. The "close" item (not shown in the figure) closes the source data file being edited; if a change was made to the source data file, a prompt asking whether to save the changes is presented. The "save" item is selected to save the source data file being edited by overwriting the previous file. If "save" is selected when creating a new source data file, a dialog box asking the user to specify a name is presented. The "save as" item (also not shown) is used to save the source data file being edited under a different name. The "logo size" item (not shown in the figure) is for changing the logo size of the source data being edited, and selecting it presents the same dialog box as shown in FIG. 10 for changing the logo size of the source data. Selecting "quit" quits the logo editing tool. If a file with unsaved changes is open when quit is selected, a dialog box is presented asking whether to save the changes.

When the edit button 122 is selected from the main editing screen 120 in FIG. 9, a dialog box with selections such as undo (for reversing the previous operation), cut, copy, paste, and select all (none of which are shown in the figure) is presented. These functions are the same as in commonly available word processors and other programs.

Selecting the "paste" item pastes an object on the clipboard into the logo (source data) being edited. The types of objects that can be pasted include text, dib format, bmp format, JPEG format, and other common drawing or graphic object types, source data files created with the logo editing tool 2, logo data files created with the logo data generating apparatus 4, and any other type of graphic object that can be recognized by the editing tool. If the object on the clipboard is a bitmap object, it is treated as an image object.

Selecting "select all" selects all objects in the source data being edited. Cut, copy, move, delete, and other operations can then be applied to the selected objects.

Selecting the display button 123 from the main editing screen 120 in FIG. 9 presents a dialog box containing items such as "zoom in" for enlarging the display, "zoom out" for reducing the display, "show grid," "align to grid" for selecting whether to automatically place objects on the grid, and "define grid" for setting the X-Y grid units and alignment (none of these selections is shown in the figures).

When the tools button 124 is selected from the main editing screen 120 in FIG. 9, a dialog box (not shown in the figure) with such items as insert, text properties, image properties, input coordinates, bring to front, and send to back is presented (none of these items is shown in the figures).

When "insert" is selected a submenu with "text" and "image" items is presented (not shown in the figure). Selecting "text" enables the user to insert a text object of a specific size and position determined by clicking and dragging in the logo editing area 127. Selecting "image" similarly enables the user to insert an image object of a specific size and position determined by clicking and dragging in the logo editing area 127. When an image object is inserted, an image properties dialog box is presented for the user to select the image file to insert.

If "text properties" (not shown in the figure) is selected a text object properties dialog box 140 such as shown in FIG. 11 is presented. The font selection box 141 enables selecting from a list of WIFE fonts or TrueType fonts, for example. The supported styles of the selected font can then be selected from a list using the style selection box 142, and a supported text size can be selected from a list using the size box. Other text attributes such as underlining, color, and text object rotation can also be selected.

When "image properties" is selected an image object properties dialog box 150 such as shown in FIG. 12 is presented. When the file name of the image file to read is input to the file name box 151, the image file is read and displayed in the preview area 152. It is also possible to provide a reference button (not shown in the figure) so that files can be referenced for selection. Selecting the "fit to page" checkbox 153 changes the size of the image data to the width of the selected paper. This function automatically adjusts the image size to the width of the paper when the paper used by the printer has been defined. The image object can be set to "opaque" or "transparent" from the drawing mode 154 box. "Opaque" causes the object to print in front regardless of any background objects. "Transparent" draws objects using the result of a logical OR between the background and foreground objects.

When "input coordinates" (not shown in the figure) is selected, a dialog box 160 such as shown in FIG. 13 is presented. This dialog box enables specifying the X-Y coordinates of the top left corner of the selected object.

Selecting the "bring to front" item displays the selected object in front of all other objects, and selecting "send to back" displays the selected object in the background behind all other objects.

It will be obvious that a window menu containing selections such as stack, panes, arrange icons, and version information could also be provided.

(Generating Logo Data)

A process for generating logo data is described with reference to FIG. 14. FIG. 14 is a flow chart showing a logo data generating method according to this embodiment of the invention.

The first step is to read and store for processing a source data object from a source data file 3 prepared with the logo editing tool 2 or image file 82 as described above (S201). An image of the stored source data is then displayed on screen (such as display area 225 in FIG. 15) (S202). The objects in the source data can also be image processed according to the initial image processing settings and displayed simultaneously on screen (such as in display area 226 in FIG. 15).

Whether a particular object in the source data has been selected for image processing is then determined (S203). If no object has been selected (S203 returns no), the procedure advances to processing step S208. If an object has been selected (S203 returns yes), the selected object is read and input screens for setting the image processing parameters for the selected object are presented (such as areas 228 and 229 in FIG. 15 and the screens shown in FIG. 16 and FIG. 17) (S204). Input of image processing parameters is then detected (S205), and if image processing parameters were not input (S205 returns no), the procedure advances to the processing step (S208) while displaying the image as processed using the initial settings. If processing parameters were input (S205 returns yes), the selected object is processed using those parameters (S206) and the processed image is then displayed (S207). Note that the processed image continues to be displayed until there is a change in parameter data input (S205), and when there is a change in parameter input (S205), the image is redisplayed based on the input parameters. By thus displaying an image of the source data, the user can set parameters for the next processes, including color assignments and color reduction method, while referring to the colors, pattern, and overall impression of the source data image.

Whether to output the logo data is then confirmed (S208). The data resulting from image processing is output (S210) if logo output is selected (S208 returns yes). If the logo is not output (S208 returns no), whether the settings are completed is determined (S209). If the user has finished adjusting the image processing parameters (S209 returns yes), the logo generation process ends. If the user has not finished setting the parameters (S209 returns no), the procedure loops back to S203 and the same process repeats.

Logo output and whether parameter adjustment is completed are determined from data input to the parameter data input means. Logo data output is further described below.

(Alternative Logo Data Generating Process)

The logo data generating procedure in the reduced image display process is described next with reference to FIG. 29. FIG. 29 is a flow chart of a preferred embodiment of a logo data generating method according to the present invention. The images resulting from and related to the various steps in the flow chart in FIG. 29 are shown to the right where A is the source data image, A' is the image after image processing, a is the reduced view of image A, and a' is the reduced preview image of logo A'.

Logo generation is described according to the flow chart.

The first step is to read and store the source data objects for processing from an existing image file or source data file created with the above-described logo editing tool 2 (S401). Stored source data image A is then reduced to create reduced image a (S402). The reduced image a is then displayed on screen 20 (FIG. 6) (S403). The user can thus set the parameters for the next processes, that is, defining the color assignment and color reduction method, while referring to the colors, pattern, and overall impression of the source data image. If confirming the source data image is not necessary, this step (S402) can be skipped and the procedure can advance directly to the next step (S403) without displaying reduced image a.

The image processing parameters are then input (S404). Parameters specific to the printer model, assigning the colors achieving the best print results according to the specific functions of the printer, and other such parameters can be input at this step. Once the parameters are set the source data image A is processed according to the defined parameters to create logo A'(S405). The reduced image a is also processed according to the same image processing parameters, creating preview image a' of the logo A'(S406). It will be noted that because color reduction and other image processing steps are applied after image reduction, preview image a' does not have the dither noise or striping that otherwise occurs. At this point both reduced image a of the source data and reduced preview a' of the image A' after image processing are displayed. The user can therefore compare the images before and after image processing, and easily adjust the image processing parameters at the time the logo data is generated in order to achieve the best logo.

Whether the settings are finalized is then confirmed (S407). If input is not completed (S407 returns no), steps S404 to S407 repeat. The user can thus continue to adjust the image processing parameters while confirming what the processed image a' will look like in order to achieve the best logo. When the parameters are finalized (S407 returns yes), the logo data is output (S408).

It should be noted that while the image reduction process (S402) is provided immediately after the source data is read in FIG. 29, the image reduction step can be provided after the image processing step (S405) if a reduced view of the source data is not displayed.

The logo data generating process of this invention is further described below using the sample display screens of this logo generating process as shown in FIG. 8, FIG. 15 to FIG. 19, FIG. 30 and FIG. 31. Note that the process described below using these sample display screens is substantially the same in content and result as the process described with reference to the flow chart in FIG. 14, but not does not correspond 1:1 to the FIG. 14 flow chart.

With the logo data generating apparatus of this example a main screen 210 identical to the main screen 100 shown in FIG. 8 by the logo editing tool 2 is displayed first. This main screen 210 has a printer data input box 220 used to input the paper width, printable colors, print resolution, and other parameters specific to the printer model. A communication parameters input box 221 enables the user to specify the port, transmission speed, and other communication parameters. These printer parameters and communication parameters are preferably set automatically as much as possible by simply specifying the name of the printer in the printer data input box 220. This can be enabled by storing this model-specific data inside the printer so that when the model name is specified the specific parameters are read from the printer and set automatically.

The source data used to create a logo can be read from a desired file by inputting a file name to the source file input box 223. The reference button 224 can also be clicked to reference a selection of available files in a pulldown menu (not shown in the figure). An image of the source data is displayed in the first display area 225 and an image of the source data after it is processed according to the defined image processing parameters is displayed in a second display area 226. The most commonly used files will be source data files created by the logo editing tool 2, but providing the ability to read as many different file types as possible will make it possible to use images from a wider range of sources as the logo source data.

Reading the source image, parameter setting, and image processing are described next. FIG. 15 shows the logo editor screen 210 after a file has been read from the main screen 100 (FIG. 8) and certain parameters have been set. FIG. 15 shows reduced views of the source data image and the source data image after image processing, but it will be obvious that these images could alternatively be displayed without being reduced.

When the file name is input to the source file input box 223 of the main screen 100 (FIG. 8), the content of the specified file is read as the source data and stored to a particular address in memory. The stored source data is then reduced to display a reduced image a of the source data as shown in first display area 225 (FIG. 15) provided in the main screen 210.

The name, paper width, printable colors, resolution, and other parameters specific to the target printer can be input from the printer data input box 220, and communication port, transmission rate, bit length, and other model-specific data related to communicating with the printer can be input from the communication parameters input box 221. It is also possible to read model-specific data for the indicated printer from a model-specific data buffer (not shown in the figure) so that the model-specific data is set automatically when the printer name is input or specified. If the target printer is connected, it is further possible to automatically read a model ID from the printer to set the corresponding model-specific data automatically. The color reduction method, color assignments for color conversion to printable colors, and other parameters can also be input using the properties input box 222. When the target printer is selected from the printer data input box 220, the colors used for the color conversion selected from the properties input box 222 can be selected from the printable colors specific to that printer (black is selected as the first color and red as the second color in the color selection menus shown in FIG. 15). Selection of colors other than the printable colors from the properties input box 222 can be prohibited by not displaying colors other than the printable colors specific to the selected printer in the color selection menu of the printer data input box 220.

Reduced image a' of the data image processed according to the model-specific data and defined properties is displayed in second display area 226. Until these settings are defined the data is processed using existing settings or preset values, and the processed image is then displayed in the second display area 226 of the main screen 210. If a two-color printer is used, for example, a preview of the print image (logo) using the shades that can be achieved with three colors, that is, the two printable colors and white (a non-printing color: the color of the paper), is displayed. If the print resolution of the printer is low, the image is also displayed as a low resolution image.

It should be noted that a reduced preview of the processed image is displayed in the second display area 226 in this embodiment, but the full-size button 231 can be clicked to display the print image at the same size as the actual print image (not shown in the figure).

Defining the image data and text data properties is described next with reference to FIG. 15 to FIG. 18. The properties defined with reference to these sample screens are the properties used for image processing source data 3 created with the logo editing tool 2. As described above, source data created with the logo editing tool 2 can contain multiple image data and/or text data objects. The first step is therefore selecting the object to edit using the object selection box 227 in the properties input box 222 of FIG. 15. If image 1 is selected, image 1 is processed according to the parameters determined with the halftone definition box 228 and gray scale control box 229, and an image of the complete logo containing the processed image 1 is displayed in second display area 226. Individual image or text objects can be selected and processed by selecting the specific object from the list of all objects combined in the logo from the object selection box 227 in the properties input box 222.

The color reduction slider 237 in the halftone definition box 228 slides left to right to specify the color reduction method in varying stages from coarse to fine. For example, three levels from coarse to fine, that is, simple color reduction, dithering, error diffusion, could be used. A brightness slider 236 can also be moved sideways to set the image brightness on a sliding scale. Image brightness could be selected from five levels, for example.

When the gray scale control box 229 is on, the image can be reduced to a monochrome gray scale image; when off, the source data is reduced to all printable colors (two in this example). When reduced to a gray scale image, the monochrome color can be specified from the color input box 238, or selected from a pulldown menu.

If text object 2 is selected from the object selection box 227 of the properties input box 222, for example, the properties input box 222 shown in FIG. 15 changes to a text object properties definition box 240 as shown in FIG. 16. The user can then enter the desired text from the text input box 241, and specify the color of the text in the text color box 242 using a pulldown menu, for example.

An example of image processing individual objects is described next with reference to FIG. 30. Clicking on the menu icon of the object selection box 227 in the properties input box 222 causes a pulldown menu 245 to appear. The object to process, image 1 or image 2 in this example, can then be selected from the pulldown menu 245. An image of the object is displayed after the desired object is selected. Color reduction and brightness are controlled from the halftone definition box 228, and gray scale options are controlled, as described above. It is therefore possible to separately define how each object is processed. For example, image 1 could be processed using dithering for color reduction and no gray scale processing, while simple color reduction and gray scale conversion could be applied to image 2.

The gray scale conversion process is further described with reference to FIG. 31. Pulldown menu 245 drops down when the menu icon beside the input box 238 in the gray scale control box 229 of the properties input box 222 is clicked. The user can select the desired color from the pulldown menu 245 (black in this example). When the desired color is selected, the image is converted and displayed in the second display area 226.

An example of a screen enabling a variety of color assignments is described next with reference to FIG. 17. FIG. 17(a) shows a screen enabling settings for converting eight colors to 15 printable colors after reducing the source data to eight colors, and (b) shows a sample screen enabling settings for converting each color in source data reduced to eight colors to any of three printable colors. A color reduction method selected using the color reduction slider 237 of the above-described halftone definition box 228, or a preset color reduction method, is used as the method for reducing full-color data, for example, to eight colors.

The example shown in FIG. 17(a) applies to a printer with two printable colors. In this example the first color is black and the second is red. The eight colors of black, blue, red, magenta, green, cyan, yellow, and white are assigned to one of 15 colors by setting the color assignment sliders 251 in the assignment area 250 to a position from 0->1->2->0->12. An image of the source data is displayed at the top, and the image after color assignment is displayed at the bottom, on the right side in FIG. 15.

To describe how fifteen colors are assigned with the color assignment sliders 251 in FIG. 17, how a printer with two printable colors can print fifteen colors, and how the color assignment slider 251 specifies fifteen colors, are described referring to FIG. 18.

If there is a total of three colors, that is, two colors of ink and white, the non-printing color of the paper, and each pixel is a 2×2 matrix of four dots per pixel, each pixel can express fifteen colors by appropriately assigning a color to each of the four dots in one pixel. The relationship between these fifteen colors and the color assignment slider 251 shown in FIG. 15 is shown in FIG. 18. In FIG. 18 a black dot (•) represents black, a circle (○) represents red, and a blank represents a white dot, and the values (x,y,z) indicate the number of (white, black, red) dots in each matrix (pixel). In other words, the shade of each unit pixel is determined by the ratio of color dots in the four dots constituting each pixel.

Area a (0->1) in FIG. 18 shows matrixes containing combinations of white and black dots and shows the range (direction) from a matrix with four white dots (0) to a matrix with four black dots (1). Area b (1->2) shows matrixes containing combinations of black and red dots, and shows the range (direction) of change from four black dots to four red dots (2). Area c (2->0) shows matrixes containing combinations of red and white dots, and shows the range (direction) of change from four red dots to four white dots. Area d (0->12) shows the matrixes variously combining white, red, and black dots, and shows the range (direction) from four white to four black dots.

The relationship between the color assignment determined by the position of the color assignment slider 251 in FIG. 17 and FIG. 18 and areas a, b, and c will be understood from the figures. That is, the pixel changes gradually from white to black as the color assignment slider 251 moves from 0->1, from black to red as the slider moves from 1->2, from red to white as the slider moves from 2->0, and from white to a mixture of white, red, and black as the slider moves from 0->12.

When, for example, black is selected as the first color and a specific chromatic color other than black is selected as the second color (red in the figure) using the color selection menu in the printer data input box 220 using the screen shown in FIG. 17(a), a process for converting chromatic color parts (blue, red, magenta, green, cyan, yellow) of the source data to intermediate colors (any of areas b, c, d in FIG. 18) containing the second color (red), and achromatic parts (black) of the source data to the first color (black) or intermediate colors formed with the first color (area a in FIG. 18), is possible.

A screen for converting eight-color source data to three colors is described next with reference to FIG. 17(b). In (b) black, blue, red, magenta, green, cyan, yellow, and white in the source data reduced to eight colors are assigned to white, the first color (black), or the second color (red). The source data and an image resulting from the color assignments are also both displayed on this screen.

Furthermore, when, for example, black is selected as the first color and a specific chromatic color other than black is selected as the second color (red in the figure) using the color selection menu in the printer data input box 220 using the screen shown in FIG. 17(b), settings can be made to convert achromatic parts (black) of the source data to the first color, and chromatic color parts (blue, red, magenta, green, cyan, yellow) of the source data to the second color.

By thus enabling the user to freely select any of the colors that can be printed by the printer so that the color-reduced data of the source data image can be converted to the selected colors, expressive printing results (logo) can be achieved even with images that would be visually displeasing as a result of important color boundaries being converted to the same color with a constant, fixed color conversion process because the color assignments can be easily changed. Furthermore, by using dithering and dot gradation to increase the number of convertible colors and enabling the user to assign the printable colors as desired, logo expressiveness can be improved even with printers having little color capability (such as two color printers).

While the source data that can be selected for color processing as determined by the properties input box 222 is limited in the above description to source data files created by the logo editing tool 2, it is also possible to design the object selection box 227 so that other existing image files can be selected as the source data so that source data from existing image files can be selected for color processing in the same way.

The main logo data generating screen 21 shown in FIG. 15 also has the following buttons: edit 230, print test 232, file output 233, printer registration 234, non-volatile memory management 235, and quit 246.

The edit button 230 starts the logo editing tool, and is used to re-edit a logo data file. When editing with the logo editing tool is finished, the logo data generating apparatus reads the content of the file being used (the edited content), and creates a logo reflecting the changes made. It is also possible to restrict editing with the edit button 230 to when the source data file of a logo being created is a file created with the logo editing tool 2.

The print test button 232 is used to actually print the created logo data on the connected target printer. The logo data is not registered in the printer at this time.

The non-volatile memory management button 235 enables printing or deleting NV graphics (NV: non-volatile) stored in the target printer. Pressing the non-volatile memory management button 235 displays a non-volatile memory management dialog box 260 such as shown in FIG. 19. Pressing the get key codes button 261 reads the key codes of the NV graphics stored to the connected printer and displays them as a list in the NV graphics key code list area 262.

Clicking the select all button 263 selects all of the key codes displayed in the NV graphics key code list area 262.

The selected key codes can be printed or deleted. Printing and deleting the selected key codes is selected using the print button 264 and delete button 265 at the bottom of the dialog box 260. The cancel button 267 deselects the key codes selected in the key code list. The NV graphics corresponding to the listed key codes are stored in the logo data generating apparatus. Pressing the print button 264 reads and prints the graphics corresponding to the selected key codes. The key code can be printed in the header of the NV graphic.

The delete button 265 deletes the graphics corresponding to the selected key codes from internal memory. An alert is displayed before the file is deleted so that the user can confirm the deletion. Clicking the close button 266 closes the NV management dialog box 260 and returns to the main screen 210.

(Creating the Logo Registration File)

The process for creating the logo registration file is described in further detail below with reference to a flow chart. FIG. 20 is a flow chart of the general process for creating the logo registration file 5 after the logo data is created.

The logo data (logo) is first created according to the procedure described with reference to FIG. 7 and FIG. 14 by the data adjustment processor 13 (shown in FIG. 1, FIG. 4, FIG. 5, FIG. 25) (S310). After the logo data is completed, a command data set is generated (S330), and the logo data and command set are combined to produce the logo registration file 5 (FIG. 2) (S340). The resulting logo registration file 5 is then stored to floppy disk and/or sent to the target printer host (S350).

FIG. 21 is a flow chart showing the step (S330) shown in FIG. 20 for creating the command data set in detail.

After the logo data is completed (FIG. 20, S310), a registration command set run by the printer to register the logo data in the printer is generated (S331). The registration command set is a set of commands run by the target printer to store the logo data in non-volatile memory inside the printer.

After the registration command data set is completed (S331), whether the data transmission command set is to be added to the executable command set is determined (S332). The system can be configured so that adding the data transmission command set is optional according to the logo registration file type.

If the data transmission command set is not added (S332 returns no), the procedure advances to the logo registration file generating step S340. If the data transmission command set is to be added (S332 returns yes), the data transmission command set is created (S333). The data transmission command set is a set of commands for sending the logo data and registration command set from the host to the target printer. This enables the host to send the registration command set and logo data to the target printer automatically when the host reads the image data storage file or when the communication port number and other specific parameters are set.

Whether to include a port detection command set in the data transmission command set is then determined (S334). If it is necessary to include the port detection command set (S334 returns yes), the port detection command set is created. If the port detection command set is unnecessary (S334 returns no), the parameter input command set is created (S336).

FIG. 22 is a detailed flow chart of the logo registration file generating step (S340, FIG. 20).

After the command data set is created (S330, FIG. 20), the logo registration file generating step (S340 in FIG. 22) starts. The first step in this logo registration file generating routine is to create an executable command data set 41 containing the command set and logo data (print image data) to which the registration command set has been added (S341). This is indicated to the left of step S341 in FIG. 22. The logo data can be stored in the printer by sending this file containing the registration command set and logo data from the host to the target printer.

It is then determined (S342) whether the data transmission command set was generated in the command data set generating routine (S330). If it was not (S342 returns no), the executable command data set 41 from step S341 is output as the logo registration file 5. If the data transmission command set was also generated (S342 returns yes), whether the port detection command set is also present is determined (S343). If the port detection command set was also created (S343 returns yes), the port detection command set is combined with the data transmission command set (S344). If the port detection command set was not created (S343 returns no), the parameter input command set is combined (S346).

A combined data set 42 (shown on the left side in FIG. 22) combining a data transmission command set with the executable command data set 41 generated in step S341 is then created (S345).

If the port detection command set is included in the data transmission command set in the combined command data set 42, the port detection command is run when the logo registration file is read by the host, the communication port to which the printer is connected is automatically detected, and the registration command set and logo data are automatically sent from the host to the printer.

If the parameter input command set is included in the data transmission command set of the combined command data set 42 (FIG. 22), the parameter input command set is run when the host reads the logo registration file so that the communication port and other communication parameters can be specified from the host. When the communication parameters are set, the registration command set and logo data are sent to the printer from the specified communication port.

[Effect of the Invention]

The effect of the present invention as described above is described below. Full-color data can be easily converted to two-color print data by generating reduced color image data reducing full-color data to a specific number of specified colors, such as eight colors, and converting the generated reduced-color image data to color-converted image data converted to a main color, secondary color, or background color based on a predefined color conversion method.

It is also possible to generate color-converted image data in which colors not present in the reduced-color image data are converted to the main color and/or secondary color. That is, color-converted image data having red pixels can be produced even when there are no red pixels in the reduced-color image data by setting red to the main color and/or secondary color.

BRIEF DESCRIPTION OF THE DRAWINGS

FIG. 35 shows an example of a conversion table used in a fixed conversion method;

KEY TO THE FIGURES

Figure 1:
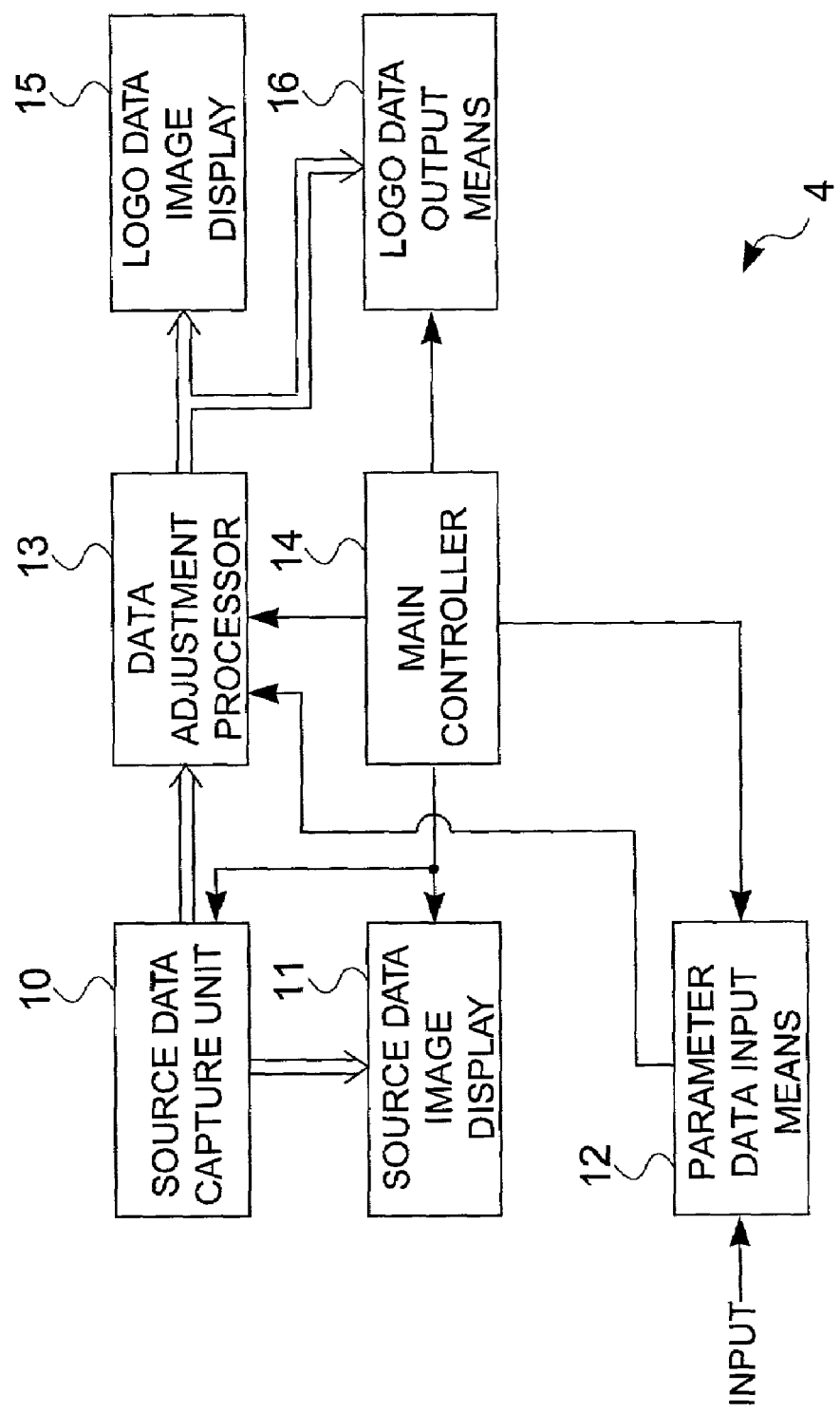
FIG. 1 is a function block diagram of a logo data generating apparatus applying a two-color print data generating method according to a preferred embodiment of the present invention.

101 two-color data generator
201 color-reduced image data generator
202 color conversion unit
203 print data conversion unit
204 color conversion selection unit
205 print data generating unit
211 full-color data storage
212 reduced-color image data memory
213 color-converted image data storage
214 print data memory
215 settings storage

| TEXT IN THE FIGURES |
|---|

FIG. 1

Figure 2:
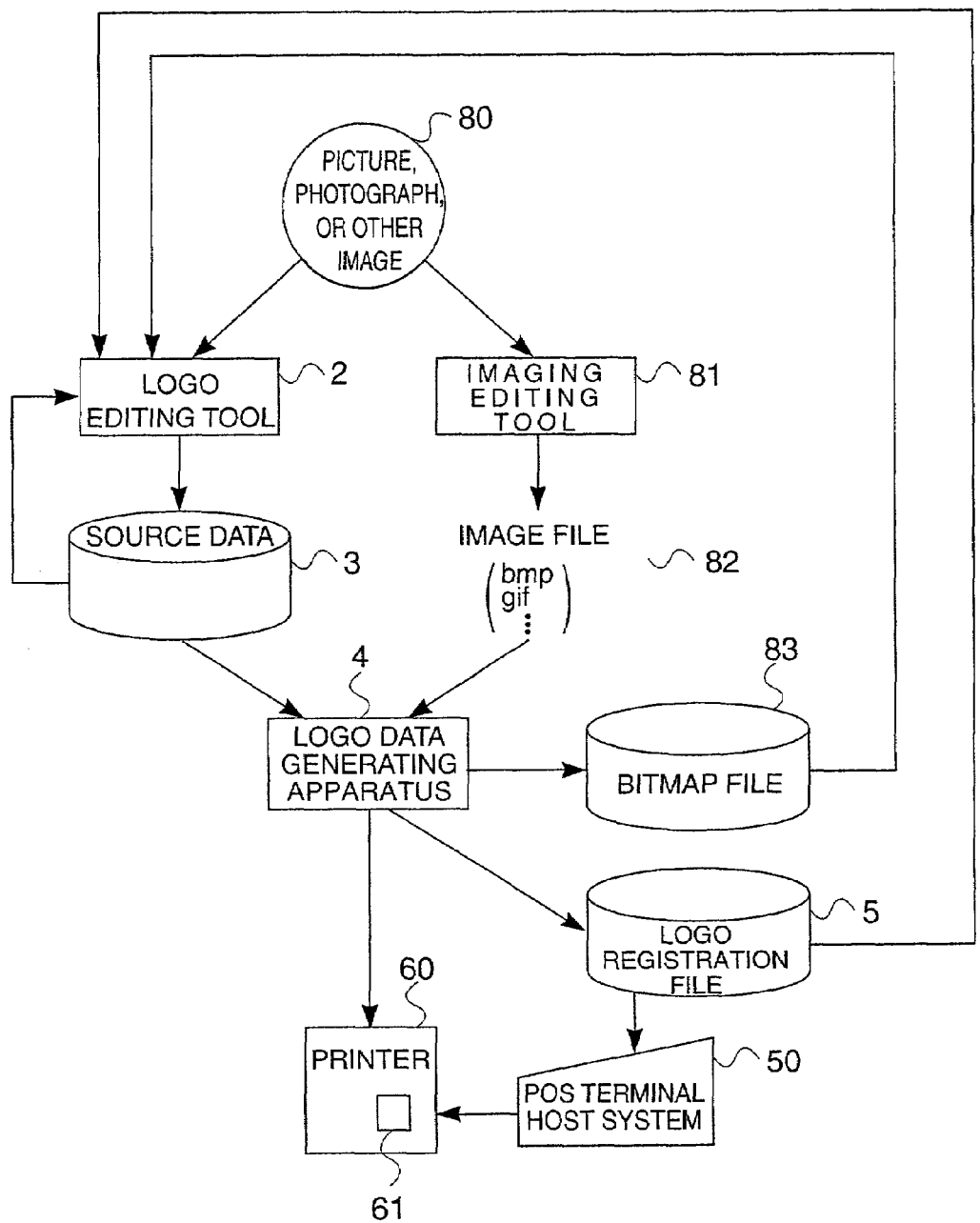
FIG. 2 schematically illustrates the process for storing a logo using a logo editing tool and logo data generating apparatus.

SOURCE DATA CAPTURE UNIT 10
SOURCE DATA IMAGE DISPLAY 11
INPUT --> PARAMETER DATA INPUT MEANS 12
DATA ADJUSTMENT PROCESSOR 13
MAIN CONTROLLER 14
LOGO DATA IMAGE DISPLAY 15
LOGO DATA OUTPUT MEANS 16
FIG. 2

Figure 3:
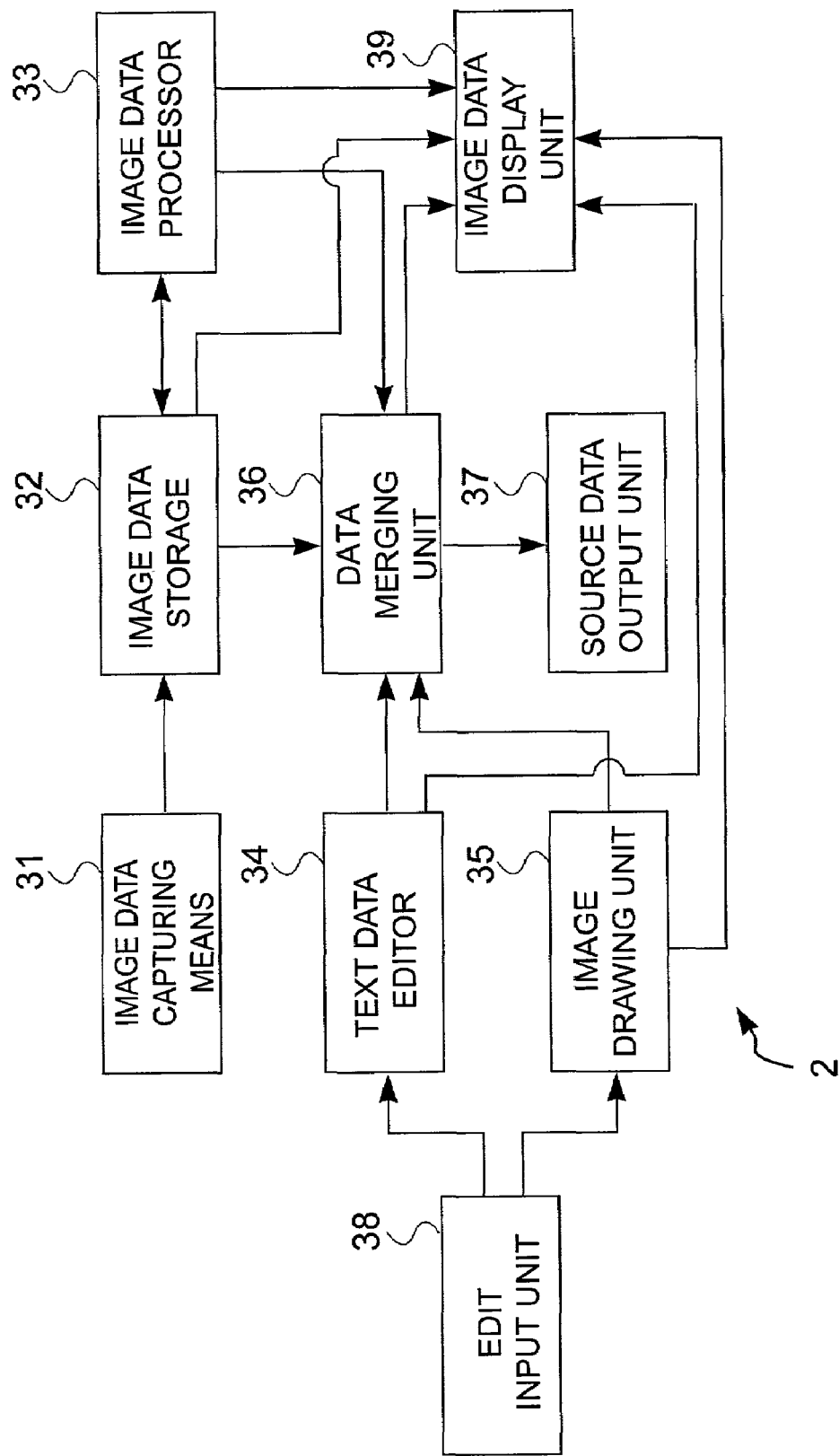
FIG. 3 is a function block diagram of a preferred embodiment of a logo editing tool.
Figure 4:
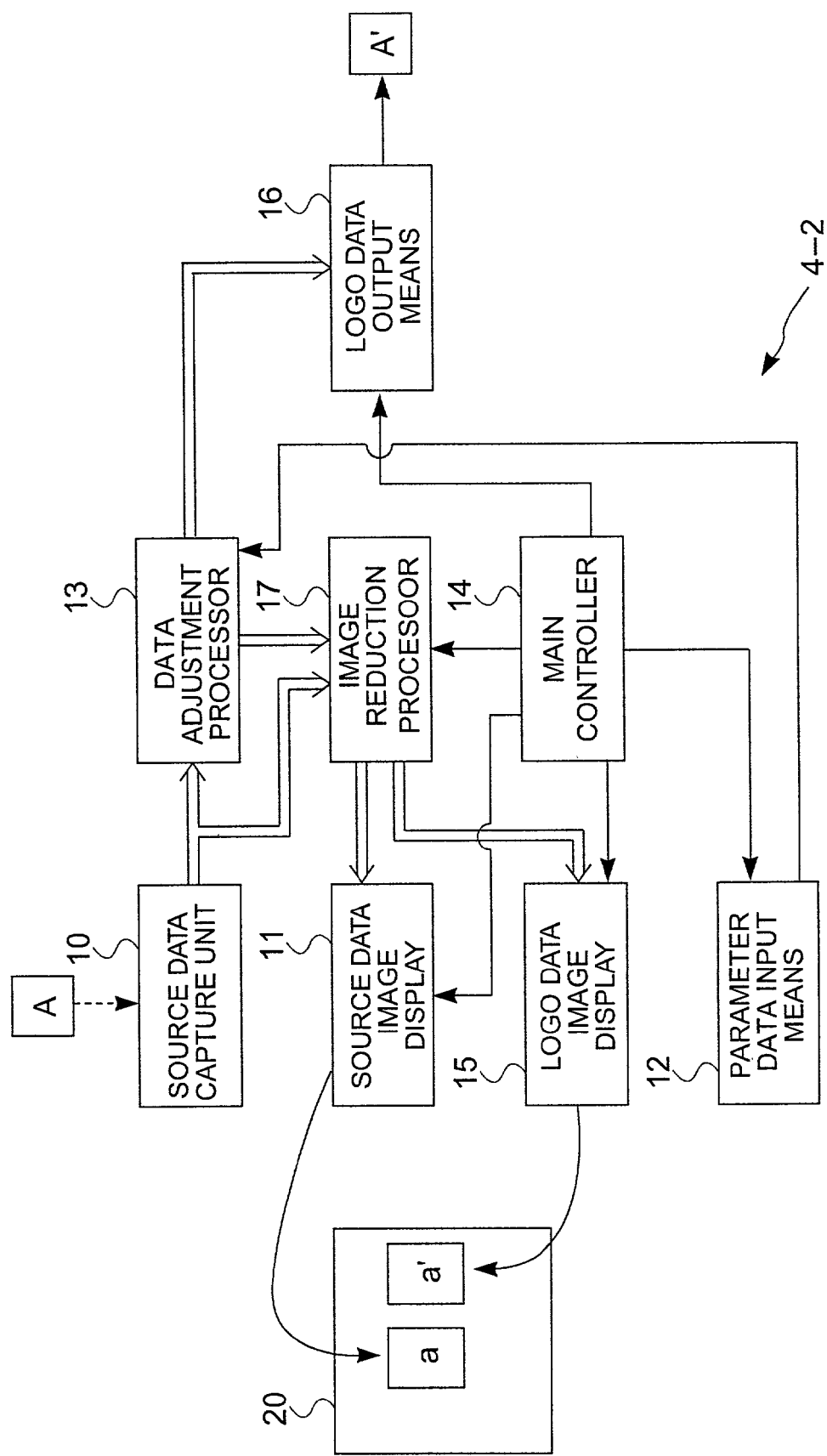
FIG. 4 is a function block diagram of a logo data generating apparatus.

PICTURE, PHOTOGRAPH, OR OTHER IMAGE 80
LOGO EDITING TOOL 2
SOURCE DATA 3
LOGO DATA GENERATING APPARATUS 4
PRINTER 60
IMAGING EDITING TOOL 81
IMAGE FILE 82
BITMAP FILE 83
LOGO REGISTRATION FILE 5
POS TERMINAL HOST SYSTEM 50
FIG. 3

IMAGE DATA CAPTURING MEANS 31
IMAGE DATA STORAGE 32
IMAGE DATA PROCESSOR 33
TEXT DATA EDITOR 34
IMAGE DRAWING UNIT 35
DATA MERGING UNIT 36
SOURCE DATA OUTPUT UNIT 37

-continued

| TEXT IN THE FIGURES |
|---|

EDIT INPUT UNIT 38
IMAGE DATA DISPLAY UNIT 39
FIG. 4

Figure 5:
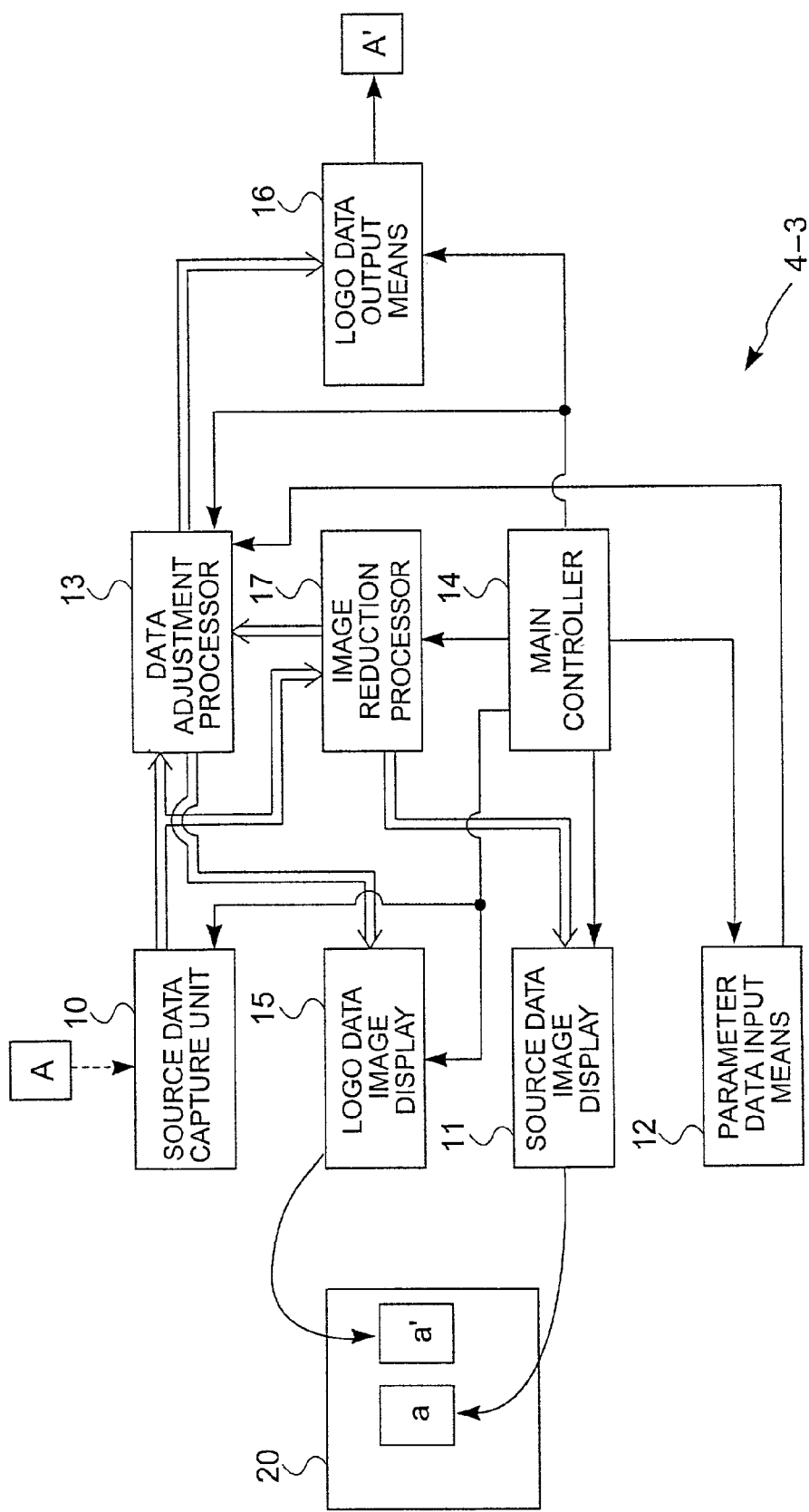
FIG. 5 is a function block diagram of a logo data generating apparatus.

SOURCE DATA CAPTURE UNIT 10
SOURCE DATA IMAGE DISPLAY 11
PARAMETER DATA INPUT MEANS 12
DATA ADJUSTMENT PROCESSOR 13
MAIN CONTROLLER 14
LOGO DATA IMAGE DISPLAY 15
LOGO DATA OUTPUT MEANS 16
IMAGE REDUCTION PROCESSOR 17
FIG. 5

Figure 6:
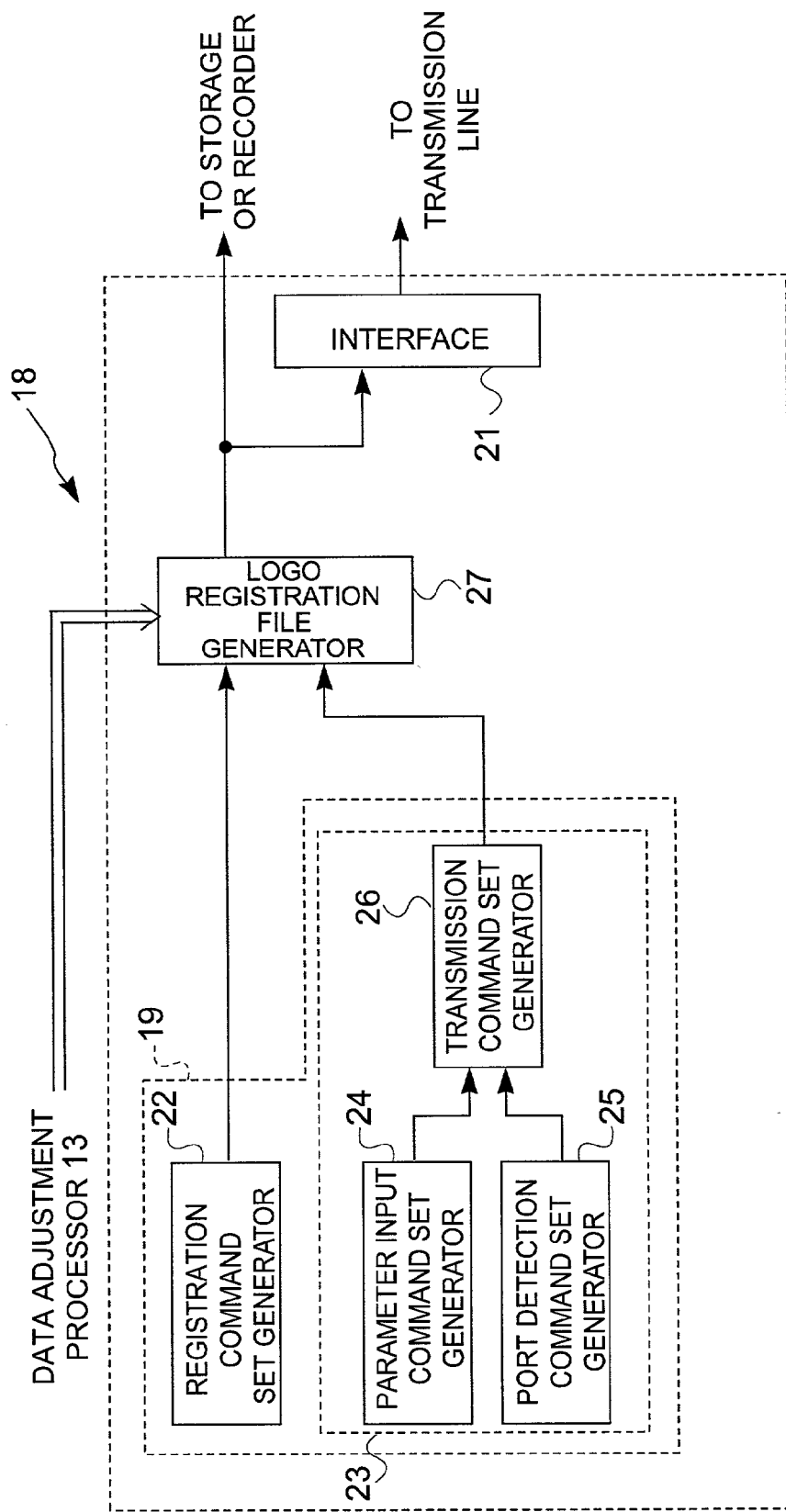
FIG. 6 is a function block diagram of a logo registration file output means 18 according to a preferred embodiment of a logo data output means 16 for generating a logo storage file.

SOURCE DATA CAPTURE UNIT 10
SOURCE DATA IMAGE DISPLAY 11
PARAMETER DATA INPUT MEANS 12
DATA ADJUSTMENT PROCESSOR 13
MAIN CONTROLLER 14
LOGO DATA IMAGE DISPLAY 15
LOGO DATA OUTPUT MEANS 16
IMAGE REDUCTION PROCESSOR 17
FIG. 6

Figure 7:
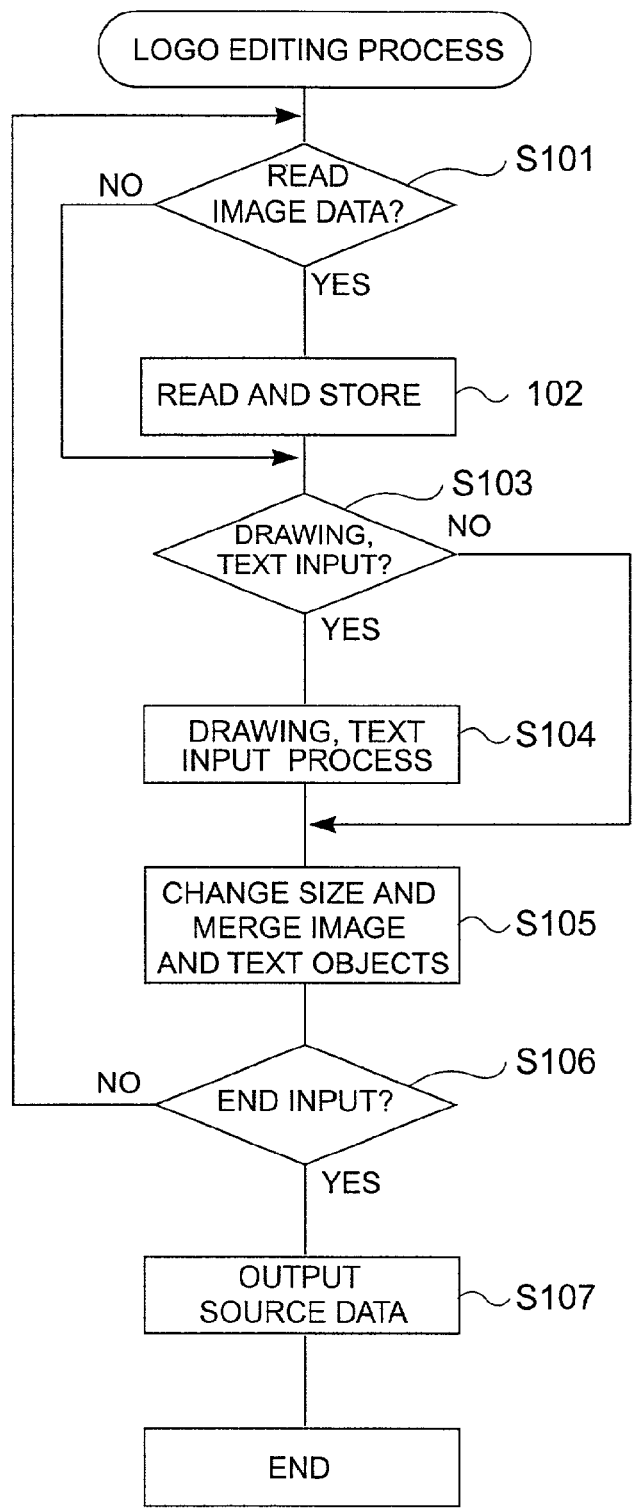
FIG. 7 is a flow chart of a preferred embodiment of a logo editing method for creating source data.

DATA ADJUSTMENT PROCESSOR 13
REGISTRATION COMMAND SET GENERATOR 22
PARAMETER INPUT COMMAND SET GENERATOR 24
PORT DETECTION COMMAND SET GENERATOR 25
TRANSMISSION COMMAND SET GENERATOR 26
LOGO REGISTRATION FILE GENERATOR 27
INTERFACE 21
--> TO STORAGE OR RECORDER
--> TO TRANSMISSION LINE
FIG. 7

Figure 8:
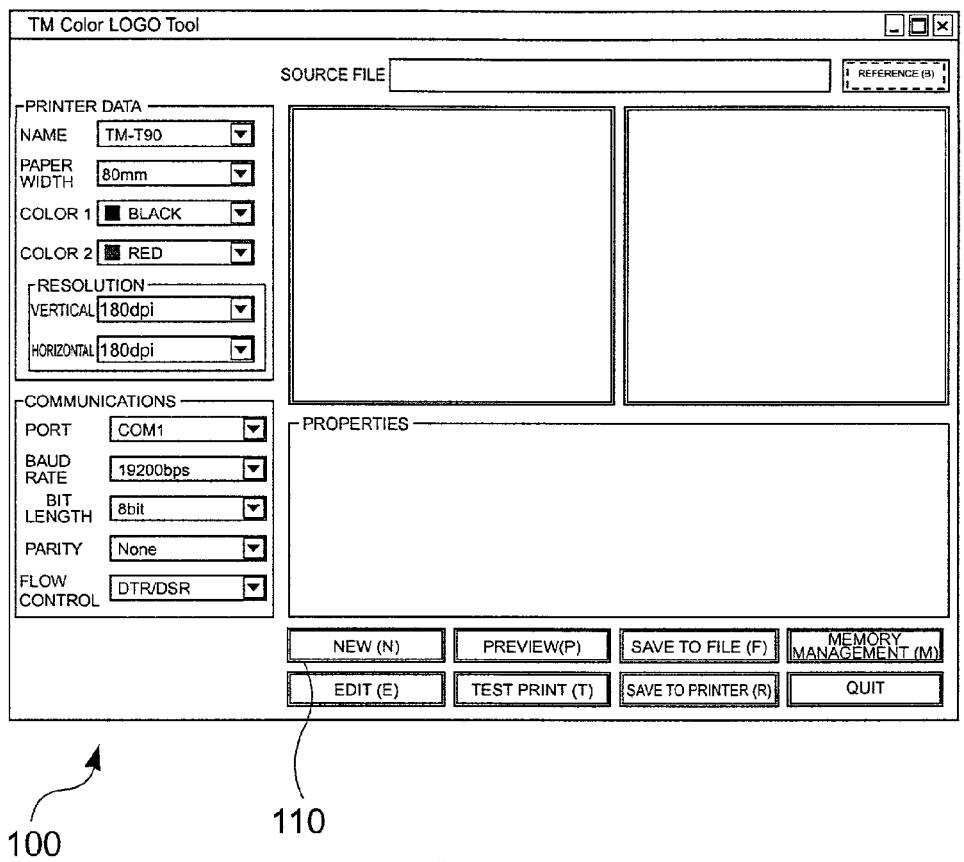
FIG. 8 shows a preferred embodiment of the main screen of a logo editing tool or logo data generating apparatus.

LOGO EDITING PROCESS
S101 READ IMAGE DATA?
S102 READ AND STORE
S103 DRAWING, TEXT INPUT?
S104 DRAWING, TEXT INPUT PROCESS
S105 CHANGE SIZE AND MERGE IMAGE AND TEXT OBJECTS
S106 END INPUT?
S107 OUTPUT SOURCE DATA
END
FIG. 8

Figure 9:
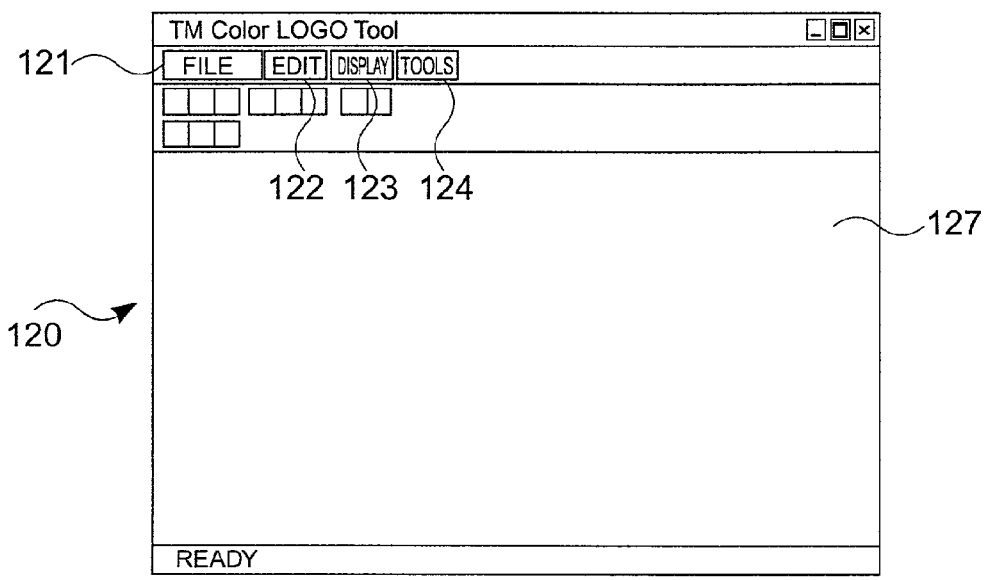
FIG. 9 shows an example of the main editing screen according to preferred embodiment of a logo editing tool.
Figure 10:
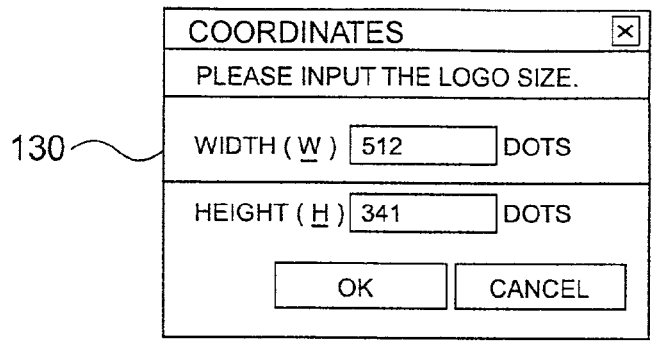
FIG. 10 shows an example of a size input dialog box displayed to specify the size of the logo (source data) when creating new source data using the logo editing tool.

SOURCE FILE     REFERENCE
PRINTER DATA
    NAME
    PAPER WIDTH
    COLOR 1
    COLOR 2
    RESOLUTION
        VERTICAL
        HORIZONTAL
COMMUNICATIONS
    PORT
    BAUD RATE
    BIT LENGTH
    PARITY
    FLOW CONTROL
PROPERTIES
NEW PREVIEW     SAVE TO FILE     MEMORY
                                 MANAGEMENT
EDIT TEST PRINT  SAVE TO PRINTER  QUIT
FIG. 9

FILE    EDIT    DISPLAY    TOOLS
READY
FIG. 10

Figure 11:
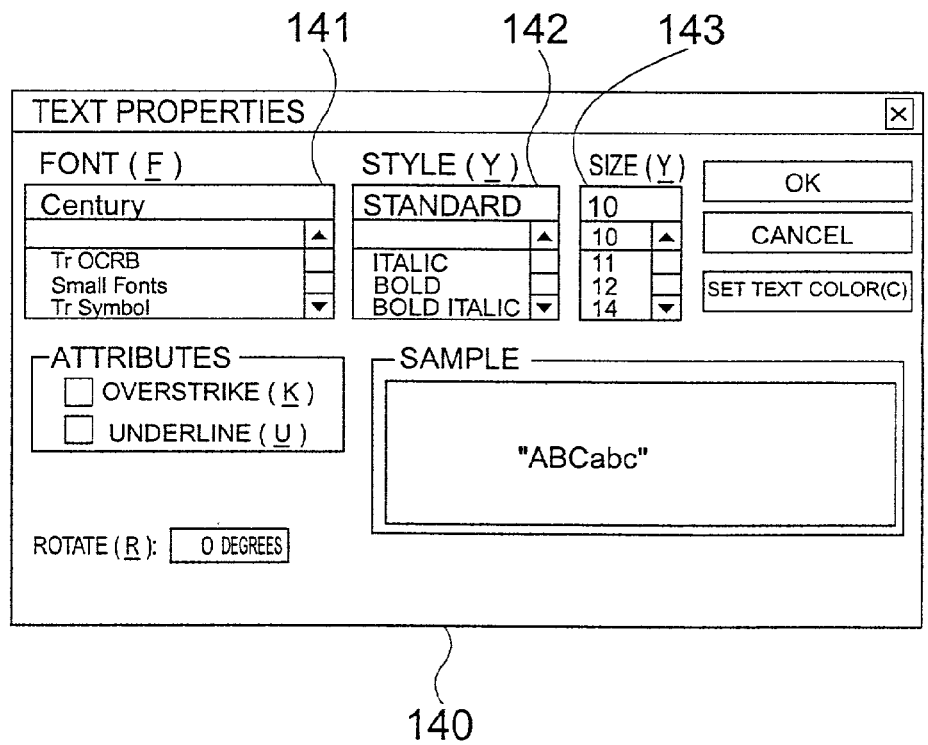
FIG. 11 shows an example of a text property input screen displayed to set text properties when editing the source data.

COORDINATES
PLEASE INPUT THE LOGO SIZE.
    WIDTH (W):    512 DOTS
    HEIGHT (H):   341 DOTS
    OK      CANCEL
FIG. 11

Figure 12:
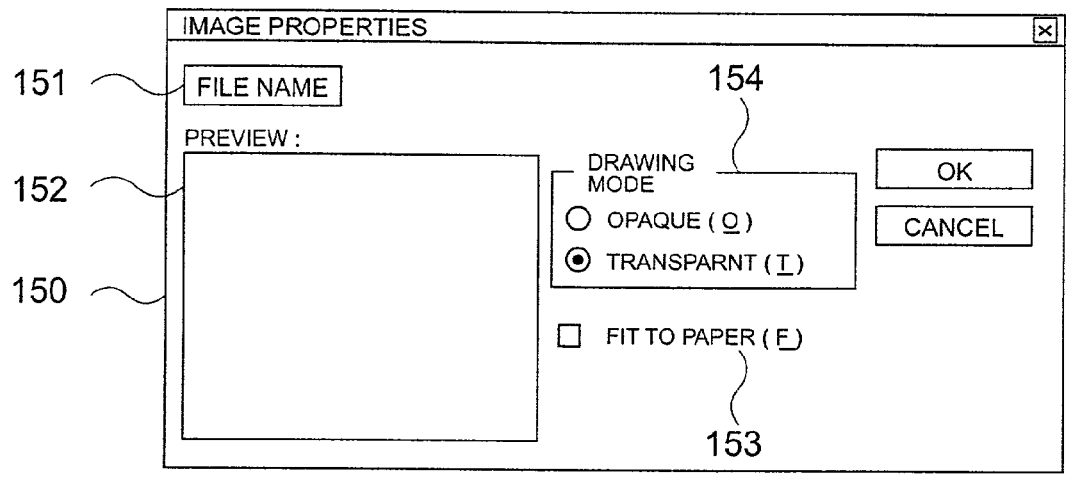
FIG. 12 shows an example of an image property input screen displayed to set image properties when creating or editing source data using the logo editing tool.
Figure 13:
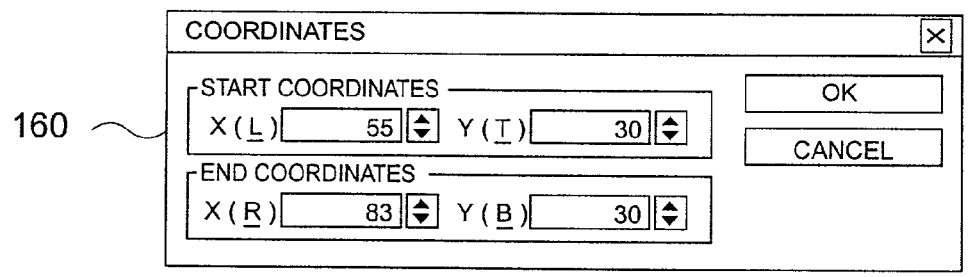
FIG. 13 shows an example of a position input screen displayed to specify the position of a logo using the logo editing tool.
Figure 14:
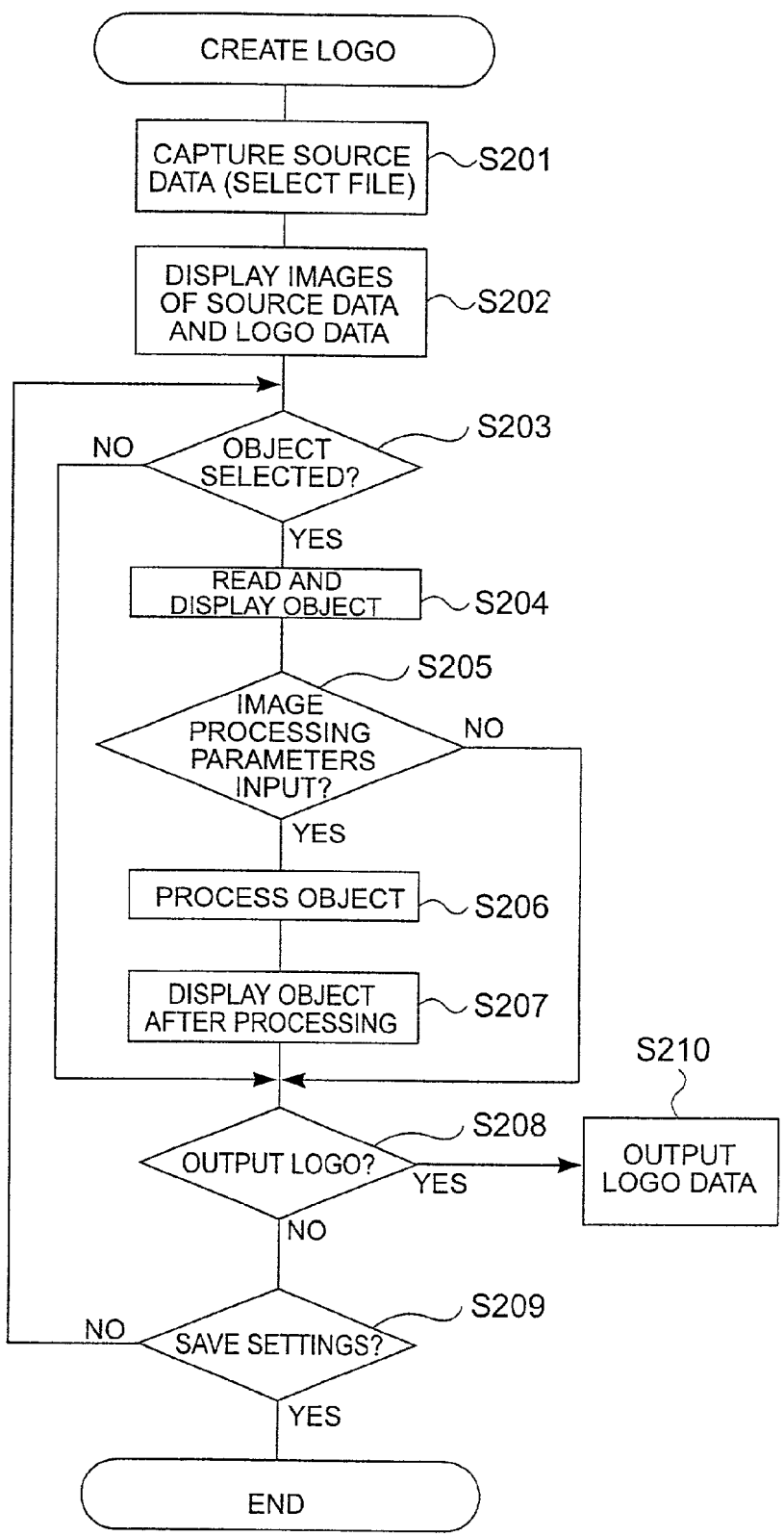
FIG. 14 is a flow chart showing a preferred embodiment of the logo generating method.
Figure 15:
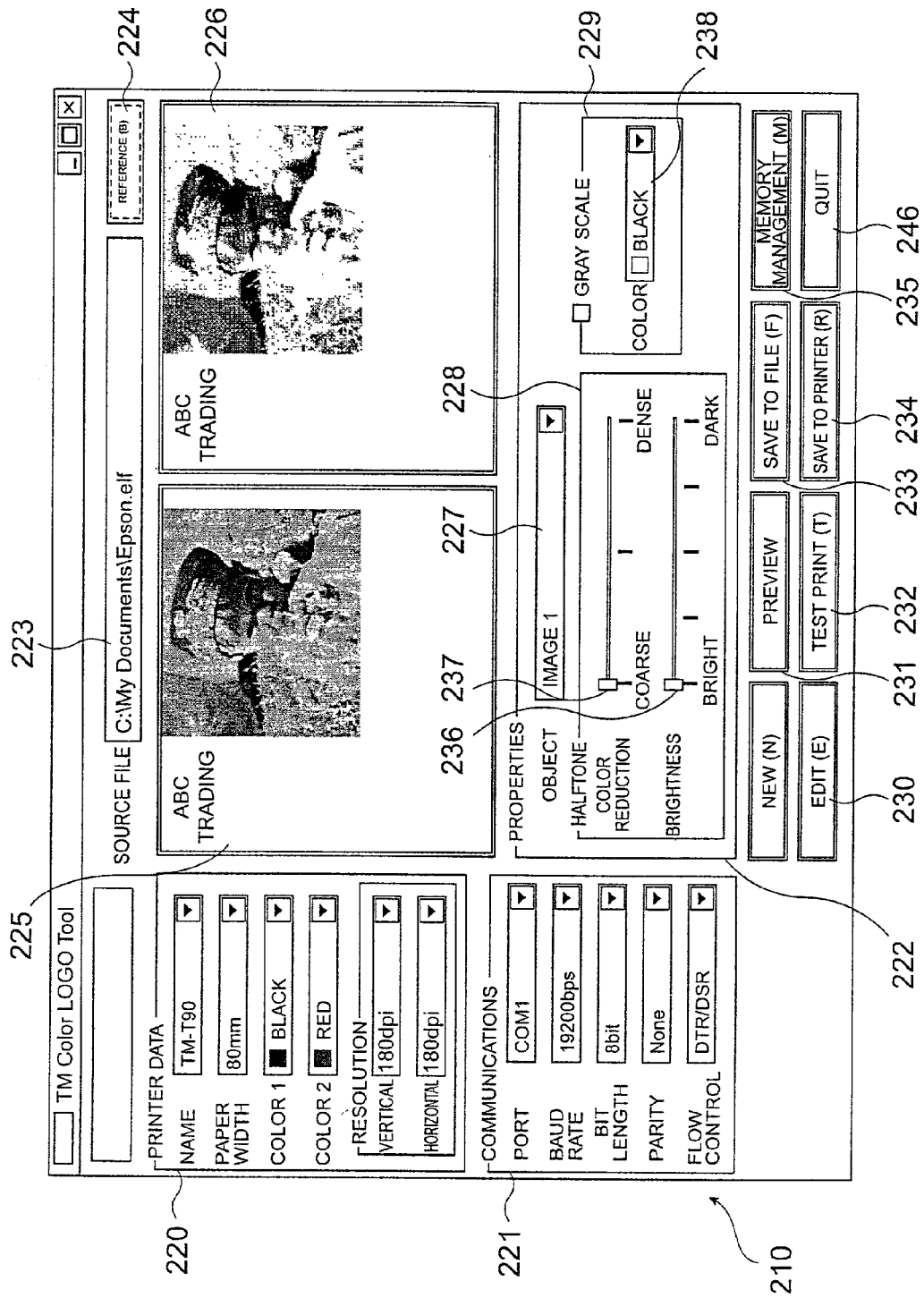
FIG. 15 shows an example of a logo editing screen used to set the parameters for reading the source data and generating the logo data.
Figure 16:
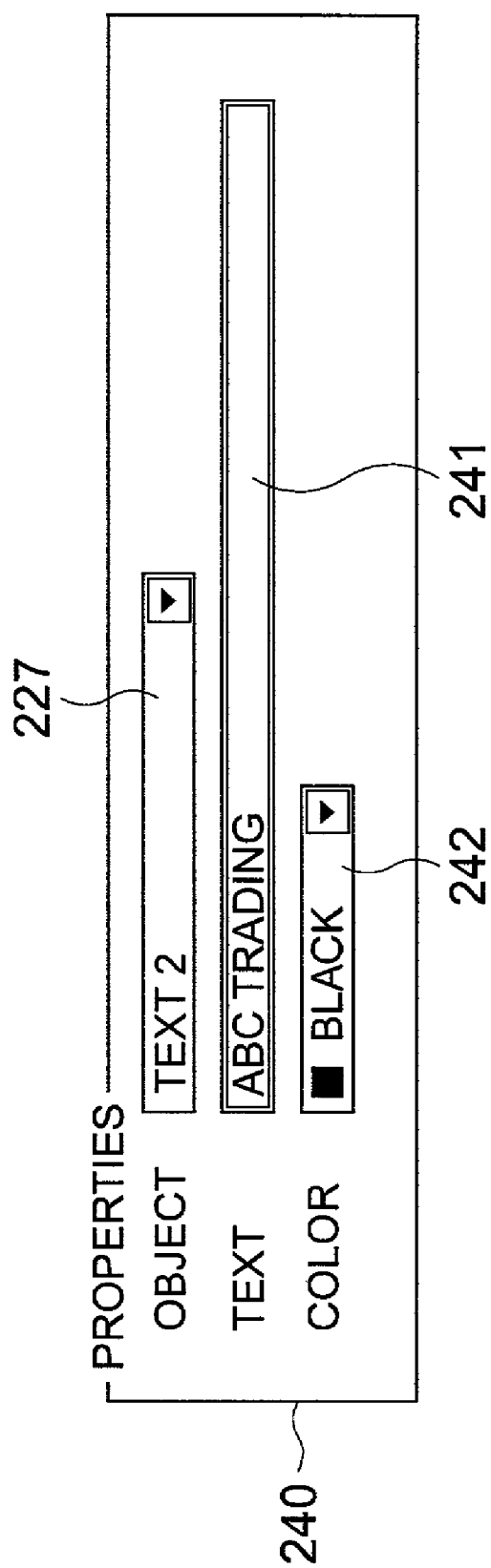
FIG. 16 shows an example of a property input dialog box displayed by the logo data generating apparatus to input text data in the properties input box.
Figure 17:
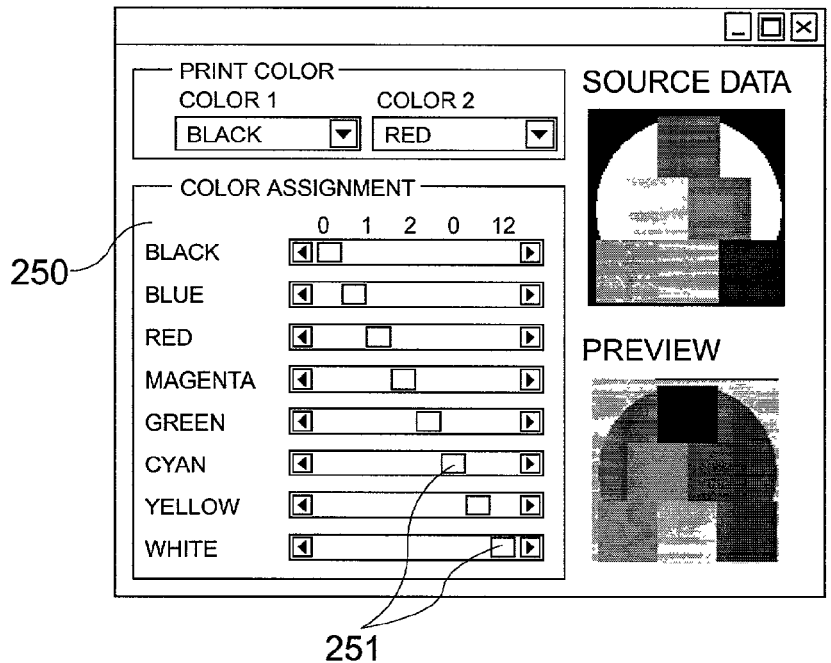
FIG. 17 shows an example of a screen for defining numerous color assignments, (a) showing an example of a screen in which 15 colors can be assigned to eight colors after reducing the source data to eight colors, and (b) showing an example in which three colors are assigned to source data reduced to eight colors.
Figure 17:
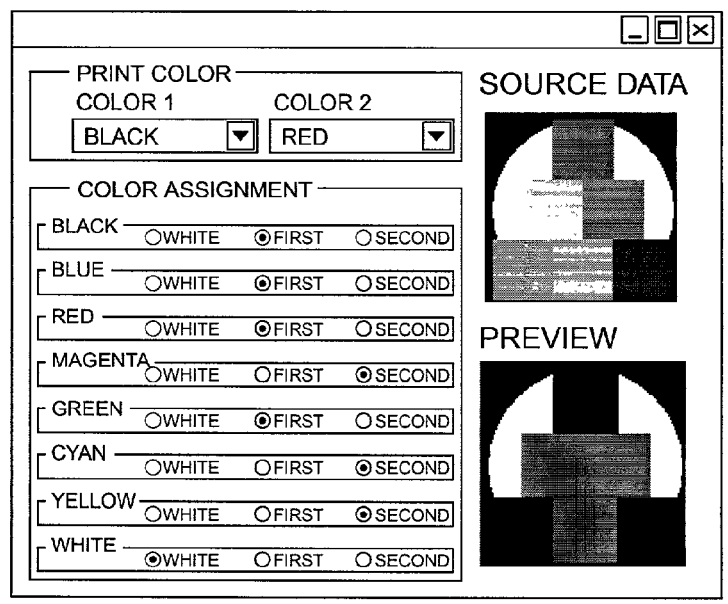

| TEXT IN THE FIGURES |
|---|
| TEXT PROPERTIES<br>FONT   STYLE      SIZE  OK/CANCEL<br>       STANDARD<br>       ITALIC<br>       BOLD<br>       BOLD ITALIC   SET TEXT COLOR<br>ATTRIBUTES      SAMPLE<br>       OVERSTRIKE<br>       UNDERLINE<br>ROTATE    0 DEGREES<br>FIG. 12<br><br>IMAGE PROPERTIES     OK/CANCEL<br>FILE NAME<br>PREVIEW     DRAWING MODE<br>             OPAQUE<br>             TRANSPARENT<br>FIT TO PAPER<br>FIG. 13<br><br>COORDINATES     OK/CANCEL<br>START COORDINATES<br>END COORDINATES<br>FIG. 14<br><br>CREATE LOGO<br>S201 CAPTURE SOURCE DATA (SELECT FILE)<br>S202 DISPLAY IMAGES OF SOURCE DATA AND LOGO DATA<br>S203 OBJECT SELECTED?<br>S204 READ AND DISPLAY OBJECT<br>S205 IMAGE PROCESSING PARAMETERS INPUT?<br>S206 PROCESS OBJECT<br>S207 DISPLAY OBJECT AFTER PROCESSING<br>S208 OUTPUT LOGO?<br>S209 SAVE SETTINGS?<br>S210 OUTPUT LOGO DATA<br>END<br>FIG. 15<br><br>SOURCE FILE    REFERENCE<br>PRINTER DATA<br>    NAME<br>    PAPER WIDTH<br>    COLOR 1<br>    COLOR 2<br>    RESOLUTION<br>        VERTICAL<br>        HORIZONTAL<br>COMMUNICATIONS<br>    PORT<br>    BAUD RATE<br>    BIT LENGTH<br>    PARITY<br>    FLOW CONTROL<br>PROPERTIES<br>    OBJECT<br>    HALFTONE<br>        COLOR REDUCTION<br>        BRIGHTNESS<br>        GRAY SCALE<br>           COLOR  BLACK<br>NEW PREVIEW  SAVE TO FILE   MEMORY<br>                              MANAGEMENT<br>EDIT TEST PRINT  SAVE TO PRINTER   QUIT<br>FIG. 16<br><br>PROPERTIES<br>    OBJECT   TEXT 2<br>    TEXT     ABC TRADING<br>    COLOR    BLACK<br>FIG. 17<br><br>CONVERT 8 COLOR DATA TO 15 COLORS<br>PRINT COLOR<br>    COLOR 1   COLOR 2<br>    BLACK     RED |

Figure 18:
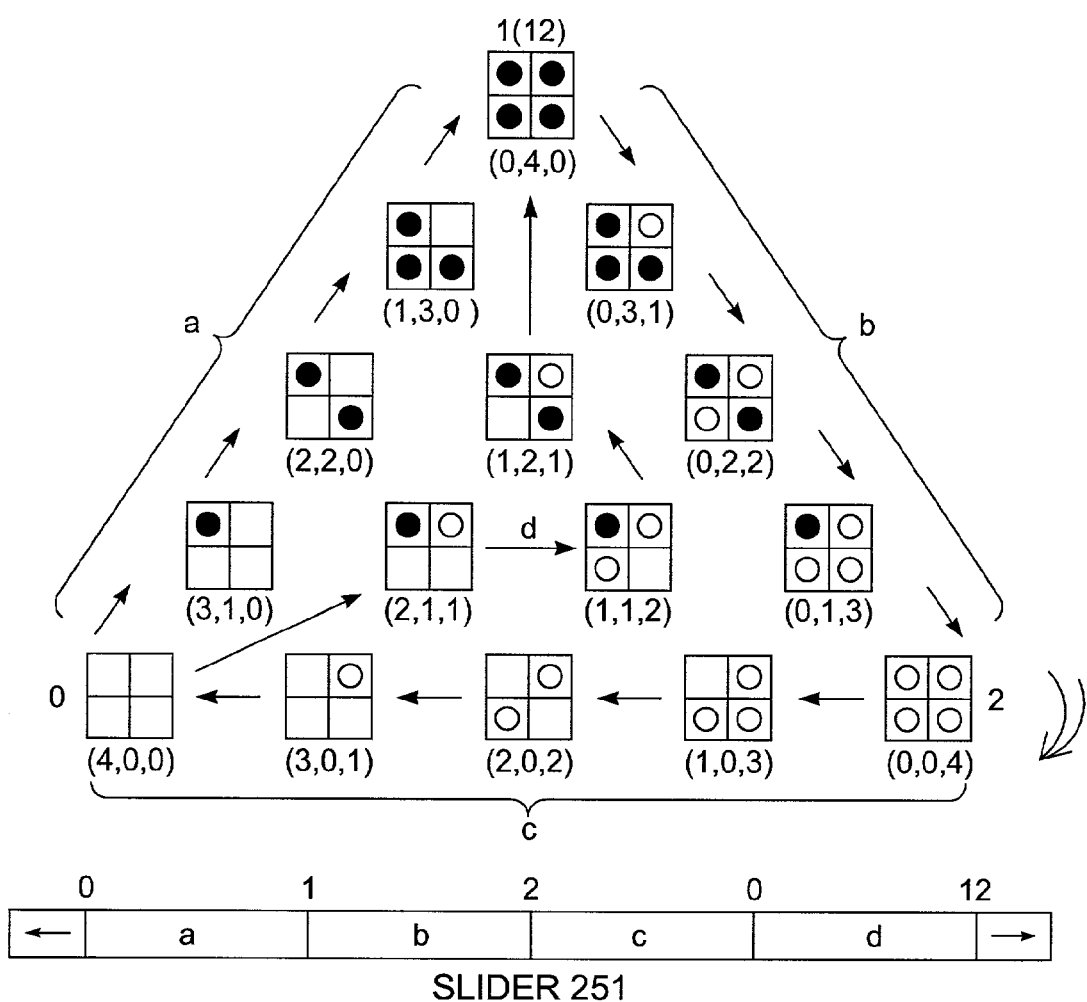
FIG. 18 shows the relationship between the color assignment slider 251 shown in FIG. 15 and the 15 colors that can be expressed using four dots per pixel in a printer that can print two colors (three colors in including the non-printing color) per dot.
Figure 19:
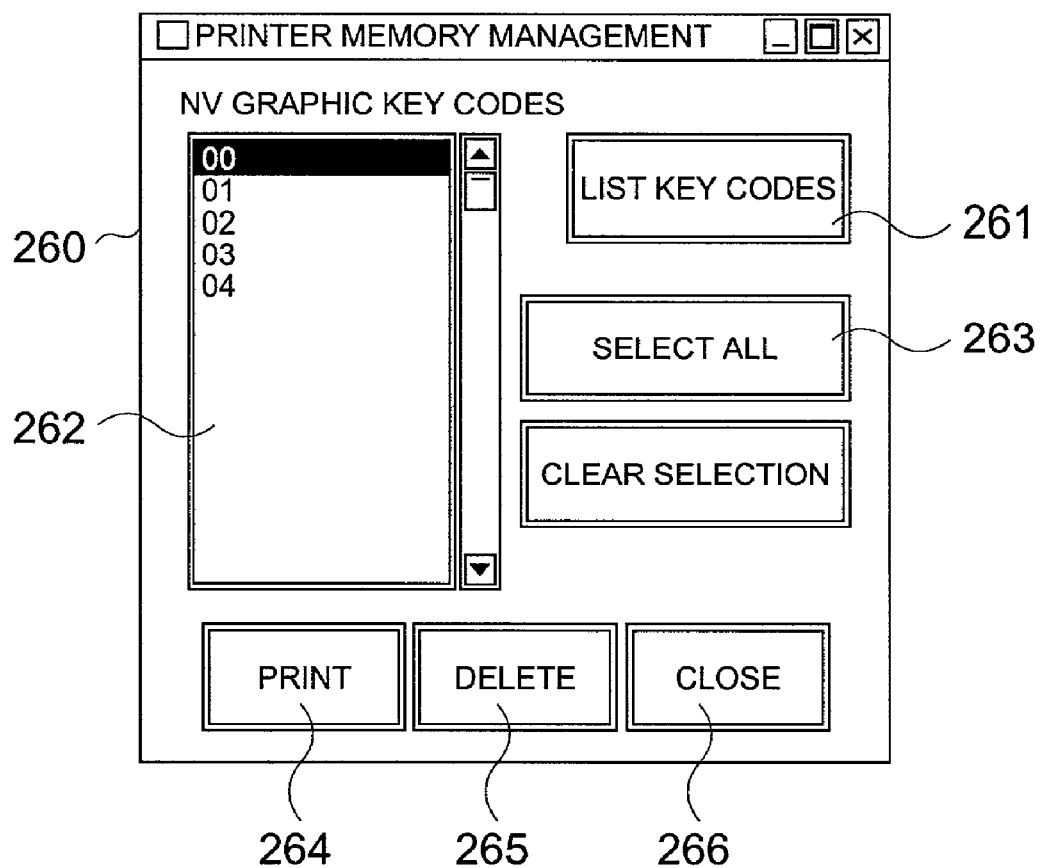
FIG. 19 shows an example of the selection dialog used for non-volatile memory management.
Figure 20:
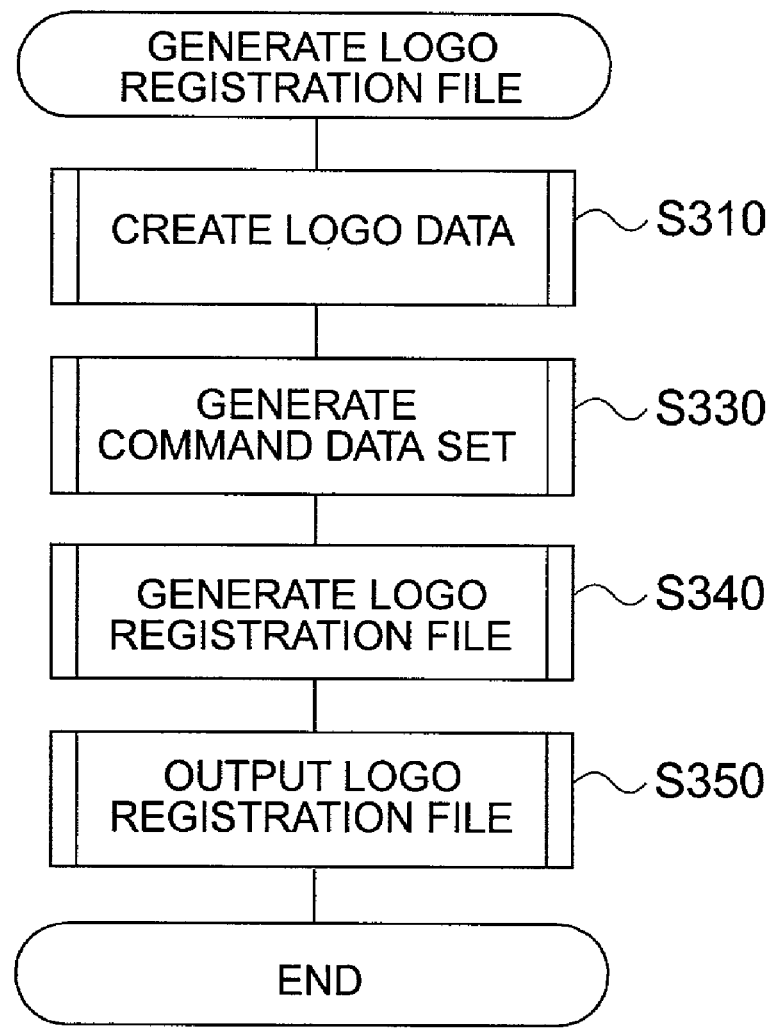
FIG. 20 is a flow chart of the process for generating the logo registration file after creating the logo data.
Figure 21:
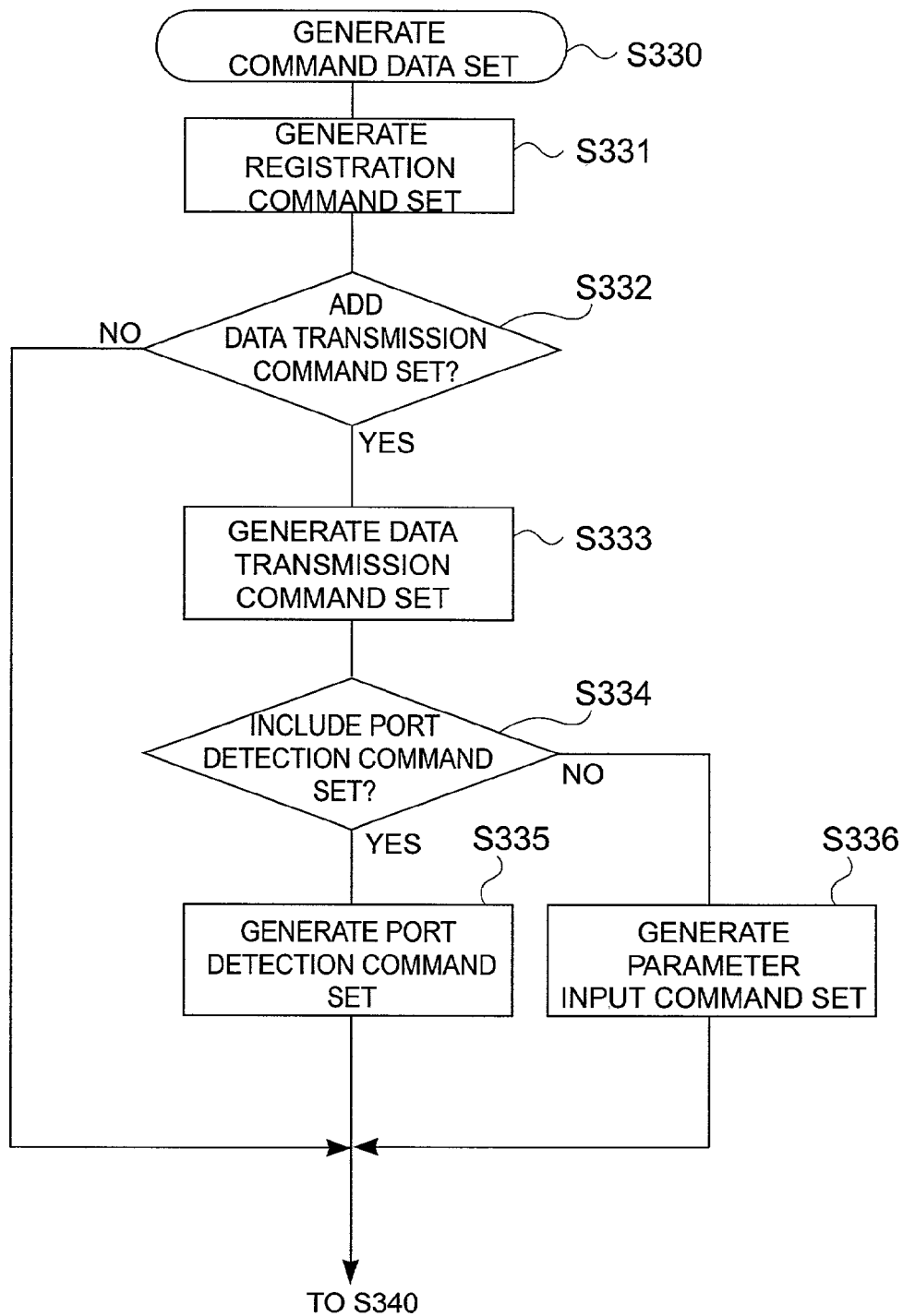
FIG. 21 is a flow chart showing the detailed steps of the command data set generating step (S330) in FIG. 20.
Figure 22:
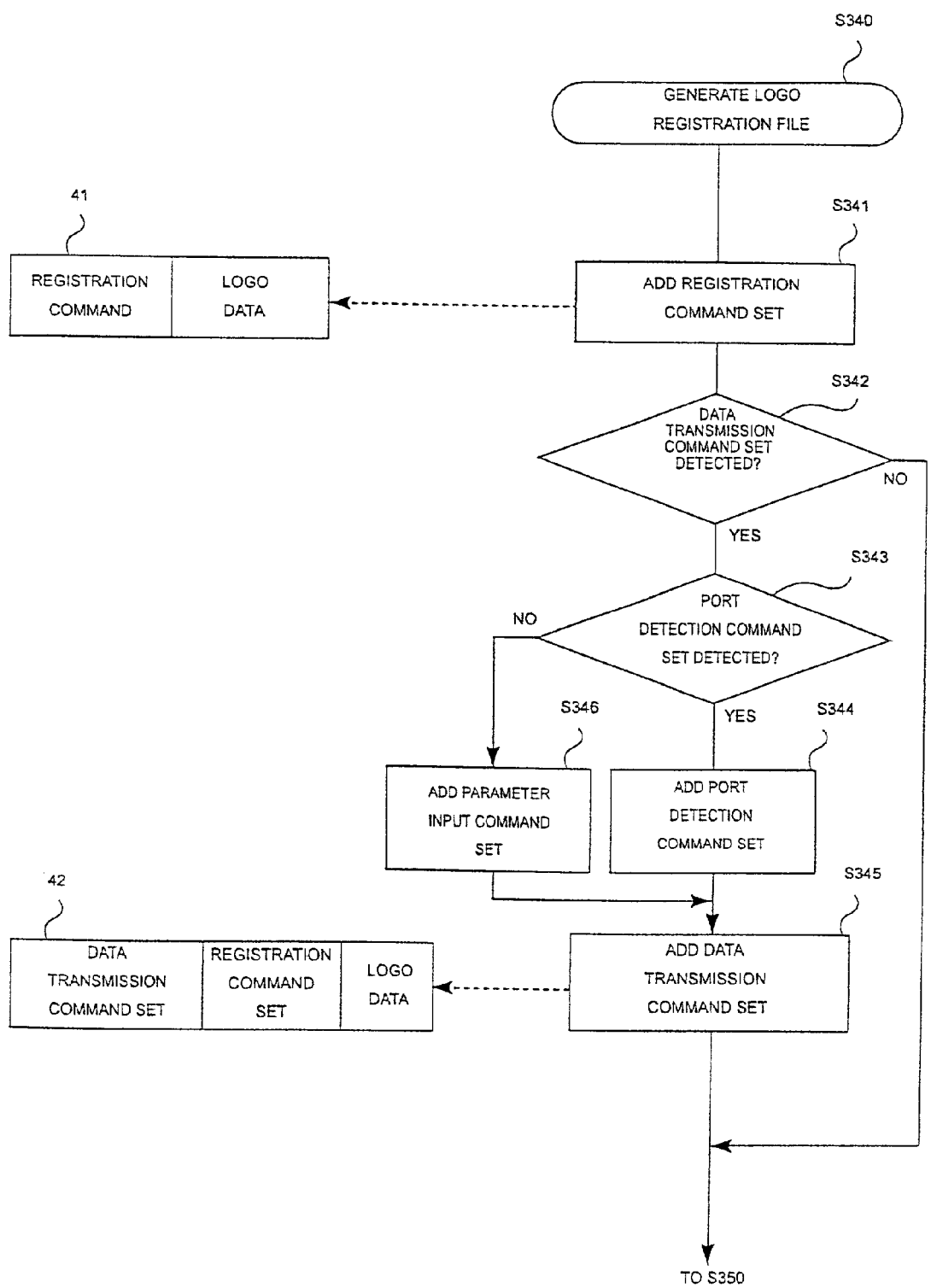
FIG. 22 is a flow chart showing the detailed steps of the logo registration file generating step (S340) in FIG. 20.
Figure 23:
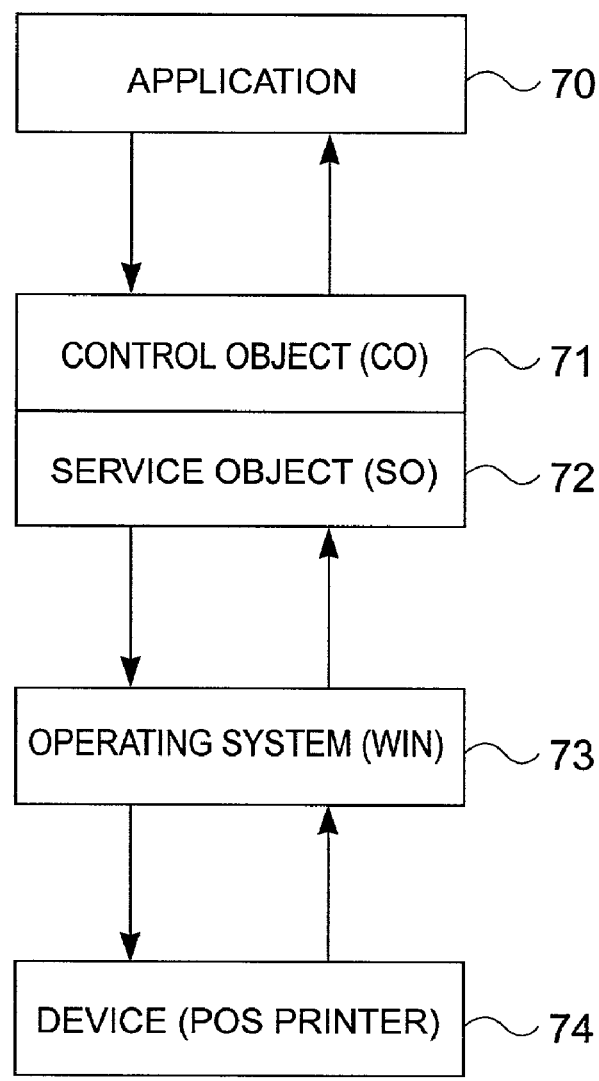
FIG. 23 shows the basic configuration of OPOS.
Figure 24:
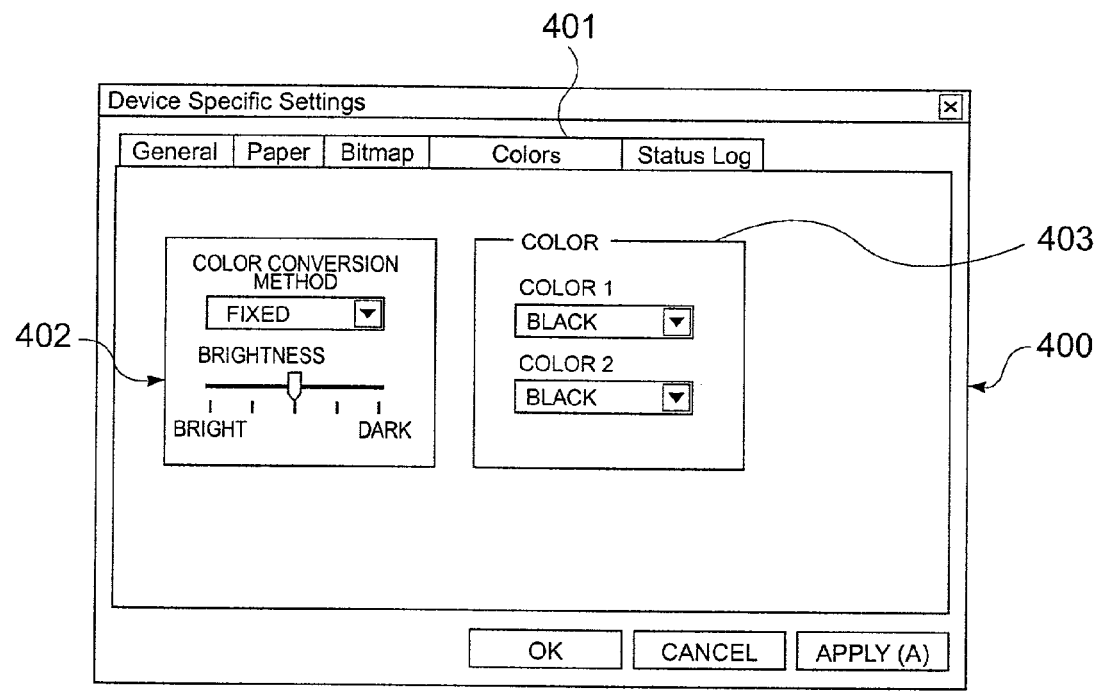
FIG. 24 shows an example of a screen for controlling the image adjustment settings in OPOS.

| TEXT IN THE FIGURES |
|---|
| SOURCE DATA<br>PREVIEW<br>COLOR ASSIGNMENT<br>    BLACK<br>    BLUE<br>    RED<br>    MAGENTA<br>    GREEN<br>    CYAN<br>    YELLOW<br>    WHITE<br>CONVERT 8 COLOR DATA TO 3 COLORS<br>PRINT COLOR<br>    COLOR 1   COLOR 2<br>    BLACK     RED<br>SOURCE DATA<br>PREVIEW<br>COLOR ASSIGNMENT<br>    BLACK     FIRST     SECOND<br>    BLUE      FIRST     SECOND<br>    RED       FIRST     SECOND<br>    MAGENTA  FIRST     SECOND<br>    GREEN    FIRST     SECOND<br>    CYAN     FIRST     SECOND<br>    YELLOW   FIRST     SECOND<br>    WHITE    FIRST     SECOND<br>FIG. 18<br><br>SLIDER 251<br>FIG. 19<br><br>PRINTER MEMORY MANAGEMENT<br>NV GRAPHIC KEY CODES<br>LIST KEY CODES 261<br>SELECT ALL<br>CLEAR SELECTION<br>PRINT   DELETE     CLOSE<br>FIG. 20<br><br>GENERATE LOGO REGISTRATION FILE<br>S310 CREATE LOGO DATA<br>S330 GENERATE COMMAND DATA SET<br>S340 GENERATE LOGO REGISTRATION FILE<br>S350 OUTPUT LOGO REGISTRATION FILE<br>END<br>FIG. 21<br><br>S330 GENERATE COMMAND DATA SET<br>S331 GENERATE REGISTRATION COMMAND SET<br>S332 ADD DATA TRANSMISSION COMMAND SET?<br>S333 GENERATE DATA TRANSMISSION COMMAND SET<br>S334 INCLUDE PORT DETECTION COMMAND SET?<br>S335 GENERATE PORT DETECTION COMMAND SET<br>S336 GENERATE PARAMETER INPUT COMMAND SET<br>TO S340<br>FIG. 22<br><br>S340 GENERATE LOGO REGISTRATION FILE<br>S341 ADD REGISTRATION COMMAND SET<br>REGISTRATION COMMAND ‖ LOGO DATA<br>S342 DATA TRANSMISSION COMMAND SET DETECTED?<br>S343 PORT DETECTION COMMAND SET DETECTED?<br>S344 ADD PORT DETECTION COMMAND SET<br>S345 ADD DATA TRANSMISSION COMMAND SET<br>DATA TRANSMISSION COMMAND SET ‖ REGISTRATION<br>COMMAND SET ‖ LOGO DATA<br>S346 ADD PARAMETER INPUT COMMAND SET<br>TO S350<br>FIG. 23<br><br>APPLICATION 70<br>CONTROL OBJECT (CO) 71<br>SERVICE OBJECT (SO) 72<br>OPERATING SYSTEM (WIN) 73<br>DEVICE (POS PRINTER) 74<br>FIG. 24 |

Figure 25:
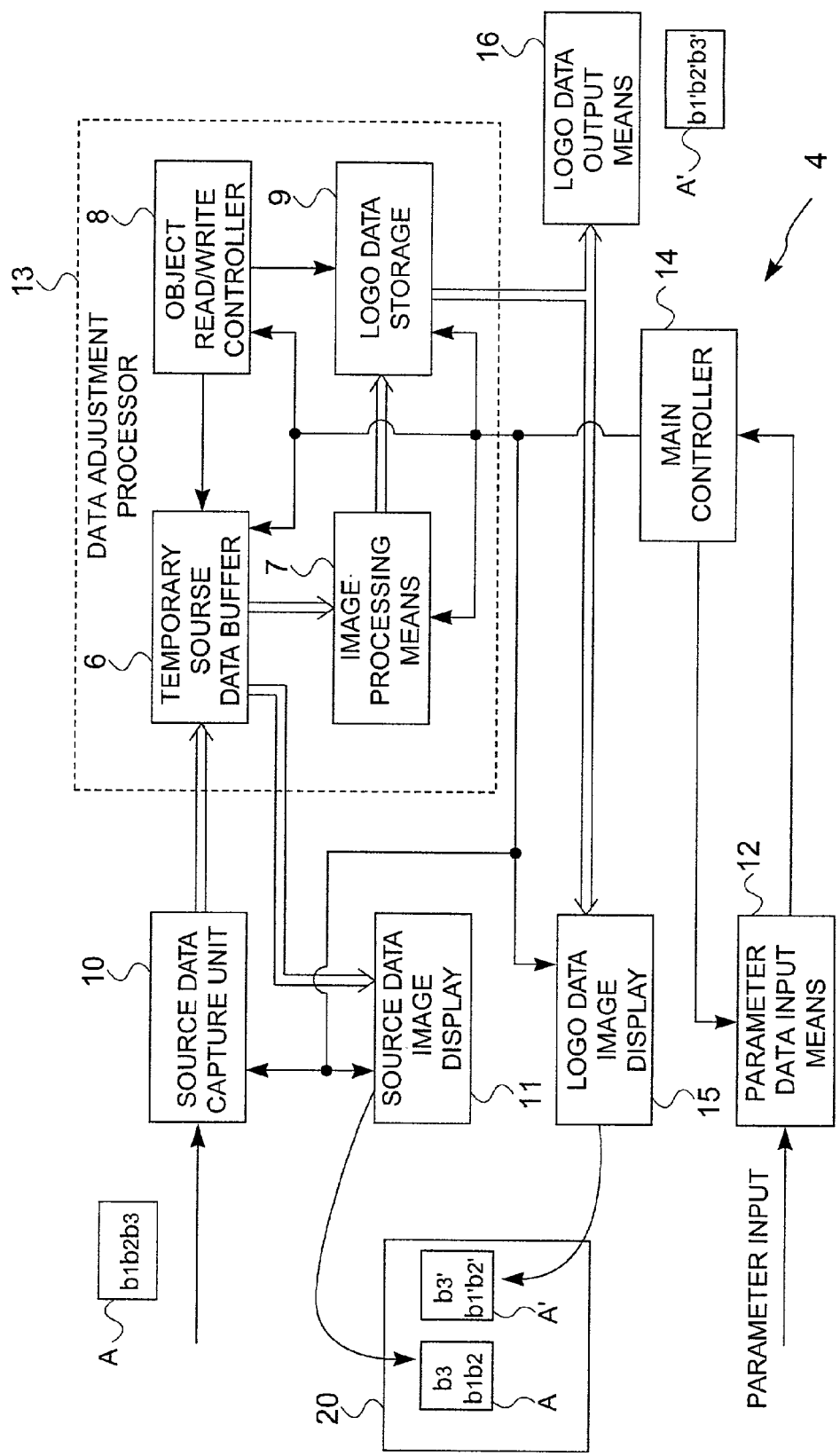
FIG. 25 is a detailed function block diagram showing a preferred embodiment of a data adjustment processor used in a logo data generating apparatus.
Figure 26:
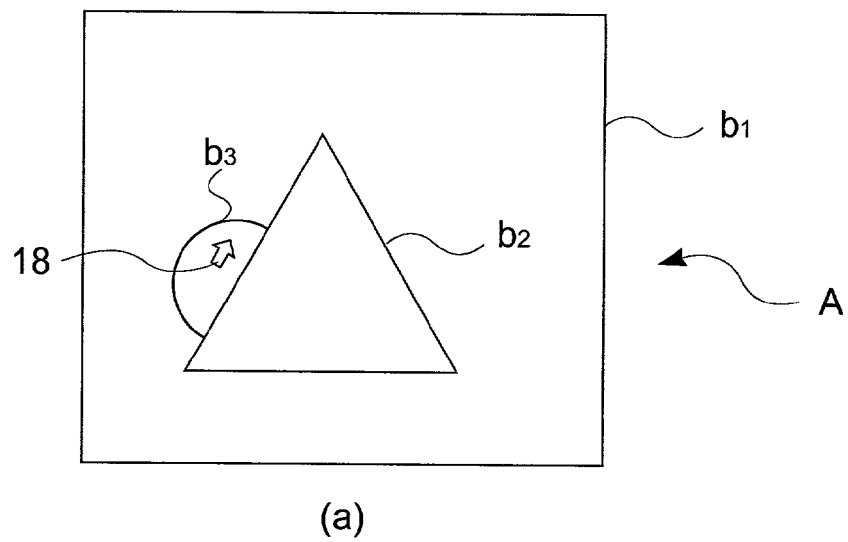
FIG. 26 shows displaying object images on screen.
Figure 26:
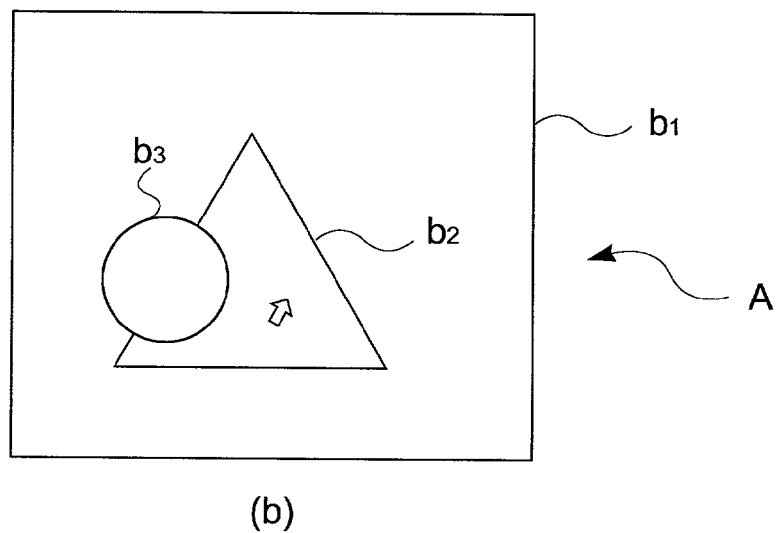
Figure 27:
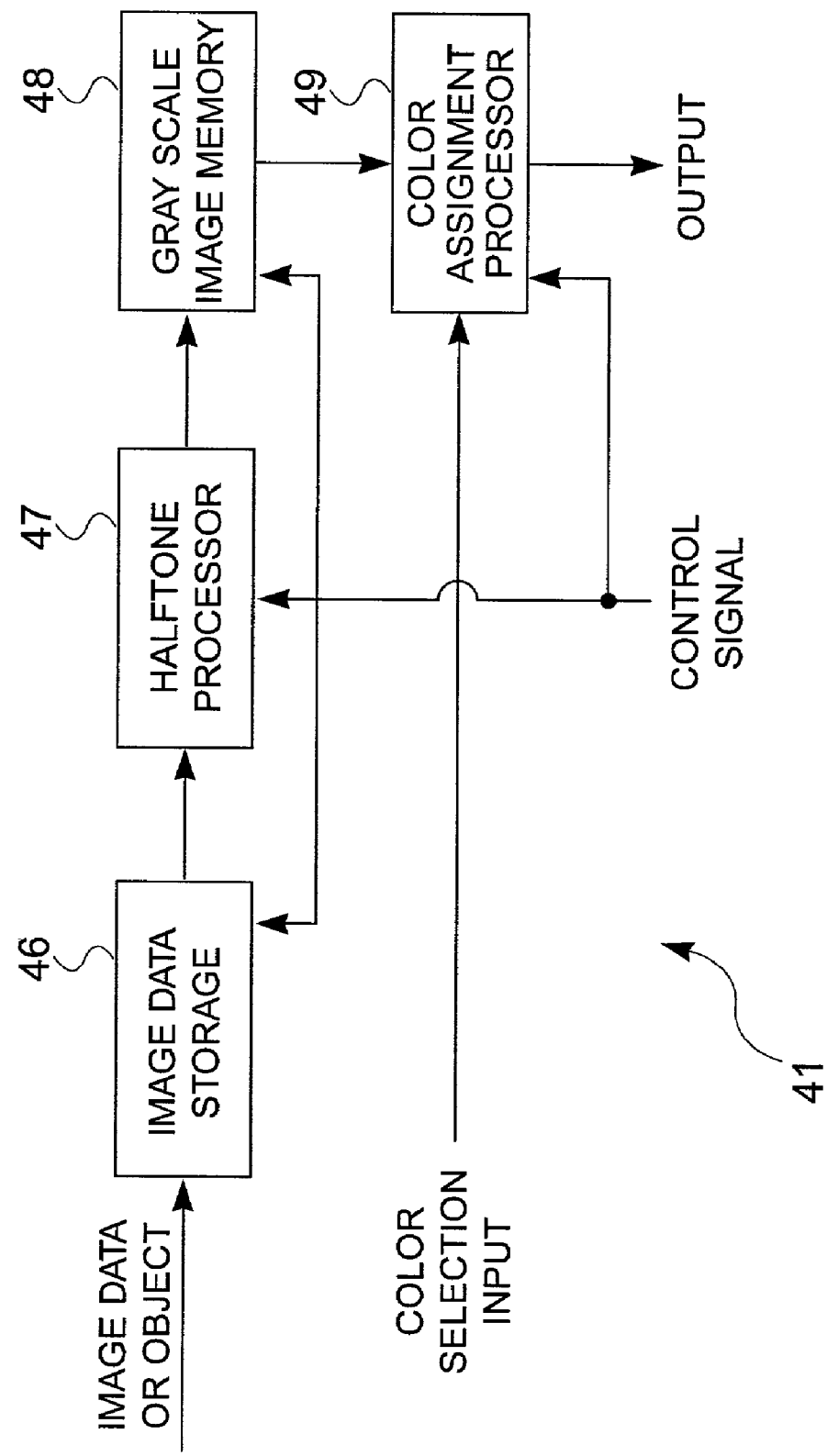
FIG. 27 is a function block diagram of a preferred embodiment of a gray scale processor used in a logo data generating apparatus.
Figure 28:
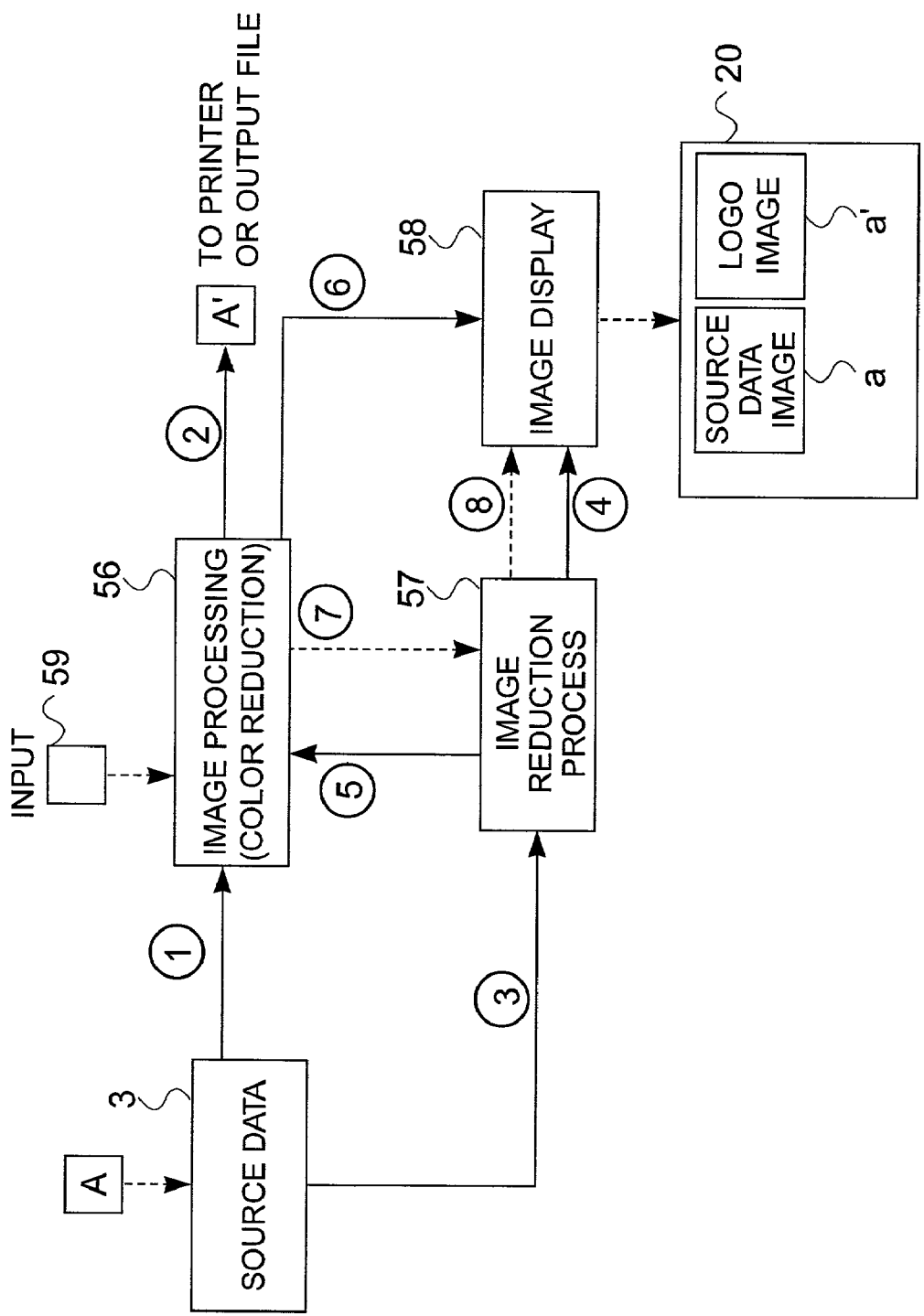
FIG. 28 shows the concept of displaying reduced images in second and third embodiments of a logo data generating apparatus.
Figure 29:
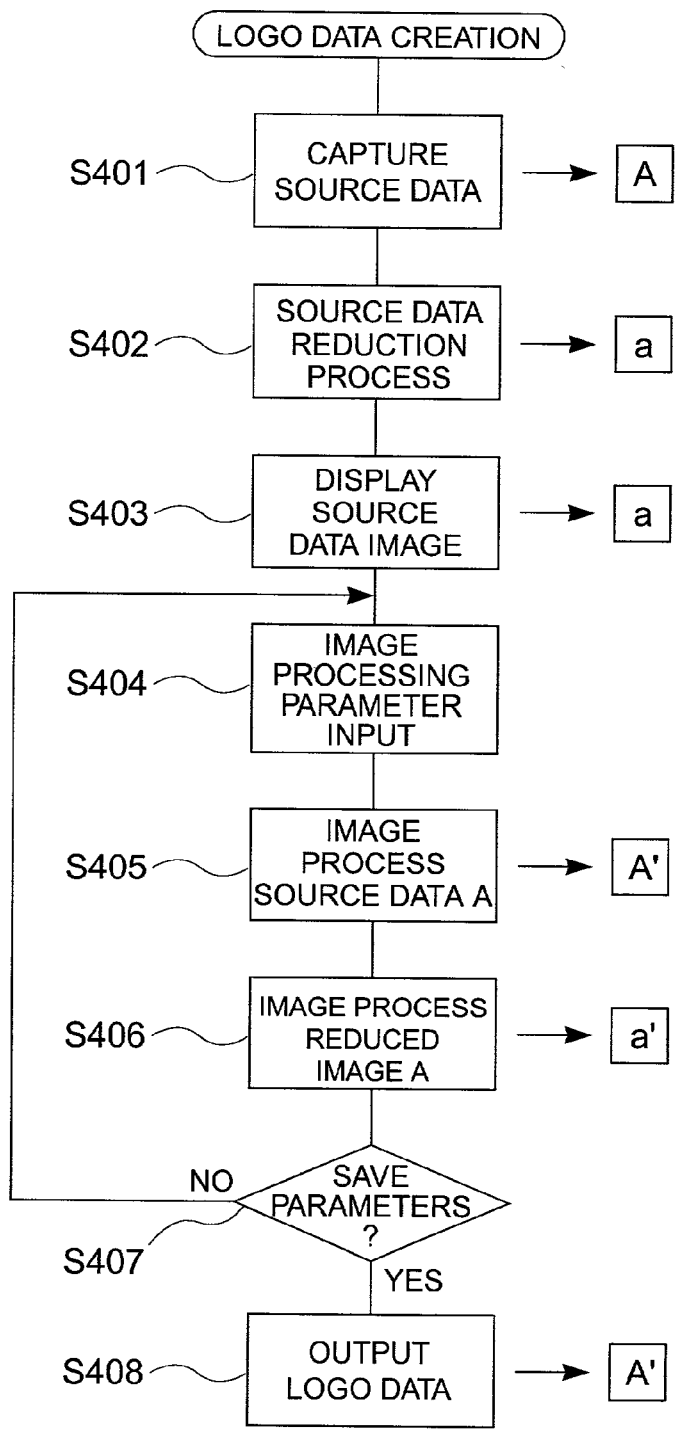
FIG. 29 is a flow chart of an alternative embodiment of the logo data generating method.
Figure 30:
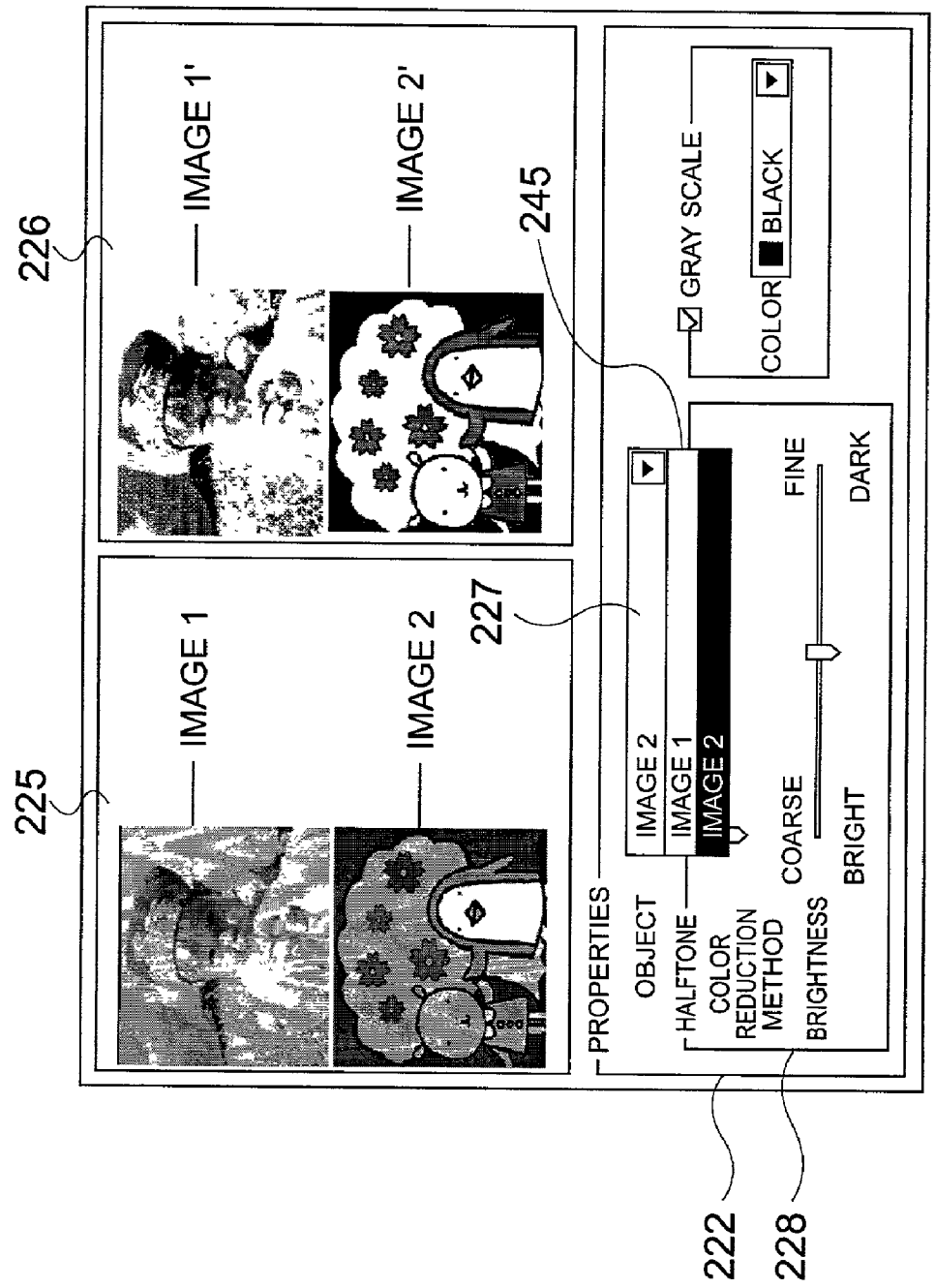
FIG. 30 shows an example of a display when image processing is applied separately to individual objects.
Figure 31:
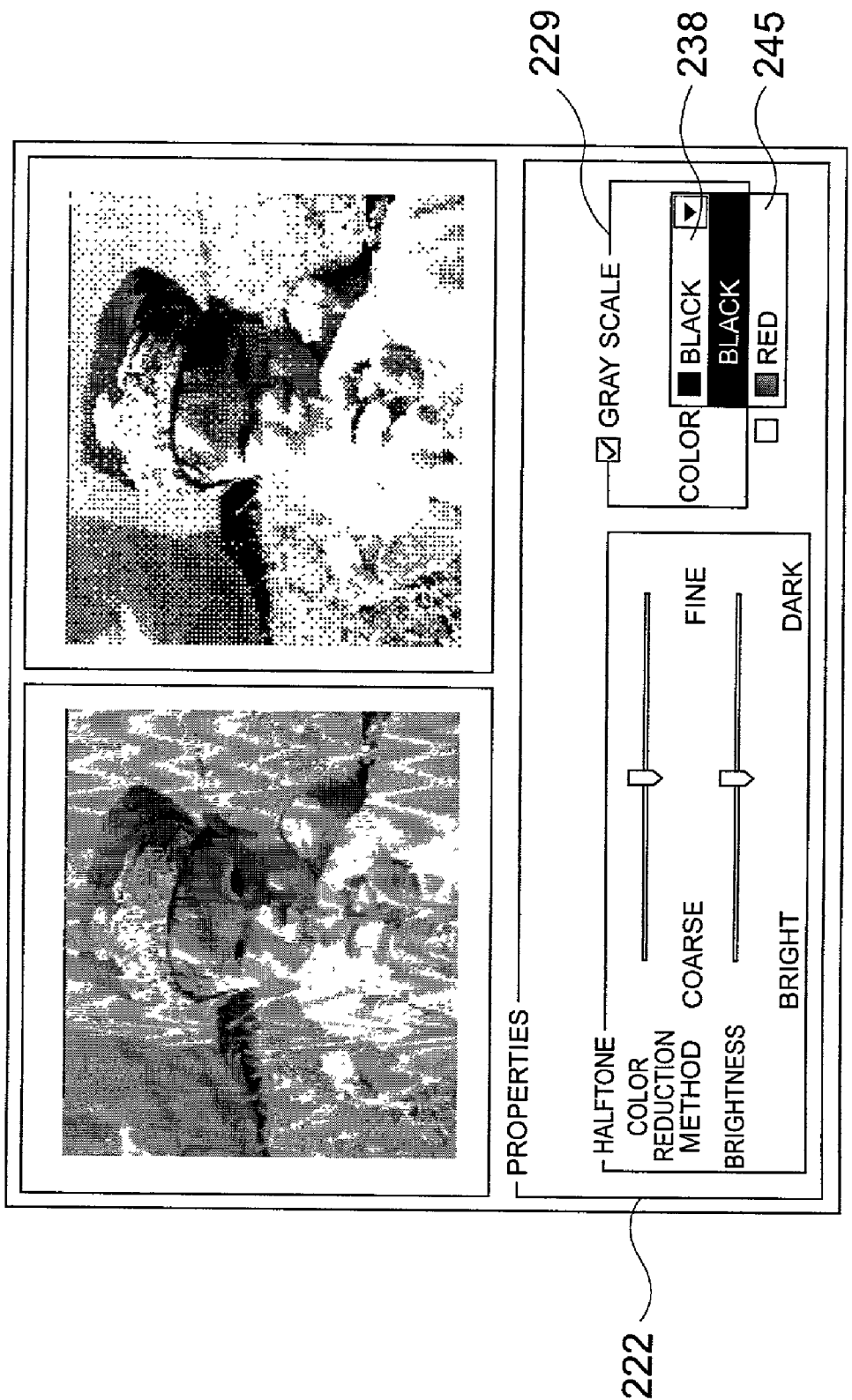
FIG. 31 shows an example of a display when image processing is applied seperately to individual objects.
Figure 32:
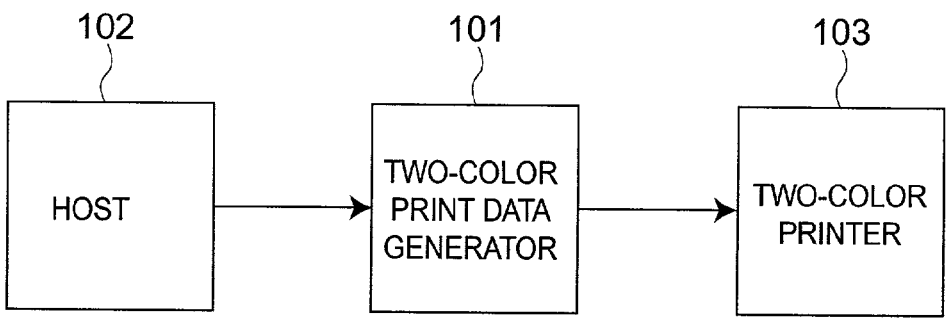
FIG. 32 is an example of a figure showing the position of a two-color print data generating apparatus according to the present invention.
Figure 32:
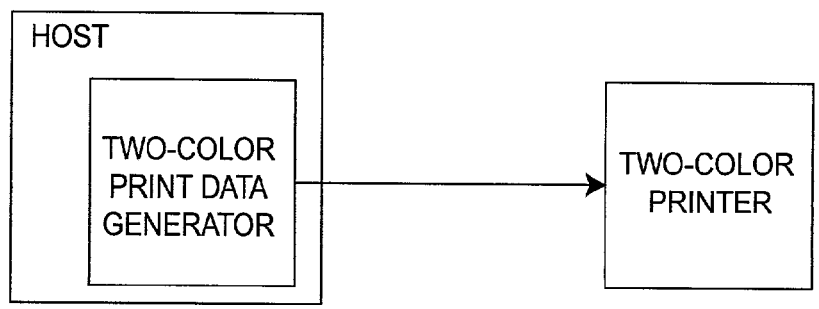
Figure 32:
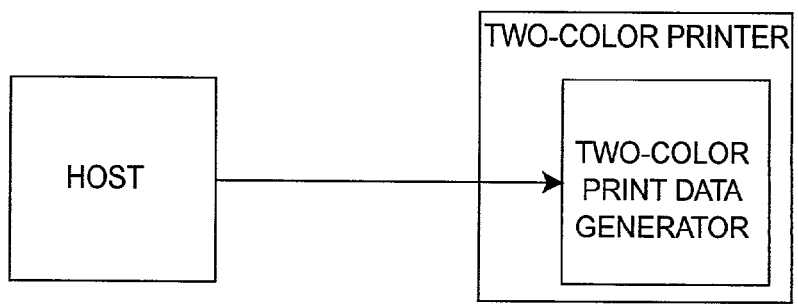
Figure 32:
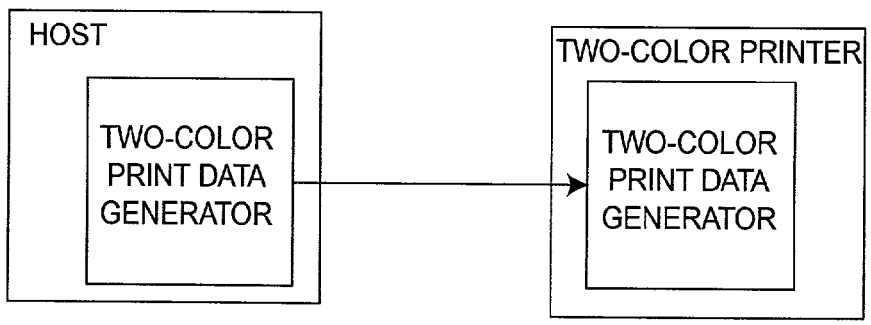
Figure 33:
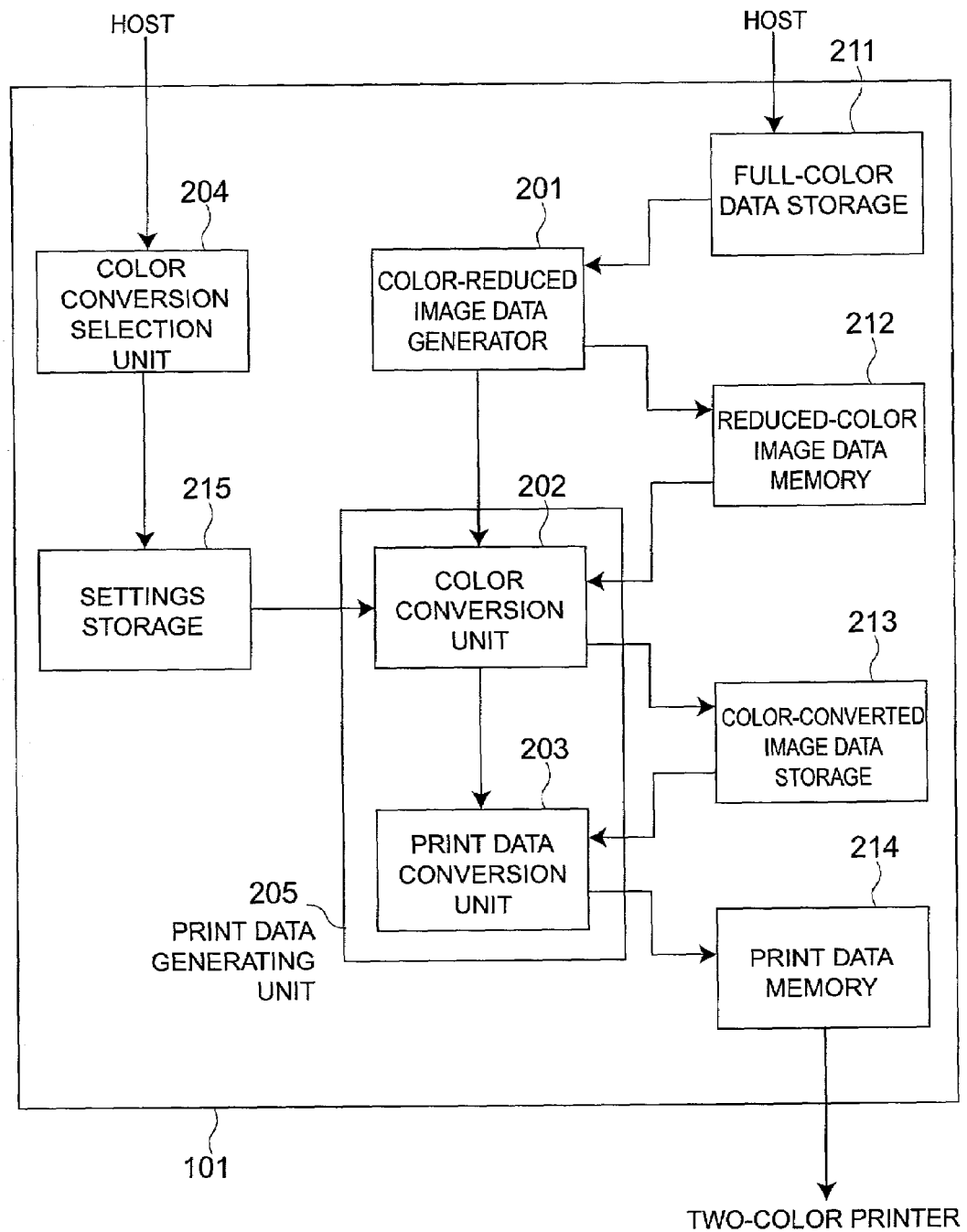
FIG. 33 is an example of a figure showing the configuration of a function block diagram of a two-color print data generating apparatus according to the present invention.
Figure 34:
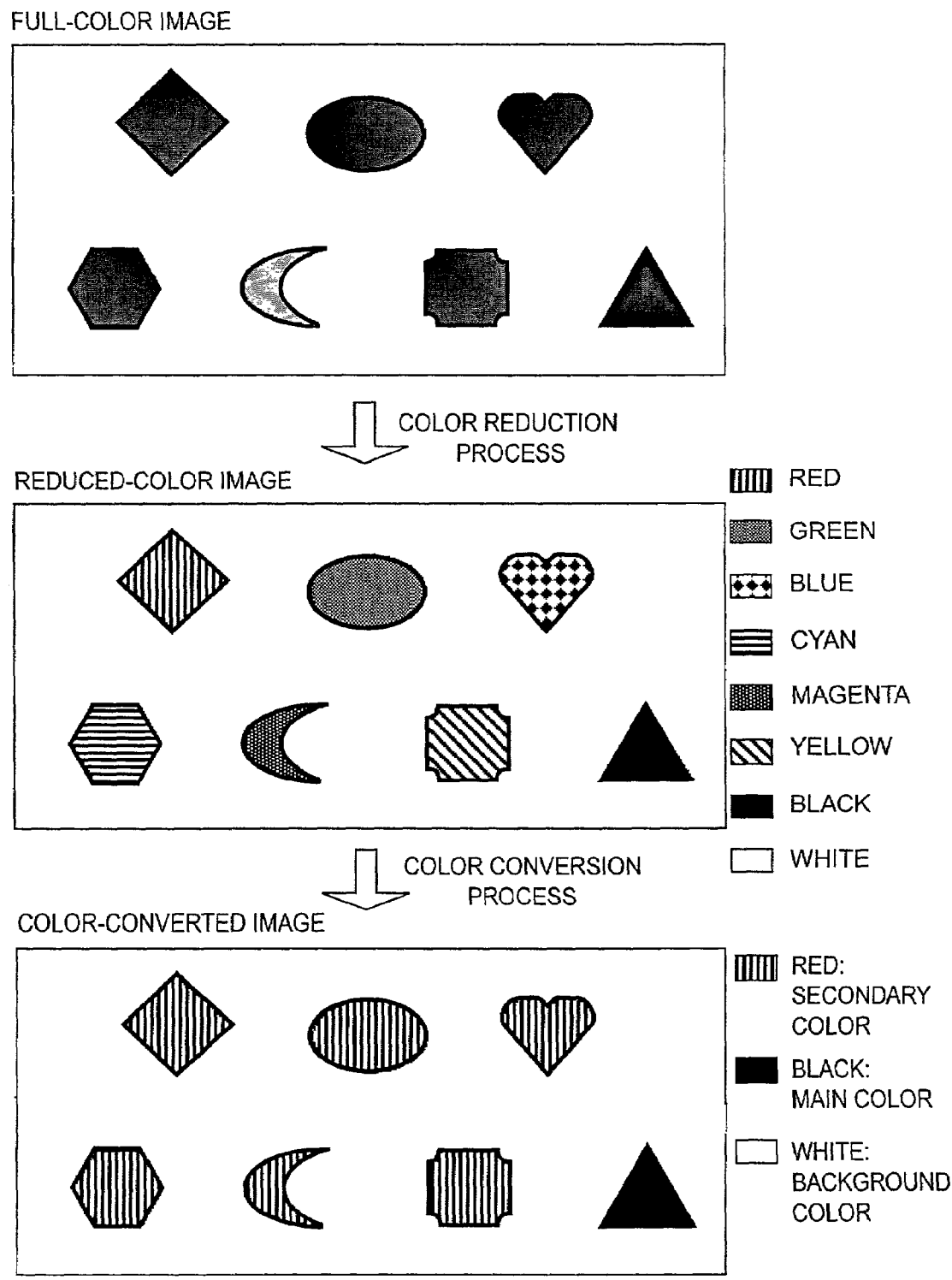
FIG. 34 shows a reduced-color image and color-converted image in the present invention.
Figure 36:
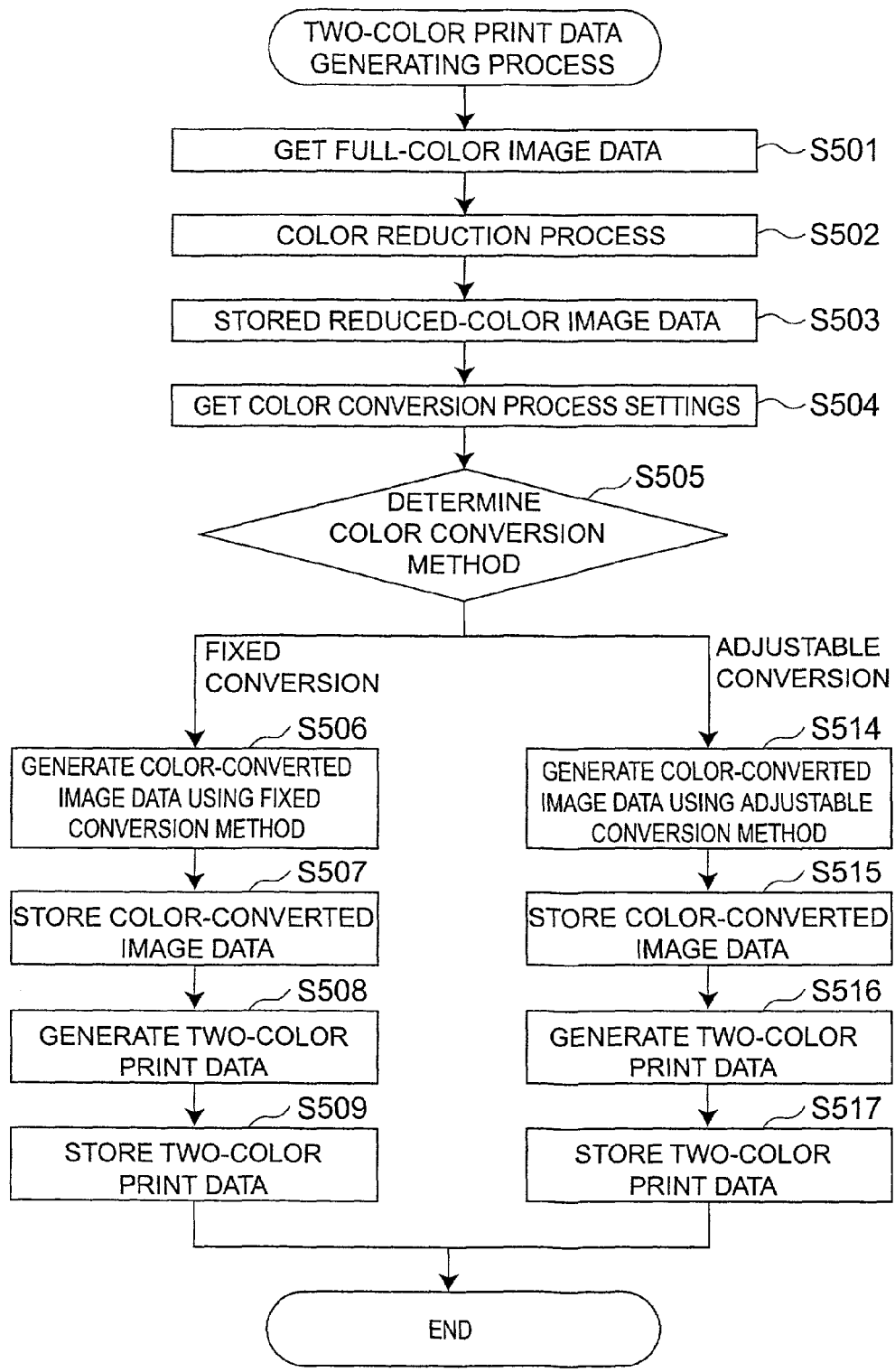
FIG. 36 is an example of a flow chart for a two-color print data generating process according to the present invention.

| TEXT IN THE FIGURES |
|---|
| COLORS 401 |
| COLOR CONVERSION METHOD |
|     FIXED |
|         BRIGHTNESS |
|             BRIGHT    DARK |
| COLOR |
|         COLOR 1 |
|             BLACK |
|         COLOR 2 |
|             BLACK |
| OK    CANCEL    APPLY |
| FIG. 25 |
| |
| SOURCE DATA CAPTURE UNIT 10 |
| SOURCE DATA IMAGE DISPLAY 11 |
| LOGO DATA IMAGE DISPLAY 15 |
| PARAMETER INPUT --> PARAMETER DATA INPUT MEANS 12 |
| TEMPORARY SOURCE DATA BUFFER 6 |
| IMAGE PROCESSING MEANS 7 |
| OBJECT READ/WRITE CONTROLLER 8 |
| LOGO DATA STORAGE 9 |
| DATA ADJUSTMENT PROCESSOR 13 |
| MAIN CONTROLLER 14 |
| LOGO DATA OUTPUT MEANS 16 |
| FIG. 27 |
| |
| IMAGE DATA OR OBJECT --> IMAGE DATA STORAGE 46 |
| HALFTONE PROCESSOR 47 |
| GRAY SCALE IMAGE MEMORY 48 |
| COLOR SELECTION INPUT --> COLOR ASSIGNMENT |
| PROCESSOR 49 --> OUTPUT |
| CONTROL SIGNAL |
| FIG. 28 |
| |
| SOURCE DATA 3 |
| IMAGE PROCESSING (COLOR REDUCTION) 56 |
| IMAGE REDUCTION PROCESS 57 |
| TO PRINTER OR OUTPUT FILE |
| IMAGE DISPLAY 58 |
| SOURCE DATA IMAGE    LOGO IMAGE |
| FIG. 29 |
| |
| LOGO DATA CREATION |
| S401 CAPTURE SOURCE DATA |
| S402 SOURCE DATA REDUCTION PROCESS |
| S403 DISPLAY SOURCE DATA IMAGE |
| S404 IMAGE PROCESSING PARAMETER INPUT |
| S405 IMAGE PROCESS SOURCE DATA A |
| S406 IMAGE PROCESS REDUCED IMAGE A |
| S407 SAVE PARAMETERS? |
| S408 OUTPUT LOGO DATA |
| FIG. 30 |
| |
| IMAGE 1            IMAGE 1' |
| IMAGE 2            IMAGE 2' |
| PROPERTIES |
|         OBJECT    IMAGE 2 |
|                       IMAGE 1 |
|         HALFTONE |
|         COLOR REDUCTION METHOD |
|             COARSE    FINE |
|         BRIGHTNESS |
|             BRIGHT    DARK |
|         GRAY SCALE |
|             COLOR        BLACK |
| FIG. 31 |
| |
| PROPERTIES |
| HALFTONE |
|         COLOR REDUCTION METHOD |
|             COARSE    FINE |
|         BRIGHTNESS |
|             BRIGHT    DARK |
|         GRAY SCALE |
|             COLOR        BLACK |
| FIG. 32 |
| |
| TWO-COLOR PRINT DATA GENERATOR 101 |
| HOST 102 |
| TWO-COLOR PRINTER 103 |
| HOST [TWO-COLOR PRINT DATA GENERATOR] --> |
| TWO-COLOR PRINTER |
| HOST --> TWO-COLOR PRINTER [TWO-COLOR PRINT |
| DATA GENERATOR] |
| HOST [TWO-COLOR PRINT DATA GENERATOR] --> |
| TWO-COLOR PRINTER |
| [TWO-COLOR PRINT DATA GENERATOR] |
| FIG. 33 |
| |
| COLOR-REDUCED IMAGE DATA GENERATOR 201 |
| COLOR CONVERSION UNIT 202 |
| PRINT DATA CONVERSION UNIT 203 |
| HOST --> COLOR CONVERSION SELECTION UNIT 204 |
| PRINT DATA GENERATING UNIT 205 |
| HOST --> FULL-COLOR DATA STORAGE 211 |
| REDUCED-COLOR IMAGE DATA MEMORY 212 |
| COLOR-CONVERTED IMAGE DATA STORAGE 213 |
| PRINT DATA MEMORY 214 --> TWO-COLOR PRINTER |
| SETTINGS STORAGE 215 |
| FIG. 34 |
| |
| FULL-COLOR IMAGE |
| COLOR REDUCTION PROCESS |
| REDUCED-COLOR IMAGE |
|         RED, GREEN, BLUE, CYAN, MAGENTA, YELLOW, |
|         BLACK, WHITE |
| COLOR CONVERSION PROCESS |
| COLOR-CONVERTED IMAGE |
|         RED: SECONDARY COLOR |
|         BLACK: MAIN COLOR |
|         WHITE: BACKGROUND COLOR |
| FIG. 35 |
| |
| COLOR |
|         K (=BLACK) |
|         B (=BLUE) |
|         G (=GREEN) |
|         C (=CYAN) |
|         R (=RED) |
|         M (=MAGENTA) |
|         Y (=YELLOW) |
|         W (=WHITE) |
| R (=RED) |
| G (=GREEN) |
| B (=BLUE) |
| MAIN COLOR K (=BLACK)    B (=BLUE) |
| SECONDARY COLOR R (=RED)    R (=RED) |
|         K (=BLACK)    B (=BLUE) |
|         R (=RED)    R (=RED) |
|         R (=RED)    R (=RED) |
|         R (=RED)    R (=RED) |
|         R (=RED)    R (=RED) |
|         R (=RED)    R (=RED) |
|         R (=RED)    R (=RED) |
|         W (=WHITE)    W (=WHITE) |
| FIG. 36 |
| |
| TWO-COLOR PRINT DATA GENERATING PROCESS |
| S501 GET FULL-COLOR IMAGE DATA |
| S502 COLOR REDUCTION PROCESS |
| S503 STORED REDUCED-COLOR IMAGE DATA |
| S504 GET COLOR CONVERSION PROCESS SETTINGS |
| S505 DETERMINE COLOR CONVERSION METHOD |
| FIXED CONVERSION |
| S506 GENERATE COLOR-CONVERTED IMAGE DATA USING |
| FIXED CONVERSION METHOD |
| S507 STORE COLOR-CONVERTED IMAGE DATA |
| S508 GENERATE TWO-COLOR PRINT DATA |
| S509 STORE TWO-COLOR PRINT DATA |
| ADJUSTABLE CONVERSION |
| S514 GENERATE COLOR-CONVERTED IMAGE DATA USING |
| ADJUSTABLE CONVERSION METHOD |

-continued

TEXT IN THE FIGURES

Figure 37:
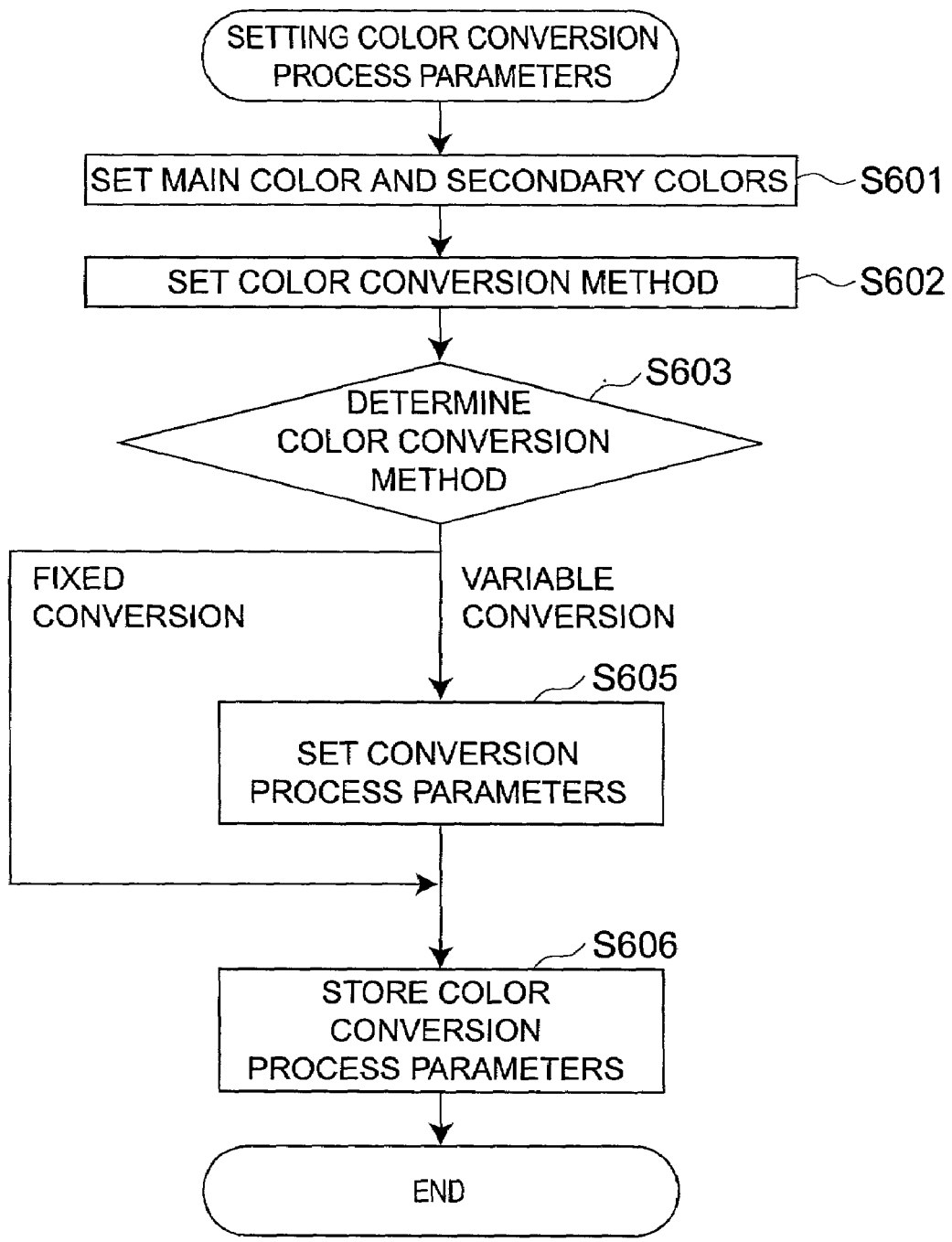
FIG. 37 is an example of a flow chart of the color conversion data setting process.

S515 STORE COLOR-CONVERTED IMAGE DATA
S516 GENERATE TWO-COLOR PRINT DATA
S517 STORE TWO-COLOR PRINT DATA
END
FIG. 37

SETTING COLOR CONVERSION PROCESS PARAMETERS
S601 SET MAIN COLOR AND SECONDARY COLORS
S602 SET COLOR CONVERSION METHOD
S603 DETERMINE COLOR CONVERSION METHOD
VARIABLE CONVERSION
S605 SET CONVERSION PROCESS PARAMETERS
FIXED CONVERSION
S606 STORE COLOR CONVERSION PROCESS PARAMETERS
END

What is claimed is:

1. A method for generating two-color print data, comprising the steps of:
   (a) reducing full-color digital image data to reduced-color digital image data by reducing the color of each pixel in the full-color digital image data to one of eight colors, wherein the color of each pixel in the reduced-color digital image data is defined by first, second and third primary colors, each primary color capable of exhibiting either a first intensity or a second intensity; and
   (b) generating two-color print data by converting the color of each pixel in the reduced-color digital image data to a main color, a secondary color, or a background color according to the following rules:
      (1) for each pixel whose three primary colors each exhibit its first intensity convert that pixel to the main color,
      (2) for each pixel whose three primary colors each exhibit its second intensity convert that pixel to the background color, and
      (3) for each pixel that does not satisfy either of conditions (1) or (2) convert that pixel to the secondary color.

2. The method of claim 1, wherein
the color of each pixel in the full-color digital image data is defined by the first, second and third primary colors, each primary color capable of exhibiting one of a plurality of intensities, and
step (a) comprises comparing the intensity of the first primary color of each pixel in the full-color digital image data with a first threshold, comparing the intensity of the second primary color of each pixel in the full-color digital image data with a second threshold, and comparing the intensity of the third primary color of each pixel in the full-color digital image data with a third threshold, and reducing the color of each pixel in the full-color digital image data based on the results of the comparisons.

3. The method of claim of 1, wherein the first, second and third primary colors are red, green, and blue.

4. The method of claim 1, wherein the first, second and third primary colors are cyan, magenta, and yellow.

5. A method for generating two-color print data, comprising the steps of:
   (a) reducing full-color digital image data to reduced-color digital image data by reducing the color of each pixel in the full-color digital image data to one of a predetermined number of colors, wherein the predetermined number of colors is eight or less; and
   (b) generating two-color print data by converting each color in the reduced-color digital image data to a main color, a secondary color, or a background color, wherein the converting is performed according to one of the following:
      (1) uniformly converting each color in the reduced-color digital image data based on predefined conditions, or
      (2) converting each color in the reduced-color digital image data based on a changeable conversion table linking each color to the main color, secondary color, or background color.

6. The method of claim 5, wherein
in step (a) each color in the full-color digital image data is reduced to a color defined by first, second and third primary colors, each primary color capable of exhibiting either a first intensity or a second intensity, and
step (b)(1) generates two-color print data by converting each color in the reduced-color digital image data to the main color, the secondary color, or the background color according to one of the following rules:
   (1) for each color whose three primary colors each exhibit its first intensity convert that pixel to the main color,
   (2) for each color whose three primary colors each exhibit its second intensity convert that pixel to the background color, and
   (3) for each color that does not satisfy either of conditions (1) or (2) convert that pixel to the secondary color.

7. A two-color print data generating apparatus, comprising:
a reduced-color image data generating unit configured to reduce full-color digital image data to reduced-color digital image data by reducing the color of each pixel in the full-color digital image data to one of eight colors, wherein the color of each pixel in the reduced-color digital image data is defined by first, second and third primary colors, each primary color capable of exhibiting either a first intensity or a second intensity; and
a print data generating unit configured to generate two-color print data by converting the color of each pixel in the reduced-color digital image data to a main color, a secondary color, or a background color according to the following rules:
   (1) for each pixel whose three primary colors each exhibit its first intensity convert that pixel to the main color,
   (2) for each pixel whose three primary colors each exhibit its second intensity convert that pixel to the background color, and
   (3) for each pixel that does not satisfy either of conditions (1) or (2) convert that pixel to the secondary color.

8. The apparatus of claim 7, wherein
the color of each pixel in the full-color digital image data is defined by the first, second and third primary colors, each primary color capable of exhibiting one of a plurality of intensities, and
the reduced-color image data generating unit is further configured to compare the intensity of the first primary color of each pixel in the full-color digital image data with a first threshold, compare the intensity of the second primary color of each pixel in the full-color digital image data with a second threshold, and compare the intensity of the third primary color of each pixel in the full-color digital image data with a third threshold, and reduce the color of each pixel in the full-color digital image data based on the results of the comparisons.

9. The apparatus of claim 7, wherein the first, second and third primary colors are red, green, and blue.

10. The apparatus of claim 7, wherein the first, second and third primary colors are cyan, magenta, and yellow.

11. A two-color print data generating apparatus, comprising:

a reduced-color image data generating unit configured to reduce full-color digital image data to reduced-color digital image data by reducing the color of each pixel in the full-color digital image data to one of a predetermined number of colors, wherein the predetermined number of colors is eight or less; and a print data generating unit configured to generate two-color print data by converting each color in the reduced-color digital image data to a main color, a secondary color, or a background color, wherein the converting is performed according to one of the following:

(1) uniformly converting each color in the reduced-color digital image data based on predefined conditions, or (2) converting each color in the reduced-color digital image data based on a changeable conversion table linking each color to the main color, secondary color, or background color.

12. The apparatus of claim 11, wherein the reduced-color image data generating unit is configured to reduce each color in the full-color digital image data to a color defined by first, second and third primary colors, each primary color capable of exhibiting either a first intensity or a second intensity, and the print data generating unit is configured to generate two-color print data by converting each color in the reduced-color digital image data to the main color, the secondary color, or the background color according to one of the following rules:

(1) for each color whose three primary colors each exhibit its first intensity convert that pixel to the main color, (2) for each color whose three primary colors each exhibit its second intensity convert that pixel to the background color, and (3) for each color that does not satisfy either of conditions (1) or (2) convert that pixel to the secondary color.

13. A computer-readable medium containing a program of instructions for directing a machine to perform a method of generating two-color print data, the program of instructions comprising:

(a) instructions for reducing full-color digital image data to reduced-color digital image data by reducing the color of each pixel in the full-color digital image data to one of eight colors, wherein the color of each pixel in the reduced-color digital image data is defined by first, second and third primary colors, each primary color capable of exhibiting either a first intensity or a second intensity; and (b) instructions for generating two-color print data by converting the color of each pixel in the reduced-color digital image data to a main color, a secondary color, or a background color according to the following rules:

(1) for each pixel whose three primary colors each exhibit its first intensity convert that pixel to the main color, (2) for each pixel whose three primary colors each exhibit its second intensity convert that pixel to the background color, and (3) for each pixel that does not satisfy either of conditions (1) or (2) convert that pixel to the secondary color.

14. The computer-readable medium of claim 13, wherein the color of each pixel in the full-color digital image data is defined by the first, second and third primary colors, each primary color capable of exhibiting one of a plurality of intensities, and instructions (a) comprise comparing the intensity of the first primary color of each pixel in the full-color digital image data with a first threshold, comparing the intensity of the second primary color of each pixel in the full-color digital image data with a second threshold, and comparing the intensity of the third primary color of each pixel in the full-color digital image data with a third threshold, and reducing the color of each pixel in the full-color digital image data based on the results of the comparisons.

15. The computer-readable medium of claim of 13, wherein the first, second and third primary colors are red, green, and blue.

16. The computer-readable medium of claim 13, wherein the first, second and third primary colors are cyan, magenta, and yellow.

* * * * *